United States Patent
Fukushima

(10) Patent No.: US 10,162,657 B2
(45) Date of Patent: Dec. 25, 2018

(54) DEVICE AND METHOD FOR ADDRESS TRANSLATION SETTING IN NESTED VIRTUALIZATION ENVIRONMENT

(71) Applicant: FUJITSU LIMITED, Kawasaki-shi, Kanagawa (JP)

(72) Inventor: Hirotaka Fukushima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 45 days.

(21) Appl. No.: 14/883,679

(22) Filed: Oct. 15, 2015

(65) Prior Publication Data
US 2016/0034300 A1 Feb. 4, 2016

Related U.S. Application Data

(63) Continuation of application No. PCT/JP2013/061805, filed on Apr. 22, 2013.

(51) Int. Cl.
 G06F 9/455 (2018.01)
 G06F 12/14 (2006.01)
 G06F 12/1081 (2016.01)

(52) U.S. Cl.
 CPC ...... *G06F 9/45558* (2013.01); *G06F 9/45533* (2013.01); *G06F 12/1491* (2013.01);
 (Continued)

(58) Field of Classification Search
 None
 See application file for complete search history.

(56) References Cited

U.S. PATENT DOCUMENTS

2006/0174053 A1* 8/2006 Anderson ........... G06F 12/1036
 711/6
2008/0162864 A1 7/2008 Sugumar et al.
(Continued)

FOREIGN PATENT DOCUMENTS

JP 2008-165789 A 7/2008
JP 2008-529176 A 7/2008
(Continued)

OTHER PUBLICATIONS

"Intel Virtualization Technology for Directed I/O", Intel Virtualization Technology for Directed I/O Architecture Specification, Rev. 2.3, Oct. 2014.
(Continued)

*Primary Examiner* — Lewis A Bullock, Jr.
*Assistant Examiner* — Melissa A Alfred
(74) *Attorney, Agent, or Firm* — Fujitsu Patent Center

(57) ABSTRACT

An information processing device includes a processor that executes a process. The process includes: identifying a cause of a shift from non-privileged mode to privileged mode that has occurred in processing by a guest program in an upper level virtual machine in a nested virtualization environment in which a first level virtual machine monitor operates in privileged mode, and an upper level virtual machine monitor and the guest program operate in non-privileged mode; and when the identified cause is setting or updating a virtual translation table employed in a virtual translation mechanism provided to the guest program by virtualizing an address translation mechanism for hardware that uses a set translation table to translate addresses of DMA by an input/output device assigned to the upper level virtual machine, setting the translation table employed by the translation mechanism based on a correspondence relationship between guest memory space and host memory space.

9 Claims, 39 Drawing Sheets

(52) U.S. Cl.
CPC .......... *G06F 12/1081* (2013.01); *G06F 2009/45579* (2013.01); *G06F 2009/45583* (2013.01); *G06F 2009/45591* (2013.01); *G06F 2212/151* (2013.01)

(56) References Cited

U.S. PATENT DOCUMENTS

| | | |
|---|---|---|
| 2009/0006805 A1 | 1/2009 | Anderson et al. |
| 2009/0007112 A1 | 1/2009 | Moriki et al. |
| 2011/0093750 A1 | 4/2011 | Williams et al. |
| 2015/0169346 A1 | 6/2015 | Moriki et al. |

FOREIGN PATENT DOCUMENTS

| | | |
|---|---|---|
| JP | 2009-003749 A | 1/2009 |
| JP | 2012-27960 A | 2/2012 |
| JP | 2013-508845 A | 3/2013 |
| WO | 2012/164716 A1 | 12/2012 |

OTHER PUBLICATIONS

International Search Report, mailed in connection with PCT/JP2013/061805 and dated May 21, 2013 (5 pages).

\* cited by examiner

FIG.30
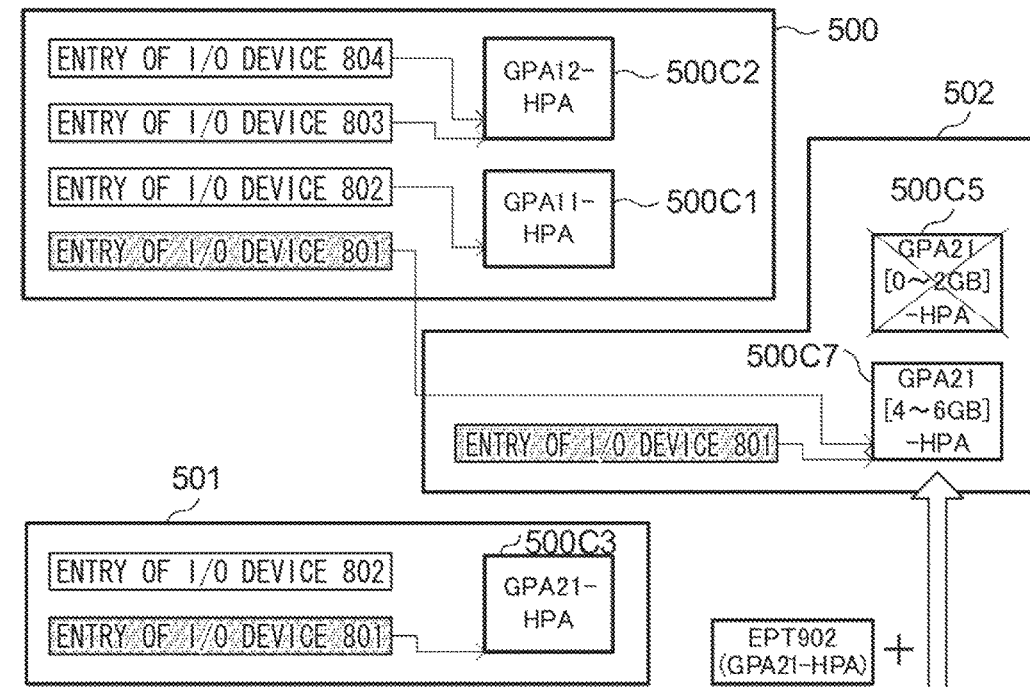
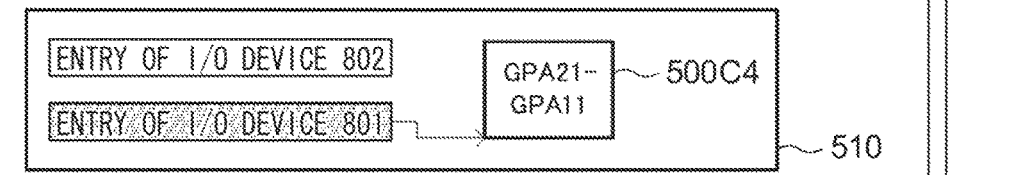
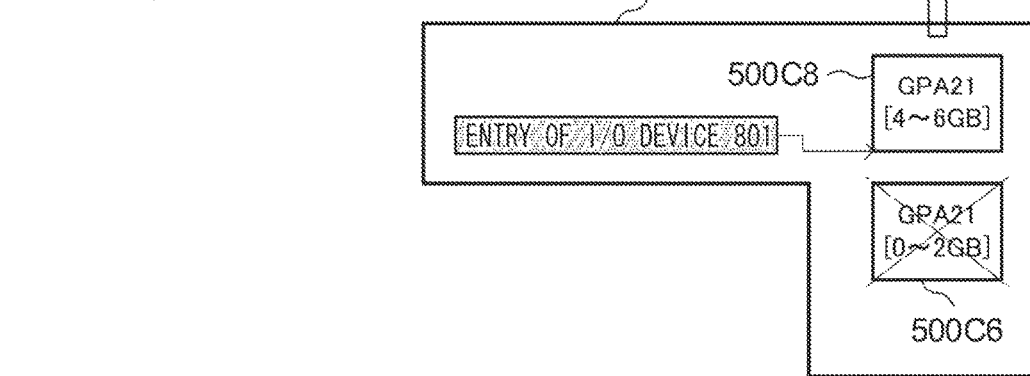

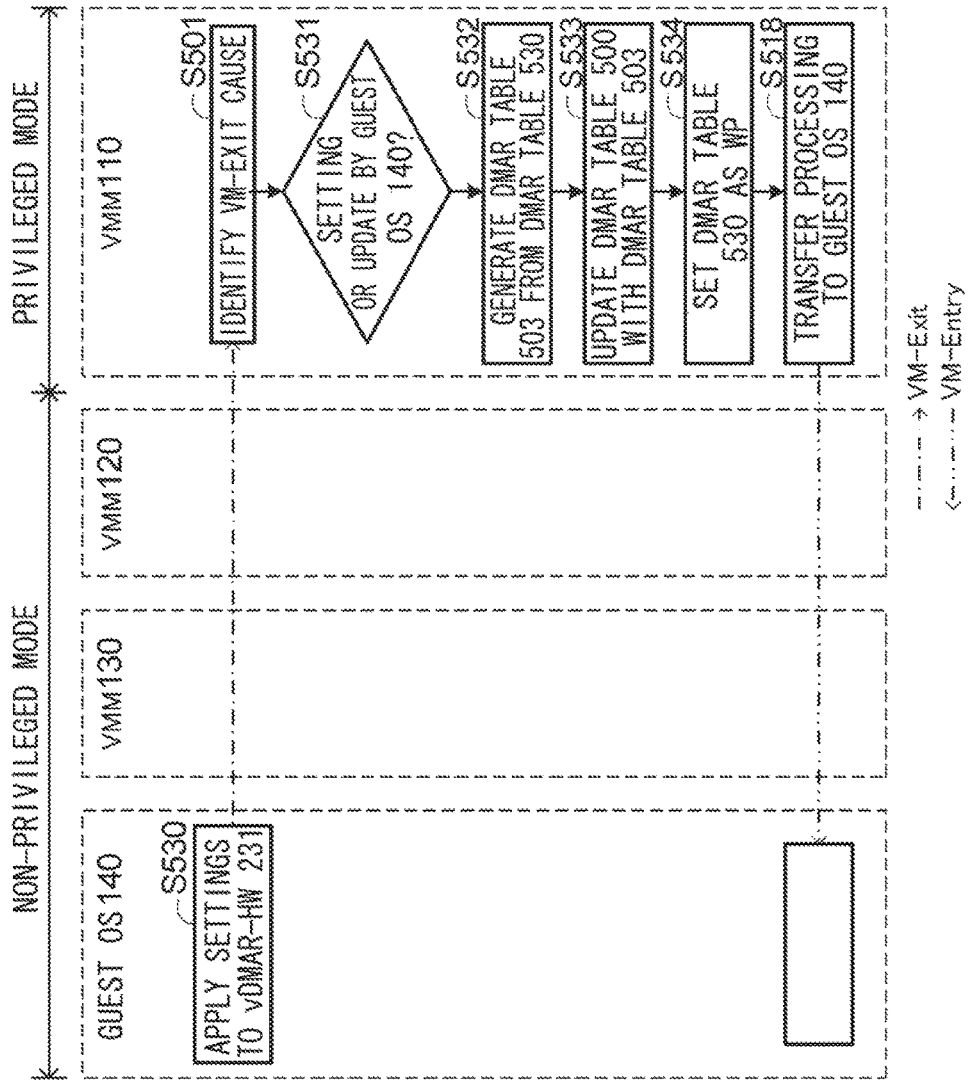

DEVICE AND METHOD FOR ADDRESS TRANSLATION SETTING IN NESTED VIRTUALIZATION ENVIRONMENT

CROSS-REFERENCE TO RELATED APPLICATION

This application is a continuation application of International Application No. PCT/JP2013/061805, filed on Apr. 22, 2013, the disclosure of which is incorporated herein by reference in its entirety.

FIELD

The embodiments discussed herein are related to an information processing device, an information processing method, and a recording medium storing an information processing program.

BACKGROUND

Nested virtualization technology has recently been proposed in virtualization technology that constructs a virtual computer (a virtual machine) on a computer. Nested virtualization technology is virtualization technology that runs a virtual machine on a virtual machine; for example, a basic input output system (BIOS) boots a virtual machine. In such technology, existing virtualization software (a virtual machine monitor), such as Xen (registered trademark), runs on that virtual machine.

Although virtual machine monitors that construct virtual machines basically perform processing using software, there are also virtual machine monitors that employ virtualization assistance mechanisms in which part of the processing of the virtual machine monitor is handled by hardware.

Technology has also been proposed in which hardware is used to virtualize and provide a virtualization assistance mechanism to a second level of virtualization in the nested virtualization technology described above. For example, virtualization technology has been proposed in which a CPU provided with a virtualization assistance mechanism operates in a normal mode and in a mode that provides the virtualization assistance mechanism. In such technology, a host virtual machine monitor (VMM) monitors a guest operating system (OS) when in the mode that provides the virtualization assistance mechanism. The operation mode of the CPU switches between a host mode in which the host VMM operates and a user mode in which a guest VMM or a user program operates. The host VMM emulates instructions from the guest VMM and the guest OS under specific conditions. A virtual CPU assigned to the virtual machine in which the guest OS operates is thereby made available to the guest OS such that the virtualization assistance mechanism is provided to the guest OS.

When an input/output (I/O) device assigned to the virtual machine accesses memory space, this is known as direct memory access (DMA). Technology known as DMA remapping (DMAR) has been proposed as a virtualization assistance mechanism that translates addresses of DMA by such an I/O device. Hardware that provides such a DMAR virtualization assistance mechanism is known as DMAR-hardware (DMAR-HW).

RELATED PATENT DOCUMENTS

Japanese Laid-Open Patent Publication No. 2009-3749

RELATED NON-PATENT DOCUMENTS

"Intel Virtualization Technology for Directed I/O Architecture Specification", online, published by Intel Corp., retrieved 19 Mar. 2013, Internet (URL: http://software.intel.com/en-us/articles/intel-virtualization-technology-for-directed-io-vt-d-enh ancing-intel-platforms-for-efficient-virtualization-of-io-devices)

SUMMARY

According to an aspect of the embodiments, an information processing device, includes a processor configured to execute a process. The process includes: identifying a cause of a shift from non-privileged mode to privileged mode that has occurred in processing by a guest program in an upper level virtual machine in a nested virtualization environment in which the upper level virtual machine is constructed by an upper level virtual machine monitor that operates on a virtual machine constructed by a first level virtual machine monitor, the first level virtual machine monitor operates in privileged mode, and the upper level virtual machine monitor and the guest program in the upper level virtual machine operate in non-privileged mode; and when the identified cause is setting or updating a virtual translation table employed in a virtual translation mechanism provided to the guest program by virtualizing an address translation mechanism for hardware that uses a set translation table to translate addresses of direct memory access (DMA) by an input/output device assigned to the upper level virtual machine, setting the translation table employed by the translation mechanism based on a correspondence relationship between guest memory space in which the virtual translation table and the guest program operate, and host memory space in which the first level virtual machine monitor operates.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 30 is a diagram illustrating updating of a DMAR table of the second exemplary embodiment;

FIG. 39 is a diagram explaining shifts between non-privileged mode and privileged mode in the third exemplary embodiment.

DESCRIPTION OF EMBODIMENTS

First, before explaining details of a first exemplary embodiment, explanation follows regarding issues associated with combining nested virtualization technology and direct memory access remapping hardware (DMAR-HW) virtualization technology as they are, under respective headings.

Outline of DMAR-HW

A guest operating system (OS) in a virtual machine (VM) constructed by a virtual machine monitor (VMM) assigns a memory resource in guest memory space to a utilized input/output (I/O) device. Translation from addresses in guest memory space (guest physical address (GPA)) to addresses in host memory space (host physical address (HPA)) is needed when the I/O device accesses the assigned memory resource. This translation is performed by DMAR, and hardware that performs DMAR is known as DMAR-HW.

Figure 1:
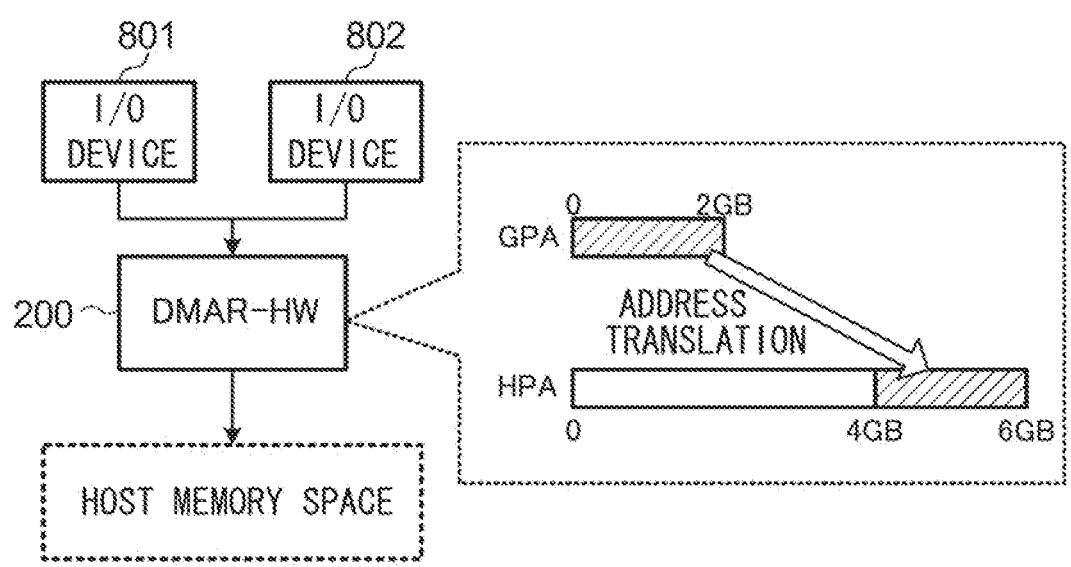
FIG. 1 is a schematic diagram illustrating address translation using DMAR-HW.

For example, as illustrated in FIG. 1, a region spanning from 0 GB to 2 GB in guest memory space is assigned to I/O devices 801, 802, and the region spanning from 0 GB to 2 GB in guest memory space corresponds to a region spanning from 4 GB to 6 GB in host memory space. The I/O device 801 or 802 accesses addresses within the region spanning from 0 GB to 2 GB in guest memory space. The address in guest memory space (GPA) accessed by the I/O device is then translated to an address in host memory space (HPA) by DMAR-HW 200.

A translation table (DMAR table) needs to be set in the DMAR-HW 200 to indicate what kind of translation to perform to translate addresses accessed by an I/O device from the GPA into the HPA. The translation table is generated in memory, and the first address thereof is set in a register of the DMAR-HW 200.

Figure 2:
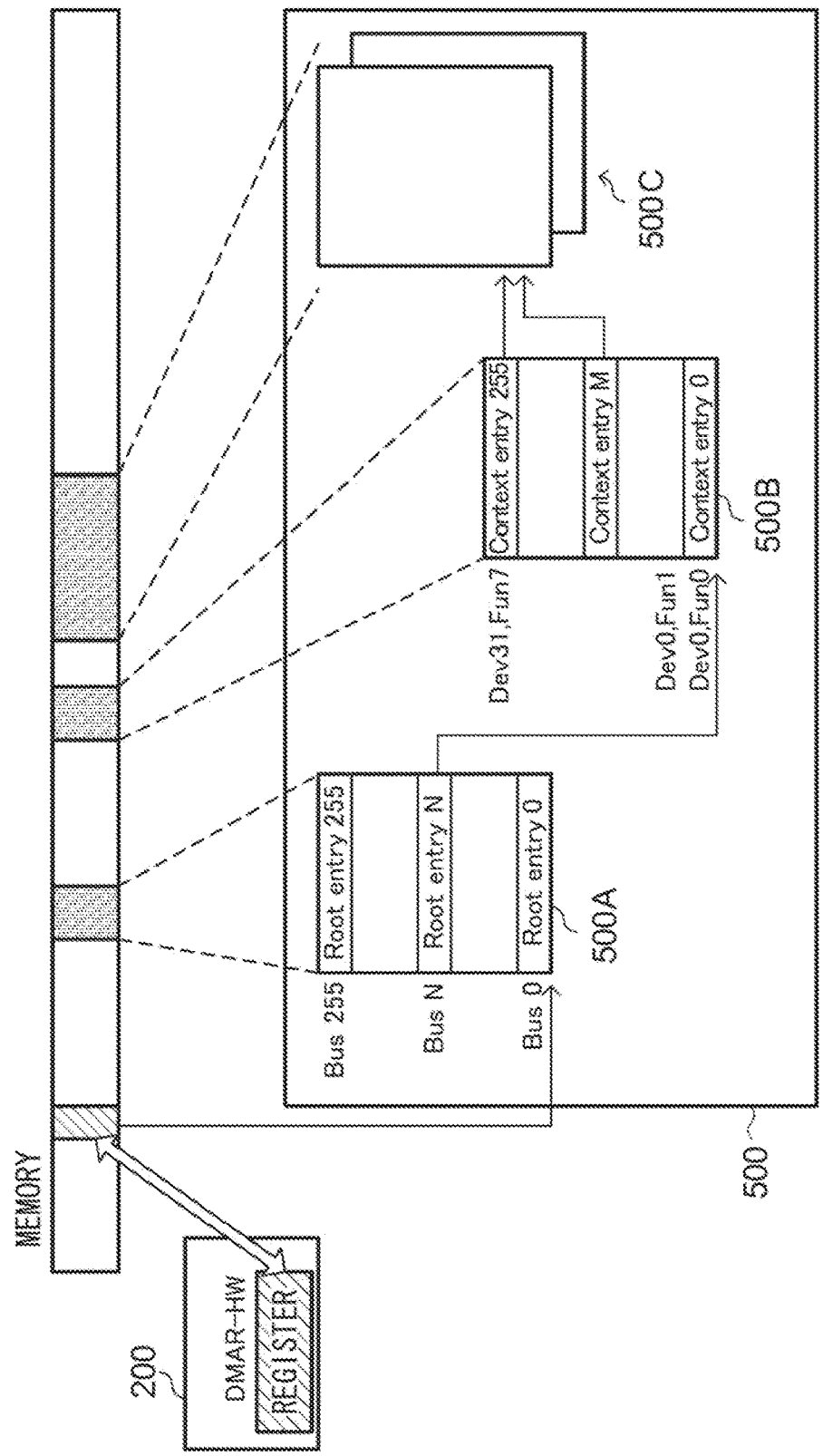
FIG. 2 is a diagram illustrating an example of a DMAR table.

For example, FIG. 2 illustrates a configuration example of a DMAR table 500 of a VT-d that is a virtualization assistance mechanism using Intel (registered trademark) DMAR-HW. In the example of FIG. 2, a register of the DMAR-HW 200 is mapped to a specific region in memory. Entries to the DMAR table 500 that corresponding to I/O devices include a bus number (Bus), a device number (Dev), and a function number (Fun). The DMAR table 500 has a mufti-level structure, and a first level root entry table 500A is sorted by the bus number of the I/O device, and a second level context entry table 500B is sorted by device number and function number of the I/O device. A third level and higher is referred to as an address translation table 500C, and translation methods for translating the GPA accessed by the I/O device into the HPA are set therein. When the same translation method is applied to plural I/O devices, address translation tables can be commonly employed.

Namely, the DMAR table 500 defines associations between entries corresponding to I/O devices, and GPA-HPA translation methods.

The DMAR-HW can directly assign an I/O device to a guest OS operating on a VM by translating the GPA to the HPA using such a translation table.

Note that the DMAR-HW can also be employed in ordinary OSs other than in VMMs. For example, when protection of a specific memory region is desired, the DMAR table may be set such that DMA to that region is not possible from I/O devices.

Virtualization of DMAR-HW

The VMM needs to virtualize the DMAR-HW and provide the virtualized DMAR-HW to the guest OS such that the guest OS operating on the VM can use the DMAR-HW. For example, a virtualization assistance mechanism of a CPU such as an Intel (registered trademark) VT-x can be employed in such virtualization.

Figure 3:
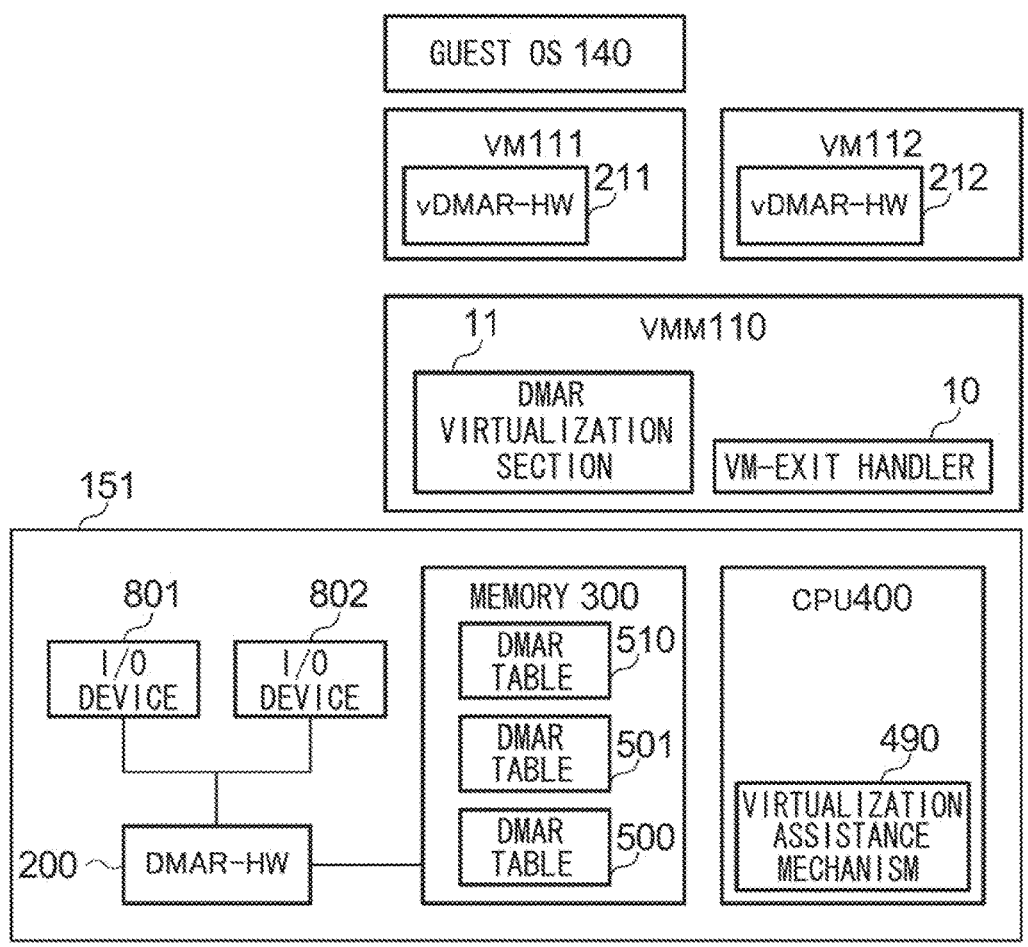
FIG. 3 is a configuration diagram illustrating an outline of virtualization of DMAR-HW.

FIG. 3 illustrates an example of virtualization of DMAR-HW implemented by an information processing device 151. The information processing device 151 includes a CPU 400, memory 300, the DMAR-HW 200, and the I/O devices 801, 802 that are hardware resources. The CPU 400 is provided with a virtualization assistance mechanism 490 that uses hardware such as an Intel (registered trademark) VT-x. In the information processing device 151, a VMM 110 is caused to operate, VMs 111, 112 are constructed, and a guest OS 140 is caused to operate on the VM 111.

The VMM 110 includes a VM-Exit handler 10, and a DMAR virtualization section 11. The DMAR virtualization section 11 virtualizes the DMAR-HW 200 and provides the virtualized DMAR-HW 200 to the VM 111, and the virtualized DMAR-HW 200 is made visible to the guest OS 140 as virtual DMAR-HW (vDMAR-HW) 211. Similarly, the VM 112 is provided with vDMAR-HW 212. Moreover, the DMAR virtualization section 11 monitors access to the register of the vDMAR-HW 211 by the guest OS 140. The register of the DMAR-HW 200 is mapped to a specific address in memory space, and the DMAR virtualization section 11 is therefore visible to the guest OS 140 such that the register of the vDMAR-HW 211 is also mapped to the same position. The virtualization assistance mechanism 490 of the CPU 400 is set to generate an exception when the guest OS 140 accesses the mapped register. The VM-Exit handler 10 identifies the cause when an exception is generated, and then calls the DMAR virtualization section 11 in cases caused by access to the mapped register by the guest OS 140.

The DMAR virtualization section 11 identifies the location of a DMAR table 510 generated by the guest OS 140, from an address that the guest OS 140 attempted to set in the register of the vDMAR-HW 211. The DMAR table 510 is a DMAR table set to the vDMAR-HW 211 when the guest OS 140 initializes an I/O device assigned by the VMM 110. The DMAR table 510 is generated in the GPA by the guest OS 140, and includes settings related to the region in the GPA space assigned to the I/O device. The VMM 110 generates a DMAR table 501 that is a table in which the contents of the DMAR table 510 are translated into the HPA space based on the method of translating addresses from the GPA space managed by the VMM 110 into the HPA space.

The DMAR table 500 is set for the DMAR-HW 200 in advance. For example, the I/O device 801 is allocated to the VM 111, and the I/O device 802 is allocated to the VM 112. In such cases, the DMAR table 500 includes settings for translating DMA by the I/O device 801 allocated to the VM 111, and settings for translating DMA by the I/O device 802 allocated to the VM 112.

The DMAR virtualization section 11 uses the contents of the DMAR table 501 to update settings in the DMAR table 500 that are related to the I/O device 801 allocated to the VM 111 in which the guest OS 140 operates. A description of the update method for the DMAR table is given below.

The DMAR virtualization section 11 uses the virtualization assistance mechanism 490 of the CPU 400 to set a region occupied by the DMAR table 510 to write protected (WP). This is for the purpose of detecting updates to the DMAR table 510 by the guest OS 140. Emulation is also possible that causes the content of the update to be reflected in the DMAR table 501 when an update to the DMAR table 510 is detected.

Figure 4:
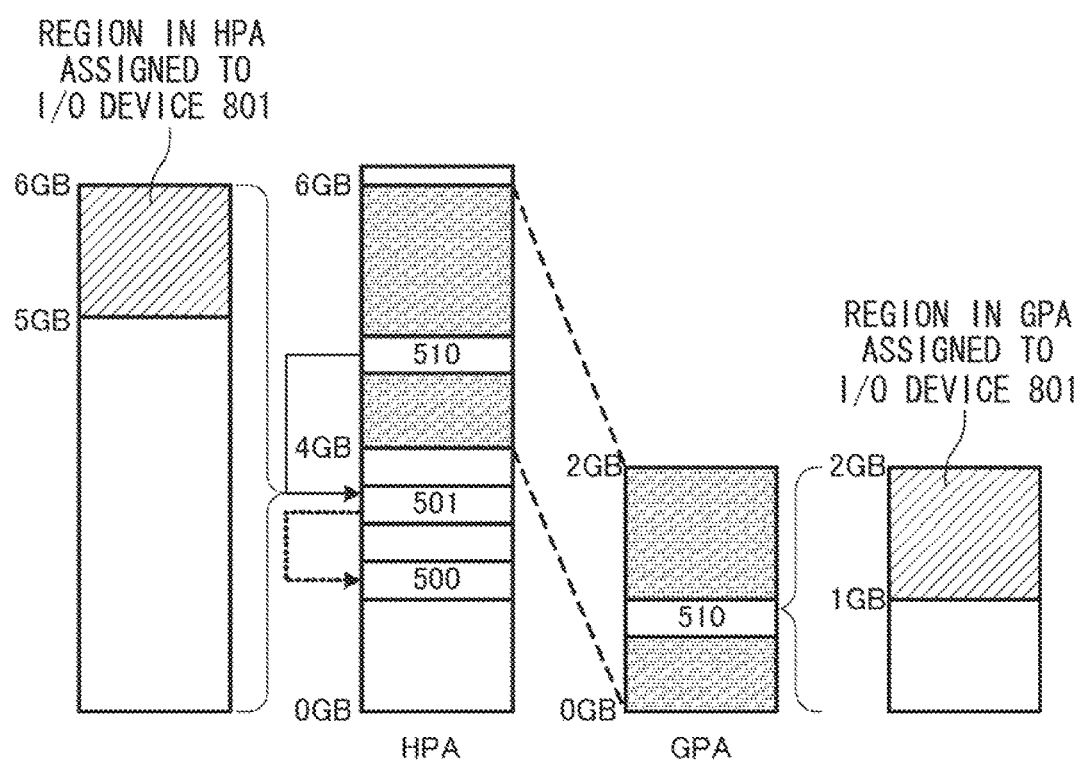
FIG. 4 is a diagram illustrating relationships in a DMAR table between a HPA and a GPA.

FIG. 4 illustrates relationships in the DMAR tables between the HPA and the GPA in the DMAR-HW virtualization illustrated in FIG. 3. In the example of FIG. 4, the address range of the HPA spanning from 4 GB to 6 GB is assigned as from 0 GB to 2 GB of the GPA. A setting stipulating that the address range of the GPA spanning from 1 GB to 2 GB is the region assigned to the I/O device 801 is included in the DMAR table 510 generated in the GPA by the guest OS 140. The DMAR table 501 is a table in which the DMAR table 510 has been translated into the HPA, and a setting stipulating that the address range of the HPA spanning from 5 GB to 6 GB is the region assigned to the I/O device 801 is included in the DMAR table 501. The preset (initial state) DMAR table 500 is updated based on the DMAR table 501 that is translated in this manner.

DMAR Table Updates

Figure 5:
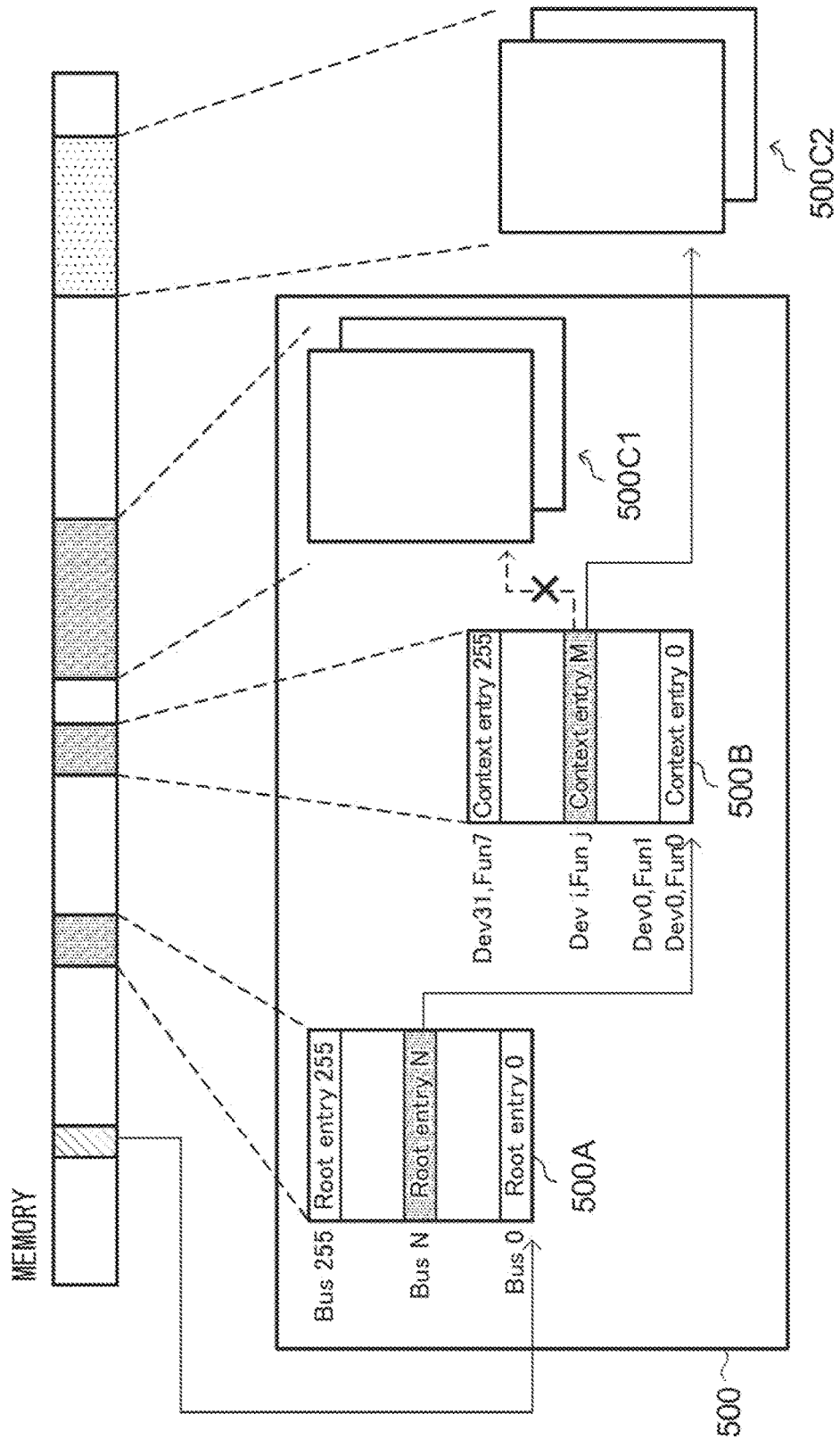
FIG. 5 is a diagram for explaining updates to a DMAR table.

FIG. 5 illustrates an example of updating the DMAR table 500. For example, entries corresponding to the I/O device 801 are composed of a bus number (Bus) N, a device number (Dev) i, and a function number (Fun) j. The bus number N corresponds to the root entry N of the root entry table 500A, and the device number i and the function number j correspond to the context entry M of the context entry table 500B corresponding to the root entry N. In the initial state of the DMAR table 500, these entries are references to an address translation table 500C1. In such cases, an address translation table 500C2 is configured by a table in which the settings that the guest OS 140 has applied for the I/O device 801 in a portion of the DMAR table 501 are translated into the HPA. The DMAR table 500 is updated by modifying references to the entries of the root entry N and the context entry M, namely, the entries for the I/O device 801, from the address translation table 500C1 into the address translation table 500C2.

Operation of Virtualization Assistance Mechanism of CPU in Nested Virtualization Configuration For example, in VT-x, which is a virtualization assistance mechanism of an Intel (registered trademark) CPU, two operation modes are provided: a CPU privileged mode and a non-privileged mode. While the CPU is in non-privileged mode, usable functionality is restricted, and if unpermitted processing such as execution of a privileged instruction is performed, an exception is generated and a shift is made to privileged mode. While the CPU is in privileged mode, all privileged instructions can be executed, and privileged mode handles the role of monitoring and catching exceptions raised in non-privileged mode. Shifting of the operation mode of the CPU from privileged mode to non-privileged mode is known as VM-Entry, and shifting of the operation mode of the CPU from non-privileged mode to privileged mode is known as VM-Exit.

Figure 6:
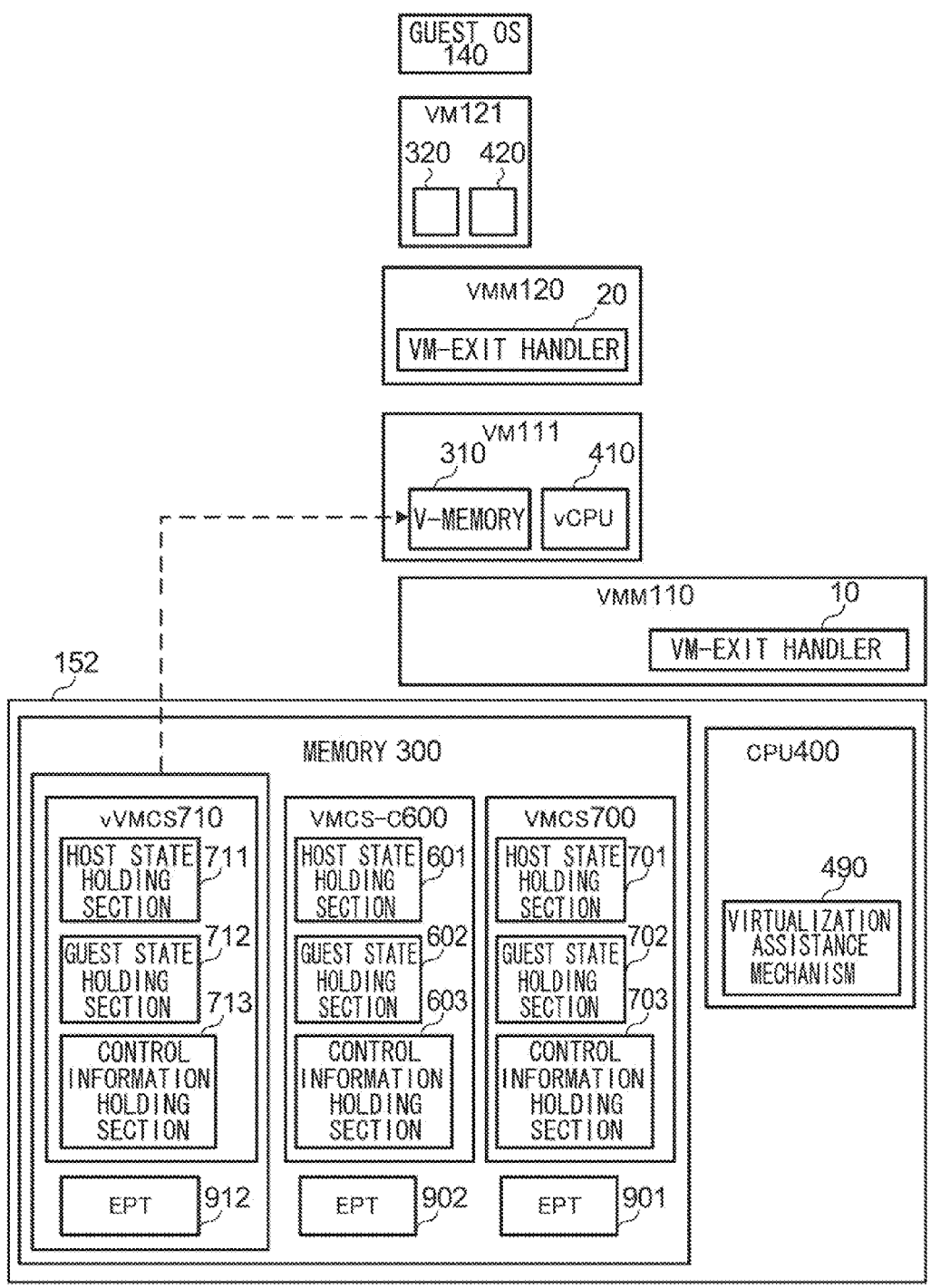
FIG. 6 is a configuration diagram illustrating an outline of a virtualization assistance mechanism of a CPU in a nested virtualization configuration.

FIG. 6 illustrates an example of nested virtualization implemented by an information processing device 152. Note that portions corresponding to those in the example of DMAR-HW virtualization of conventional technology illustrated in FIG. 3 are allocated the same reference numbers, and detailed explanation thereof is omitted.

The information processing device 152 includes a CPU 400 and memory 300 that are hardware resources. A VMM 110 is caused to operate at a first level, and a VM 111 is constructed at the first level in the information processing device 152. Moreover, a second level VMM 120 is caused to operate, and a second level VM 121 is constructed on the VM 111, and a guest OS 140 is caused to operate on the VM 121. The VMM 110 operates in privileged mode, and the VMM 120 and the guest OS 140 operate in non-privileged mode. Note that host memory space in which the VMM 110 operates is the HPA, guest memory space in which the VMM 120 operates is GPA1, and guest memory space in which the guest OS 140 operates is GPA2.

Moreover, v-memory (virtual memory) 310 and a vCPU (virtual CPU) 410 are assigned to the VM 111. Moreover, v-memory (virtual memory) 320 and a vCPU (virtual CPU) 420 are assigned to the VM 121.

Similarly to in the case of FIG. 3, the CPU 400 includes a virtualization assistance mechanism 490 that uses hardware such as an Intel (registered trademark) VT-x. In the VI-x, a region that holds a CPU state, known as a virtual machine control structure (VMCS), is generated in memory, the address of the VMCS is referenced by the virtualization assistance mechanism 490, and the VT-x manages the state of the CPU 400 (privileged mode, non-privileged mode, etc.).

A VMCS 700 includes a host state holding section 701 that holds a state of the host operating in privileged mode, a guest state holding section 702 that holds a state of the guest operating in non-privileged mode, and a control information holding section 703 that holds control information such as other settings and states.

When VM-Entry, which is a shift from privileged mode to non-privileged mode, occurs, the state of the CPU 400 for the host is held in the host state holding section 701, and the contents held in the guest state holding section 702 are loaded to the CPU 400. When VM-Exit, which is a shift from non-privileged mode to privileged mode, occurs, the state of the CPU for the guest (the vCPU 410) is held in the guest state holding section 702, and the contents held in the host state holding section 701 are loaded to the CPU 400. Moreover, settings are applied in the control information holding section 703 to stipulate, for example, what causes VM-Exit, and to identify the cause in the case of actual VM-Exit, and to set an extended page table (EPT) that performs GPA-HPA translation for the CPU, described below, and the like.

In nested virtualization, there is a virtual (v)VMCS for holding the state of the vCPU 410 assigned to the VM 111. The vVMCS 710 is provided to the v-memory 310 assigned to the VM 111, and similarly to the VMCS 700, includes a host state holding section 711, a guest state holding section 712, and a control information holding section 713. The state of the vCPU 410 that causes the VMM 120 to operate is retained in the host state holding section 711 of the vVMCS 710, and the state of the vCPU 420 that causes the guest OS 140 to 16 operate is retained in the guest state holding section 712.

A VMCS-C 600 that is a data saving region for the VMCS 700 is placed in the memory 300. Similarly to the VMCS 700, the VMCS-C 600 also includes a host state holding section 601, a guest state holding section 602, and a control information holding section 603. Description follows regarding how the VMCS-C 600 is used.

VMREAD instructions and VMWRITE instructions that are privileged instructions are employed when executing reading and writing of the VMCS. For example, a VMWRITE instruction is executed when the second level VMM 120 applies settings in the guest state holding section 712 of the vVMCS 710 that cause the guest OS 140 to operate. However, if the VMM 120 operating in non-privileged mode attempts to execute the VMWRITE instruction, which is a privileged instruction, an exception is generated, VM-Exit occurs, and processing transfers to the VMM 110. The VMM 110 identifies execution of the VMWRITE instruction as the cause of the VM-Exit (referred to as the VM-Exit cause). The contents that the VMWRITE instruction attempted to write are then reflected in the guest state holding section 712 of the vVMCS 710, VM-Entry occurs, and processing returns to the VMM 120.

When processing returns to the VMM 120, a VM-Entry instruction is executed in the VMM 120 to transfer processing to the guest OS 140. However, when the VMM 120 operating in non-privileged mode attempts to execute the VM-Entry instruction, which is a privileged instruction, an exception is generated, and VM-Exit to the VMM 110 occurs.

The VMM 110 identifies execution of the VM-Entry instruction as the VM-Exit cause, and copies the state of the vCPU 410 held in the guest state holding section 702 of the VMCS 700 to the host state holding section 711 of the vVMCS 710. The state of the vCPU 420 held in the guest state holding section 712 of the vVMCS 710 is then set in the guest state holding section 702 of the VMCS 700.

Next, the settings that were monitoring and controlling the VMM 120 held in the control information holding section 703 of the VMCS 700 are saved in the control information holding section 603 of the VMCS-C 600. The settings for monitoring and controlling the guest OS 140 are then set in the control information holding section 703 of the VMCS 700. These settings are generated from settings used by the VMM 110 to monitor and control the VMM 120 holds in the control information holding section 603 of the VMCS-C 600, and from settings used by the VMM 120 to monitor and control the guest OS 140 holds in the control information holding section 713 of the vVMCS 710.

Explanation follows regarding a reason for generating the settings used by the VMM 110 to monitor and control the guest OS 140 by combining the settings used by the VMM 110 to monitor and control the VMM 120 with the settings used by the VMM 120 to monitor and control the guest OS 140. For example, the VMM 110 virtualizes a specific hardware resource, which is then made visible to the VMM 120. In order to emulate the hardware resource, the VMM 110 applies settings in the control information holding section 703 of the VMCS 700 such that VM-Exit occurs when the VMM 120 accesses the hardware resource. However, the VMM 120 makes the hardware resource visible as it is to the guest OS 140, without virtualization. Thereby settings such that VM-Exit occurs are not made in the control information holding section 713 of the vVMCS 710, even when the guest OS 140 accesses the hardware resource. However, settings such that VM-Exit occurs need to be made when the guest OS 140 accesses the hardware resource, since it is the VMM 110 that actually monitors and controls the guest OS 140. The settings used by the VMM 110 to monitor and control the guest OS 140 are therefore generated from the settings used by the VMM 110 to monitor and control the VMM 120, and from the settings used by the VMM 120 to monitor and control the guest OS 140.

When the above processing ends, the VMM 110 executes the VM-Entry instruction, and processing is transferred to the guest OS 140.

Conversely, when exceptions are generated by the guest OS 140, VM-Exit occurs and processing returns to the VMM 110. The VMM 110 identifies the cause of the VM-Exit, and references the control information holding section 713 of the vVMCS 710 for the VM-Exit cause set as the cause of the VM-Exit to be processed by the VMM 120. When there has been a VM-Exit cause to be processed by the VMM 120, processing transfers to the VMM 120, and the VMM 120 is caused to process the exception (processing according to the VM-Exit cause).

In order to pass the exception to the VMM 120, the state of the vCPU 420 held in the guest state holding section 702 is copied to the guest state holding section 712 of the vVMCS 710. The state of the vCPU 410 held in the host state holding section 711 of the vVMCS 710 is then set in the guest state holding section 702 of the VMCS 700. The settings that were saved in the control information holding section 603 and information related to the VM-Exit are set in the control information holding section 703 of the VMCS 700. Finally, the VM-Entry instruction is executed and processing is transferred to the VMM 120.

The VMM 120 determines that processing that performs VM-Exit from the guest OS 140 was transferred due to VM-Entry from the VMM 110, and processing is performed according to the VM-Exit cause. When this processing completes, settings are made in the vVMCS 710, and the VM-Entry instructions are executed, in order to return processing to the guest OS 140. This is carried out using emulation by the VMM 110, as already explained.

A state shift between the second level VMM 120 and the guest OS 140 is performed once via the first level VMM 110 in this manner.

CPU GPA-HPA Translation

The virtualization assistance mechanism of the CPU prepares a GPA-HPA translation function for memory access by the CPU. Similarly to the DMAR, the GPA-HPA translation by the CPU is performed using a translation table. In addition to GPA-HPA translation, the translation table also applies memory attribute settings such as setting a specific region of the GPA to WP. For example, in the VT-x that is an Intel (registered trademark) CPU virtualization assistance mechanism, the translation table is known as the EPT (extended page table). A place for storing the EPT is prepared in the control information holding section 703 of the VMCS 700.

When the VMM 110 runs the VM 111, an EPT 901, which is a table for translating between GPA1 addresses of the guest memory space of the VM 111 and HPA addresses of the host memory space of the VM 111, is generated and set in the control information holding section 703 of the VMCS 700. When the VMM 120 runs the VM 121, an EPT 912, which is a table for translating between GPA2 addresses of the guest memory space of the VM 121 and guest memory space GPA1 of the VMM 120, is generated set in the control information holding section 713 of the vVMCS 710.

The VMM 110 can generate an EPT 902, which is a GPA2-HPA translation table, from the EPT 901 that is a GPA1-HPA translation table, and from the EPT 912 that is a GPA2-GPA1 translation table. Namely, the EPT 902 becomes the translation table set in the control information holding section 703 when VM-Entry from the VMM 110 to the guest OS 140 occurs.

Nested Virtualization of DMAR-HW

Nested virtualization of the DMAR-HW can be implemented by combining the DMAR-HW virtualization at the first level as described above with nested virtualization of the virtualization assistance mechanism of the CPU.

Figure 7:
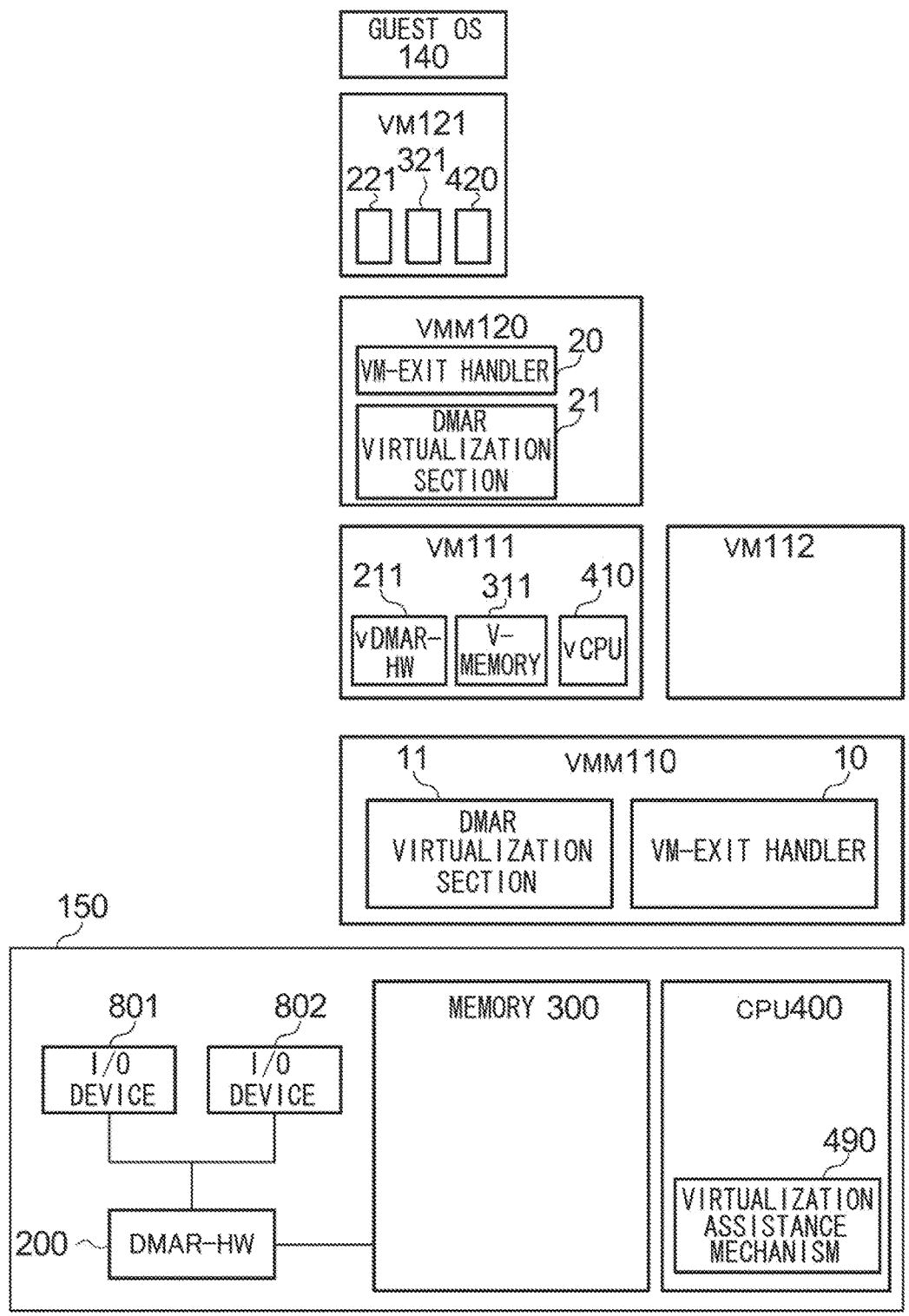
FIG. 7 is a configuration diagram illustrating an outline of the comparative example.

FIG. 7 illustrates an example of nested virtualization of DMAR-HW in a case that combines, as they are, nested virtualization of conventional technology and DMAR-HW virtualization. Portions corresponding to those of the conventional DMAR-HW virtualization illustrated in FIG. 3 or those of the example of nested virtualization illustrated in FIG. 6 are allocated the same reference numerals, and detailed explanation thereof is omitted. The configuration illustrated in FIG. 7 is referred to as a comparative example below.

An information processing device 150 according to the comparative example of FIG. 7 includes a CPU 400, memory 300, DMAR-HW 200, and I/O devices 801, 802 that are hardware resources. A first level VMM 110 is caused to operate, and first level VMs 111, 112 are constructed in the information processing device 150. Moreover, a second level VMM 120 is caused to operate on the VM 111, and a second level VM 121 is constructed, and a guest OS 140 is caused to operate on the VM 121. The host memory space in which the VMM 110 operates is HPA, the guest memory space in which the VMM 120 operates is GPA1, and the guest memory space in which the guest OS 140 operates is GPA2.

The VM 111 is provided with vDMAR-HW 211, and is assigned v-memory 311 and a vCPU 410. Moreover, the VM 121 is provided with vDMAR-HW 221, and assigned v-memory 321 and a vCPU 420.

Figure 8:
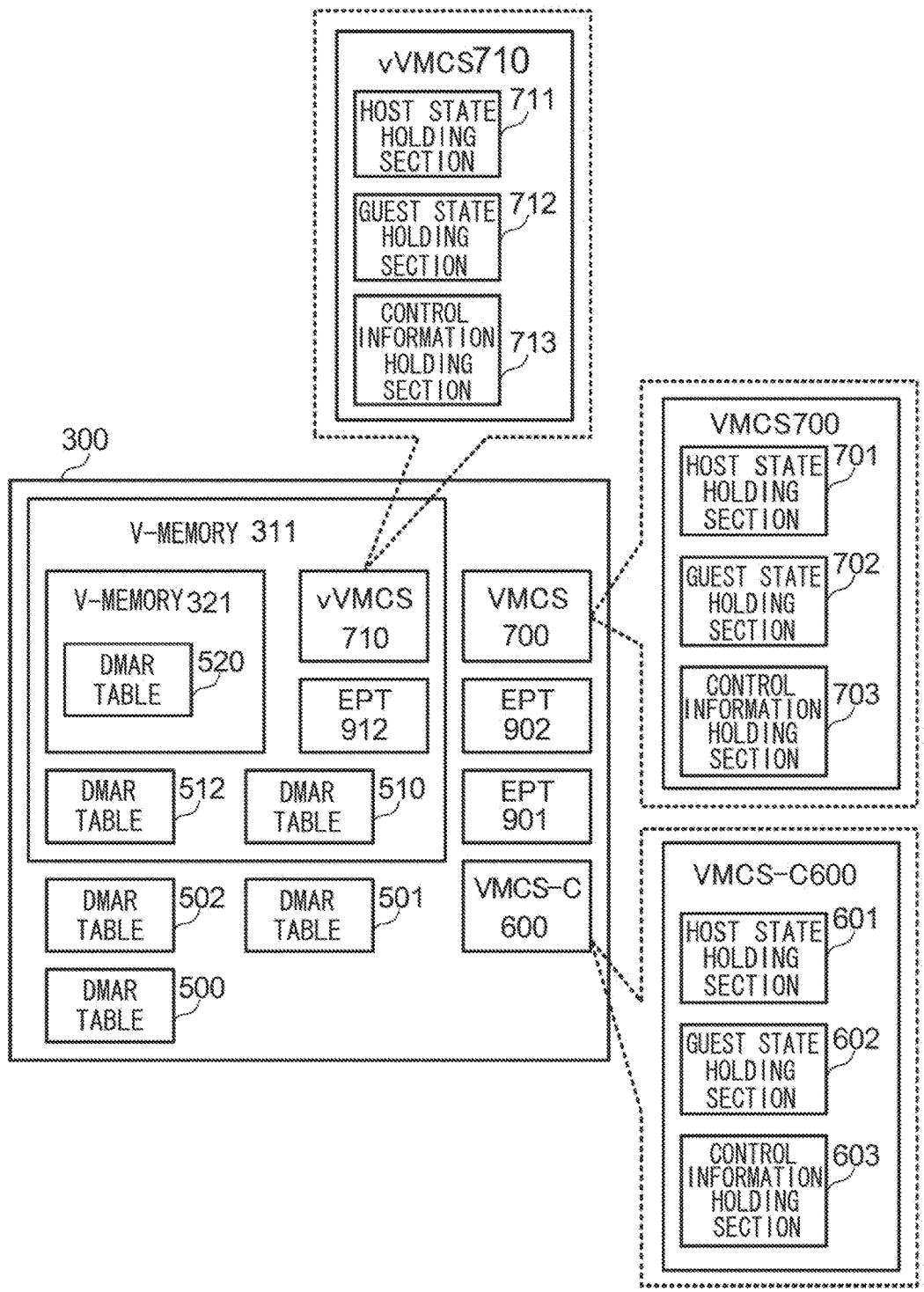
FIG. 8 is a schematic diagram illustrating a memory configuration of the comparative example.

FIG. 8 illustrates an example of a configuration of the memory 300 of the configuration of FIG. 7. A region of the memory 300 assigned to the v-memory 311 includes a region assigned to the v-memory 321. A GPA2 based DMAR table 520, generated by the guest OS 140, is stored in the region assigned to the v-memory 321. A DMAR table 512 that is the DMAR table 520 translated into a GPA1 based table, and a DMAR table 510 based on GPA1 generated by the VMM 120, are stored in a region assigned to the v-memory 311. A vVMCS 710 that holds the state of the vCPU 410, and the EPT 912 that is a GPA2-GPA1 translation table, are also stored in the region assigned to the v-memory 311. A DMAR table 500 generated by the VMM 110 based on HPA, a DMAR table 501 that is the DMAR table 510 translated to a HPA based table, and a DMAR table 502 that is the DMAR table 520 translated to a HPA based table, are stored in the memory 300. A VMCS 700 that holds the state of the CPU 400, and a VMCS-C 600 that saves the states of the VMCS 700, are also stored in the memory 300. An EPT 901, which is a GPA1-HPA translation table, and an EPT 902, which is a GPA2-HPA translation table, are also stored in the memory 300.

Figure 9:
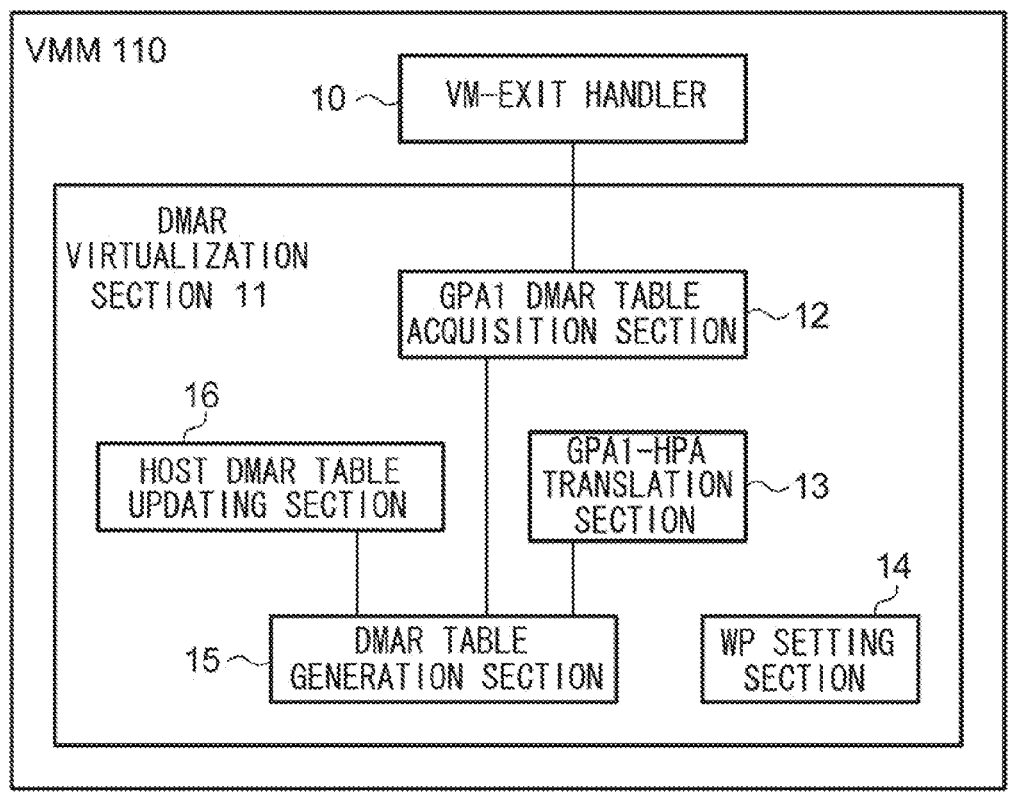
FIG. 9 is a functional block diagram of a VMM of the comparative example.

As illustrated in FIG. 7, the VMM 110 includes a VM-Exit handler 10 and a DMAR virtualization section 11. Moreover, as illustrated in FIG. 9, the DMAR virtualization section 11 includes a GPA1 DMAR table acquisition section 12, a GPA1-HPA translation section 13, a WP setting section 14, a DMAR table generation section 15, and a host DMAR table updating section 16. Similarly, the VMM 120 also includes a VM-Exit handler 20 and a DMAR virtualization section 21, and is provided with similar functionality to the VM-Exit handler 10 and the DMAR virtualization section 11 of the VMM 110.

The VM-Exit handler 10 catches VM-Exits from the guest OS 140 or the VMM 120, identifies the VM-Exit cause, and performs processing according to the VM-Exit cause. Processing according to the VM-Exit cause is, for example, applying settings to a VMCS when VM-Entry to the guest OS 140 or the VMM 120 occurs. When the VMM 120 modifies the EPT 912 in order to set a region of the DMAR table 520 generated by the guest OS 140 as WP, the VM-Exit handler 10 reflects the contents of the modification in the EPT 902.

The GPA1 DMAR table acquisition section 12 acquires the DMAR table 510 and the DMAR table 512 managed by the VMM 120. The GPA1-HPA translation section 13 translates the GPA1 into the HPA. The WP setting section 14 sets the regions of the DMAR tables 510, 512 as WP. The DMAR table generation section 15 generates a DMAR table that is a table in which the DMAR table acquired by the GPA1 DMAR table acquisition section 12 is GPA1-HPA translated. The host DMAR table updating section 16 updates the DMAR table 500 using the content of the DMAR table generated by the DMAR table generation section 15.

Figure 10:
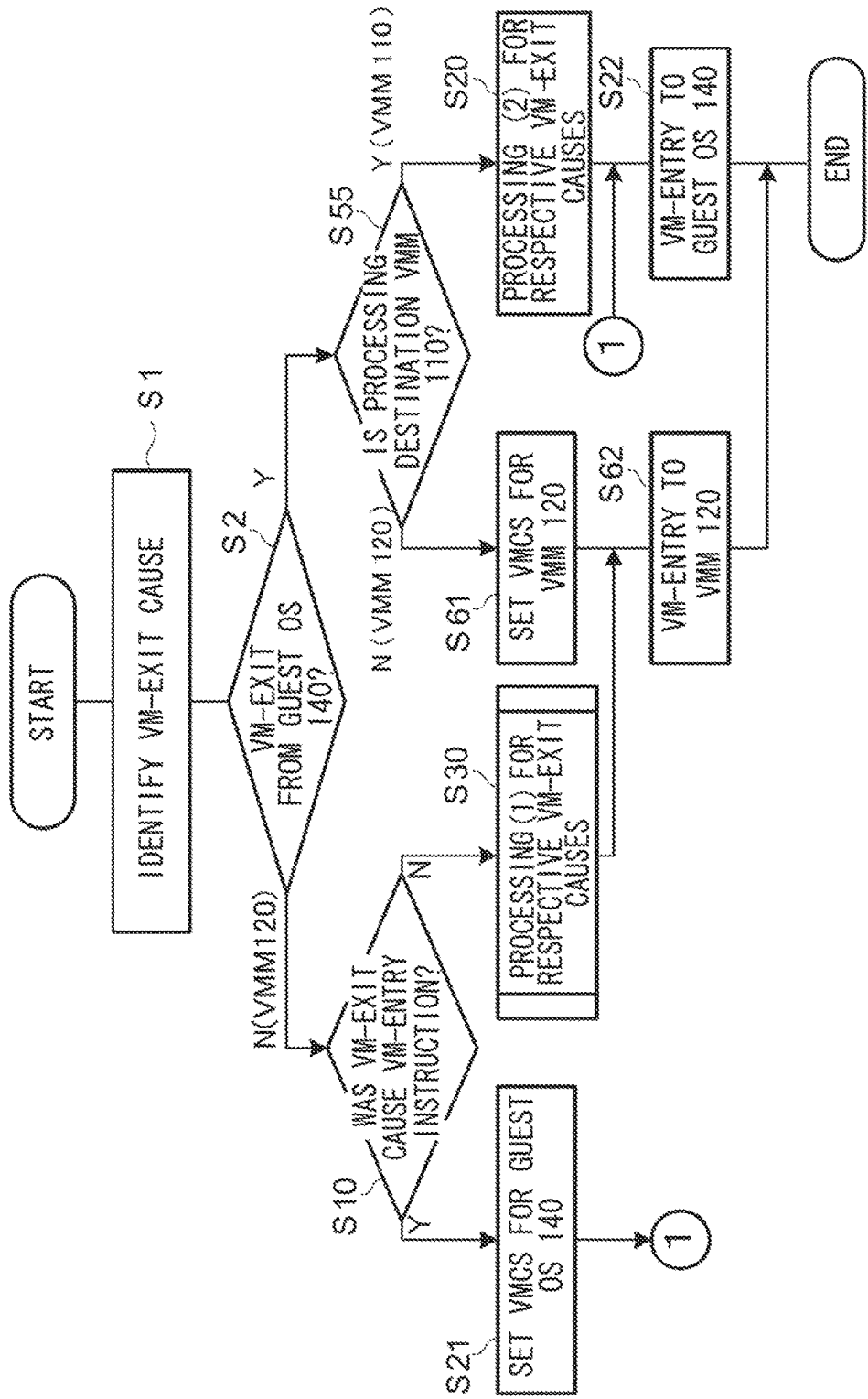
FIG. 10 is a flowchart illustrating processing of a VM-Exit handler of the comparative example.
Figure 11:
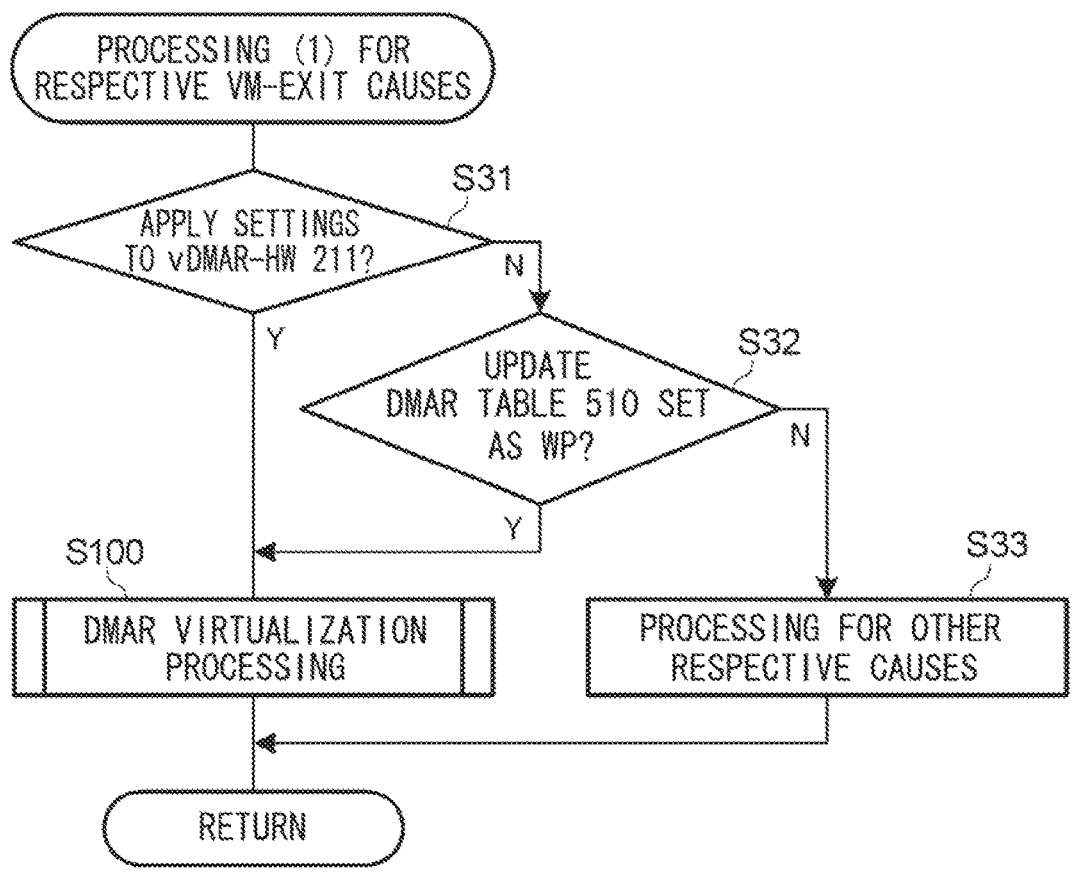
FIG. 11 is a flowchart illustrating processing for respective VM-Exit causes of the comparative example.
Figure 12:
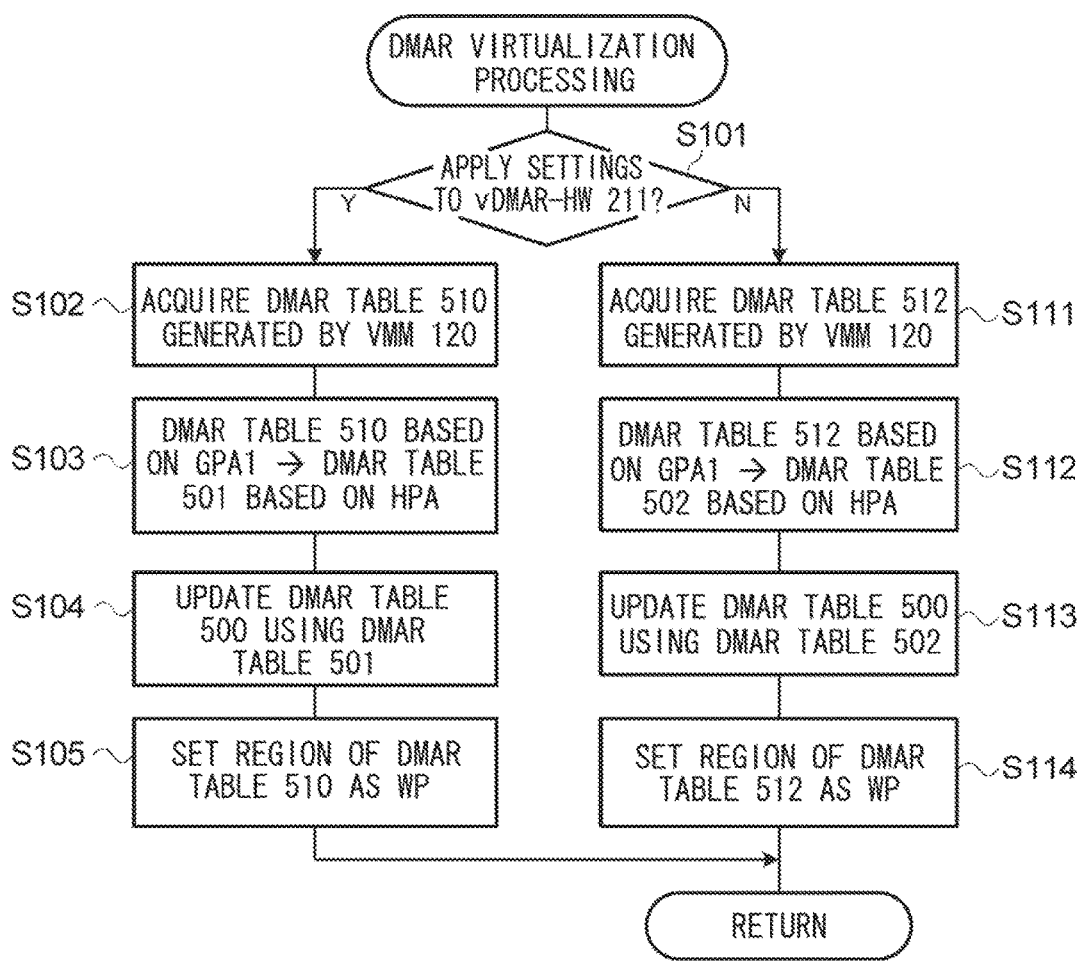
FIG. 12 is a flowchart illustrating DMAR virtualization processing of the comparative example.

Explanation next follows regarding processing for nested virtualization of DMAR-HW of a comparative example, with reference to FIG. 10 to FIG. 12. FIG. 10 illustrates a flow of processing according to the VM-Exit handler 10. FIG. 1 illustrates a flow of processing (1) for respective VM-Exit causes in the flow of processing by the VM-Exit handler 10. FIG. 12 illustrates a flow of processing for DMAR virtualization by the DMAR virtualization section 11.

At step S1 of the flow of processing of the VM-Exit handler 10 illustrated in FIG. 10, the VM-Exit handler 10 identifies the cause of VM-Exit from the guest OS 140 or the VMM 120 by referencing the VM-Exit cause automatically stored in the control information holding section 703 of the VMCS 700 by the virtualization assistance mechanism 490. For example, when the DMAR table 520 is set for the vDMAR-HW 221, the guest OS 140 accesses an address mapped by a register of the vDMAR-HW 221. The EPT 902 is set in advance such that access to this address causes an exception to be generated. Thus, when the VM-Exit cause is an exception indicating access to a specific address, the address that raised the exception is acquired from information retained in the control information holding section 703 of the VMCS 700, and "applying settings to the vDMAR-HW" can be determined if the address matches the address mapped by the register of the vDMAR-HW 221.

Next, at step S2, the VM-Exit handler 10 determines whether the caught VM-Exit is VM-Exit from the guest OS 140, or VM-Exit from the VMM 120. The process transitions to step S55 when the VM-Exit is from the guest OS 140, and the process transitions to step S10 when the VM-Exit is from the VMM 120.

At step S55, the VM-Exit handler 10 determines whether processing according to the VM-Exit cause is to be performed by the VMM 110 as is, or to be delegated to the VMM 120, namely, determines the processing destination. VM-Exit causes to be processed by the VMM 120 are set in the control information holding section 713 of the vVMCS 710 in advance, and the determination is made by referencing these settings. The process transitions to step S20 when the VM-Exit cause is to be processed by the VMM 110, and the process transitions to step S61 when the VM-Exit cause is to be processed by the VMM 120.

At step S61, the VM-Exit handler 10 applies various settings to the VMCS to transfer processing to the VMM 120. Next, at step S62, the VM-Exit handler 10 performs VM-Entry to the VMM 120 to transfer processing to the VMM 120.

At step S20, the VM-Exit handler 10 executes processing (2) for respective VM-Exit causes. The processing (2) for respective VM-Exit causes is processing to be performed by the VMM 110, such as processing of reading and writing values to the register and execution of instructions. When the processing (2) for respective VM-Exit causes finishes, the process transitions to step S22, and the VM-Exit handler 10 performs VM-Entry to the guest OS 140 in order to return processing to the guest OS 140.

At step S10, the VM-Exit handler 10 determines whether or not the VM-Exit cause identified at step S1 was a VM-Entry instruction. When the VM-Exit cause is a VM-Entry instruction, the process transitions to step S21, and the VM-Exit handler 10 applies various settings to the VMCS to transfer processing to the guest OS 140. Next, at step S22, the VM-Exit handler 10 performs VM-Entry to the guest OS 140 to transfer processing to the guest OS 140.

At step S10, in cases in which the VM-Exit handler 10 determines that the VM-Exit cause was not a VM-Entry instruction, the process transitions to step S30, and the processing (1) for respective VM-Exit causes illustrated in FIG. 11 is executed.

At step S31 of the processing (1) for respective VM-Exit causes illustrated in FIG. 11, the VM-Exit handler 10 determines whether or not the VM-Exit cause is application of settings to the vDMAR-HW 211. The process transitions to step S100 when the VM-Exit cause is application of setting to the vDMAR-HW 211, and the process transitions to step S32 when the VM-Exit cause is not application of settings to the vDMAR-HW 211.

At step S32, the VM-Exit handler 10 determines whether or not the VM-Exit cause was an update to the DMAR table 510 that was set as WP. The process transitions to step S100 when the VM-Exit cause is an update to the DMAR table 510 that was set as WP, and the process transitions to step S33 when the VM-Exit cause is not an update to the DMAR table 510 that was set as WP.

At step S100, the DMAR virtualization section 11 executes the DMAR virtualization processing illustrated in FIG. 12.

At step S101 of the DMAR virtualization processing illustrated in FIG. 12, the VM-Exit handler 10 determines whether or not the VM-Exit cause is application of settings to the vDMAR-HW 211. The process transitions to step S102 when the VM-Exit cause is application of settings to the vDMAR-HW 211, and the process transitions to step S111 when the VM-Exit cause is an update to the DMAR table 510 that was set as WP.

At step S102, the GPA1 DMAR table acquisition section 12 acquires the DMAR table 510 generated by the VMM 120. The DMAR table 510 has been generated based on the (GPA1. At the next step S103, the DMAR table generation section 15 uses the GPA1-HPA translation section 13 to generate the DMAR table 501 that is the DMAR table 510 based on the GPA1 translated into a table based on the HPA.

Next, at step S104, the host DMAR table updating section 16 uses the contents of the DMAR table 501 to update settings in the DMAR table 500 for the I/O device 801. At step S105, the WP setting section 14 reflects the WP setting of the memory region storing the DMAR table 510 in the EPT 901 that performs GPA1-HPA translation of the CPU 400, so that updates to the DMAR table 510 by the VMM 120 are detectable. When setting has completed, processing returns to the processing (1) for respective VM-Exit causes illustrated in FIG. 11.

At step S111, the GPA1 DMAR table acquisition section 12 acquires the DMAR table 512 generated by the VMM 120. The DMAR table 512 has been generated based on the GPA1. At the next step S112, the DMAR table generation section 15 uses the GPA1-HPA translation section 13 to generate the DMAR table 502 that is the DMAR table 512 based on the GPA1 translated into a table based on the HPA.

Next, at step S113, the host DMAR table updating section 16 uses the content of the DMAR table 502 to update settings in the DMAR table 500 for the I/O device 801. Next, at step S114, the WP setting section 14 reflects the WP setting of the memory region storing the DMAR table 512 in the EPT 901, which performs GPA1-HPA translation of the CPU 400, so that updates to the DMAR table 512 by the VMM 120 are detectable. When the setting has completed, the process returns to the processing (1) for respective VM-Exit causes illustrated in FIG. 11.

When negative determination is made at step S32, the process transitions to step S33, the VM-Exit handler 10 executes processing according to the VM-Exit cause, and the process returns to processing by the VM-Exit handler 10 illustrated in FIG. 10.

Figure 13:
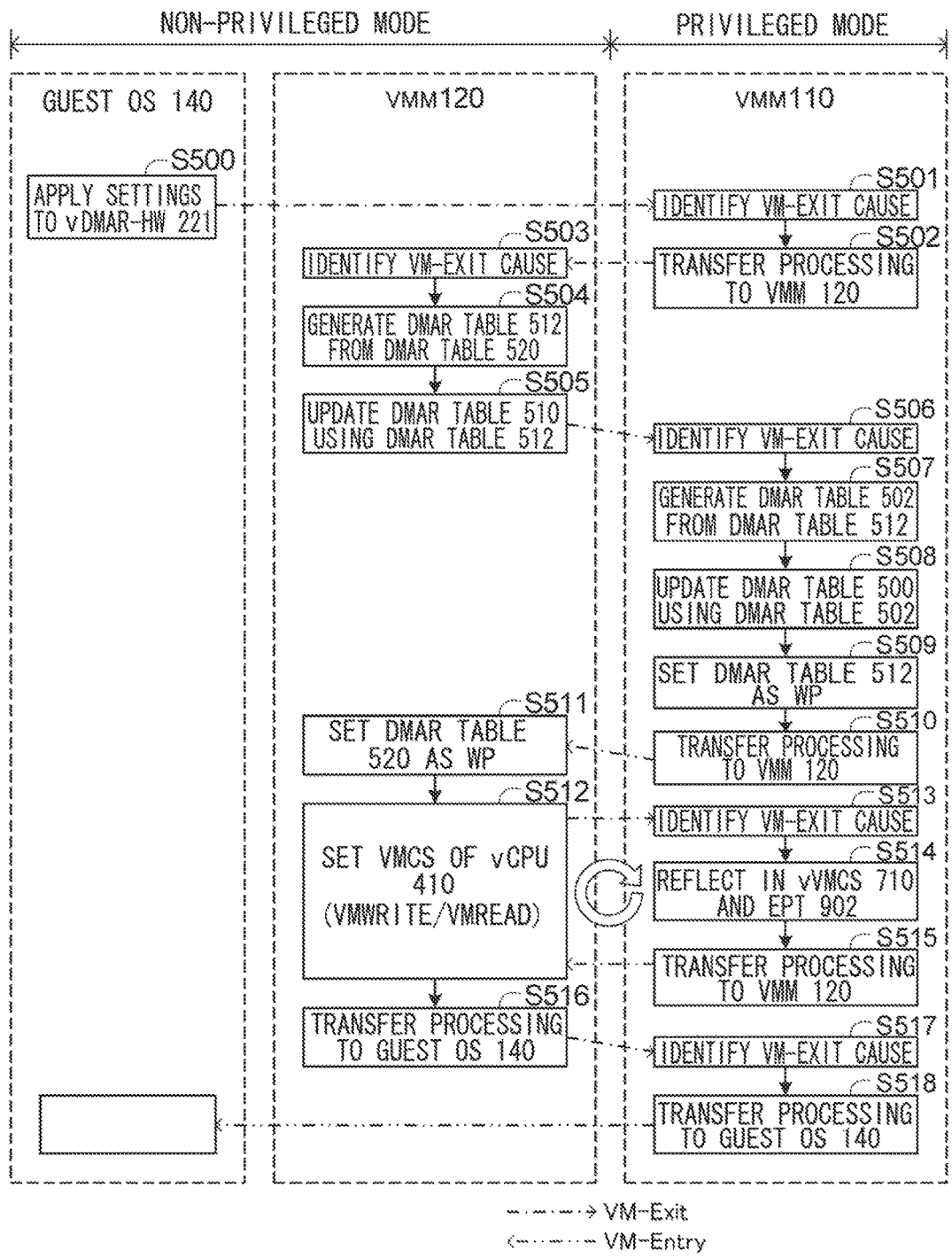
FIG. 13 is a diagram explaining shifts between non-privileged mode and privileged mode in the comparative example.

FIG. 13 illustrates shifts in processing for nested virtualization of DMAR-HW between non-privileged mode and privileged mode. Note that a case is described here in which the I/O device 801 is assigned to the guest OS 140, and the guest OS 140 applies settings to the vDMAR-HW 221 for the I/O device 801. Also note that single-dot-dashed arrows indicate VM-Exit from non-privileged mode to privileged mode, and double-dot-dashed arrows indicate VM-Entry from privileged mode to non-privileged mode.

At step S500 of FIG. 13, the guest OS 140 performs VM-Exit to the VMM 110 when accessing the register of the vDMAR-HW 221 in order to set the DMAR table 520 for the vDMAR-HW 221. Although transfer of processing to the second level VMM 120 that manages the vDMAR-HW 221 is actually desired, the guest OS 140 and the VMM 120 are both in non-privileged mode, and VM-Exit from the guest OS 140 to the VMM 110 is performed since direct VM-Exit cannot be performed.

Next, at step S501, the VM-Exit handler 10 identifies the VM-Exit cause. The VM-Exit cause is an application of settings to the vDMAR-HW 221 by the guest OS 140, and at step S502 processing is transferred to the VMM 120 since the processing is originally processing of the VMM 120. Steps S501→S502 correspond to steps S1→S2→S55→S61→S62 of FIG. 10.

Next, at step S503, the VM-Exit handler 20 of the VMM 120 identifies that the VM-Exit cause is application of settings to the vDMAR-HW 221 by the guest OS 140. Next, at step S504, the DMAR virtualization section 21 of the VMM 120 generates the DMAR table 512 that is the DMAR table 520 generated based on the GPA2 space translated into a table based on the GPA1 space. Next, at step S505, the DMAR virtualization section 21 updates the DMAR table 510 using the contents of the DMAR table 512. Since the memory region storing the DMAR table 510 is set as WP, updating the DMAR table 510 causes an exception to be generated, and VM-Exit to the VMM 110 is performed.

Next, at step S506, the VM-Exit handler 10 identifies that the VM-Exit cause is the update to the DMAR table 510 that was set as WP. Next, at step S507, the GPA1 DMAR table acquisition section 12 acquires the DMAR table 512. The DMAR table generation section 15 then uses the GPA1-HPA translation section 13 to generate the DMAR table 502 that is the DMAR table 512 based on GPA1 translated into a table based on the HPA.

Next, at step S508, the host DMAR table updating section 16 updates the DMAR table 500 using the contents of the DMAR table 502. Next, at step S509, the WP setting section 14 sets the memory region storing the DMAR table 512 as WP. Next, at step S510, the VM-Exit handler 10 performs VM-Entry to the VMM 120 in order to transfer processing to the VMM 120.

Steps S506→S507→S508→S509→S510 correspond to steps S1→S2→S10→S30 of FIG. 10→S31→S32→S100 of FIG. 11→S101→S111→S112→S113→S114 of FIG. 12→S62 of FIG. 10.

Next, at step S511, the VMM 120 sets the memory region storing the DMAR table 520 generated by the guest OS 140 as WP in the EPT 912 that performs GPA2-GPA1 translation of the vCPU 410.

Next, at step S512, the VMM 120 applies settings to the vVMCS 710 of the vCPU 410 in order to perform VM-Entry to the guest OS 140. VM-Exit to the VMM 110 is performed since setting of the vVMCS 710 is accompanied by execution of a VMWRITE or a VMREAD, which are privileged instructions.

Next, at step S513, the VM-Exit handler 10 identifies that the VM-Exit cause is VMWRITE or VMREAD to the vVMCS 710. Next, at step S514, the VM-Exit handler 10 performs setting to the vVMCS 710 and the EPT 902. Next, at step S515, the VM-Exit handler 10 performs VM-Entry to the VMM 120 to transfer processing to the VMM 120. VM-Exit and VM-Entry between the VMM 110 and the VMM 120 is repeated plural times when applying settings to the vVMCS 710 and the EPT 902. When a modification to the EPT 912 is detected during the setting, the VM-Exit handler 10 reflects the modification in the EPT 902 that performs GPA2-HPA translation.

The above steps S513→S514→S515 correspond to steps S1→S2→S10→S30 of FIG. 10→S31→S32→S33 of FIG. 11→S61 of FIG. 10.

Next, at step S516, the VMM 120 executes a VM-Entry instruction in order to return processing to the guest OS 140. Execution of a VM-Entry privileged instruction by the VMM 120 in non-privileged mode causes an exception to be generated, and VM-Exit to the VMM 110 occurs.

Next, at step S517, the VM-Exit handler 10 identifies that the VM-Exit cause was a VM-Entry instruction from the VMM 120 to the guest OS 140. Next, at step S518, processing transfers to the guest OS 140. Steps S517→S518 above correspond to steps S1→S2→S10→S21→S22 of FIG. 10.

Figure 14:
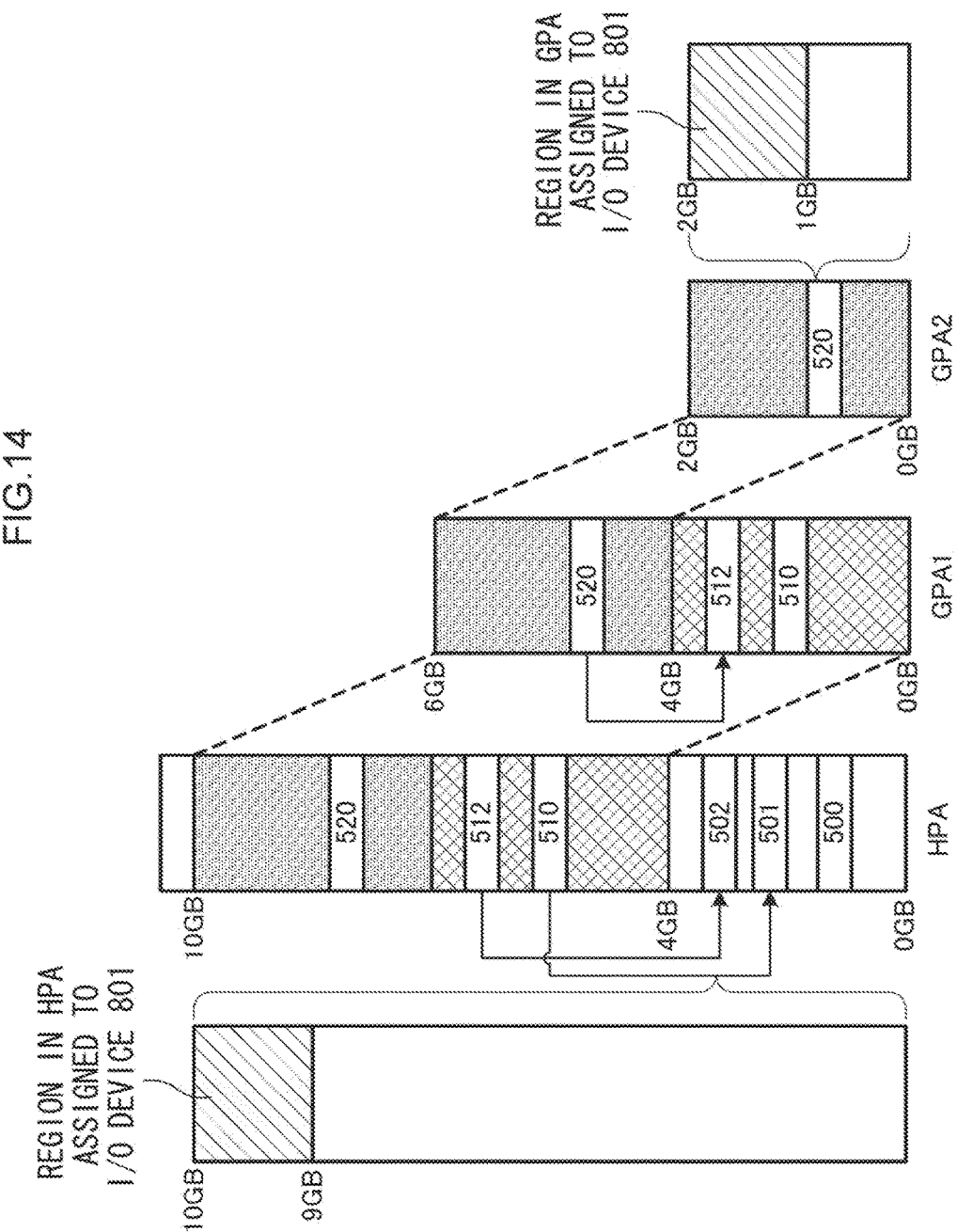
FIG. 14 is a diagram illustrating relationships in a DMAR table between a HPA, a GPA1, and a GPA2 of the comparative example.

FIG. 14 illustrates an example of a relationship of a DMAR table in nested virtualization of DMAR-HW. The address range of the HPA spanning from 4 GB to 10 GB is assigned as from 0 GB to 6 GB of the GPA1. Moreover, the address range of the GPA1 spanning from 4 GB to 6 GB is assigned as from 0 GB to 2 GB of the GPA2. The DMAR table 520 generated in the GPA2 includes settings indicating that the address range of the GPA2 from 1 GB to 2 GB is a region assigned to the I/O device 801. A table that is the DMAR table 520 translated into the GPA1 is the DMAR table 512, and a table that is the DMAR table 512 translated into the HPA is the DMAR table 502. The DMAR table 502 includes setting the address range of the HPA spanning from 9 GB to 10 GB as a region assigned to the I/O device 801. Moreover, a table that is the DMAR table 510 generated in the GPA1 by the VMM 120 and translated into the HPA is the DMAR table 501.

Issues

As illustrated in FIG. 13, it is apparent that there are many shifts (VM-Entries and VM-Exits) between privileged mode and non-privileged mode in nested virtualization of direct memory access remapping hardware (DMAR-HW) that combines, as they are, nested virtualization technology and virtualization technology for DMAR-HW, as described above as a comparative example. There are large overheads when shifts between privileged mode and non-privileged mode occur, and time is needed for virtualization when DMAR-HW is provided to a guest OS.

Outline of Technology Disclosed Herein

Figure 15:
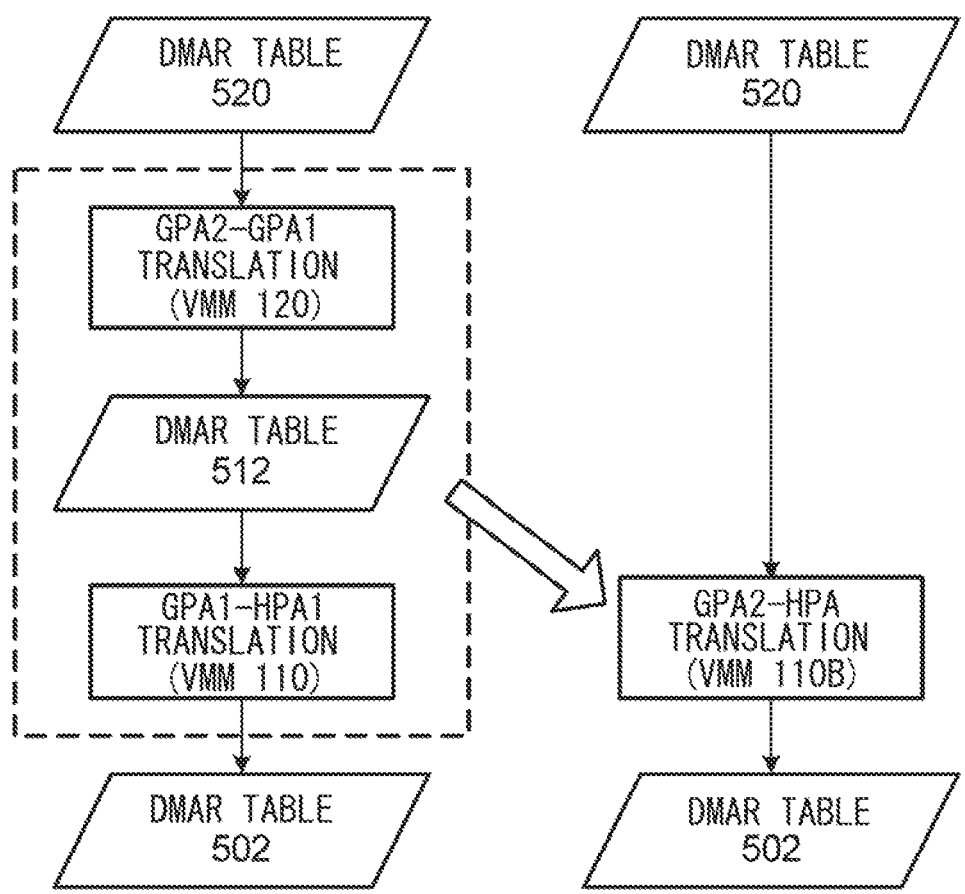
FIG. 15 is a diagram illustrating an outline of technology disclosed herein.

First, explanation follows regarding an outline of technology disclosed herein for solving the issues above. Consider, as a comparative example, the role of the second level VMM 120 in nested virtualization of DMAR-HW. As illustrated on the left of FIG. 15, the role of the VMM 120 is to translate the DMAR table 520 based on the GPA2 generated by the guest OS 140 into the DMAR table 512 based on the GPA1, and apply settings to the vDMAR-HW 211. When applying settings to the vDMAR-HW 211, the first level VMM 110 translates the DMAR table 512 into the DMAR table 502 that is HPA based, and reflects this in the DMAR-HW 200.

Namely, the VMM 120 is merely a relay point until the DMAR table 520 generated by the guest OS 140 has been set in the DMAR-HW 200. If the VMM 110 could set the DMAR table 520 of the guest OS 140 in the DMAR-HW 200 directly, the second level VMM 120 would not need to act as a relay point.

In such cases, the second level VMM 120 is not aware of the guest OS 140 using the vDMAR-HW 221. In other words, the VMM 120 infers that the guest OS 140 is not using the vDMAR-HW 221. Namely, the second level VMM 120 needs to apply only its own settings to the vDMAR-HW 211, without being aware of settings applied by the upper level guest OS 140. Next, the first layer VMM 110 finally reflects respective settings of the DMAR performed by the guest OS 140 and the second level VMM 120 in the DMAR-HW 200. Namely, as illustrated on the right of FIG. 15, a VMM 110B (a first level VMM of technology disclosed herein) directly translates the DMAR table 520 based on the GPA2 into the DMAR table 502 based on the HPA.

First Exemplary Embodiment

Detailed explanation follows regarding a first exemplary embodiment of technology disclosed herein, with reference to the drawings.

Figure 16:
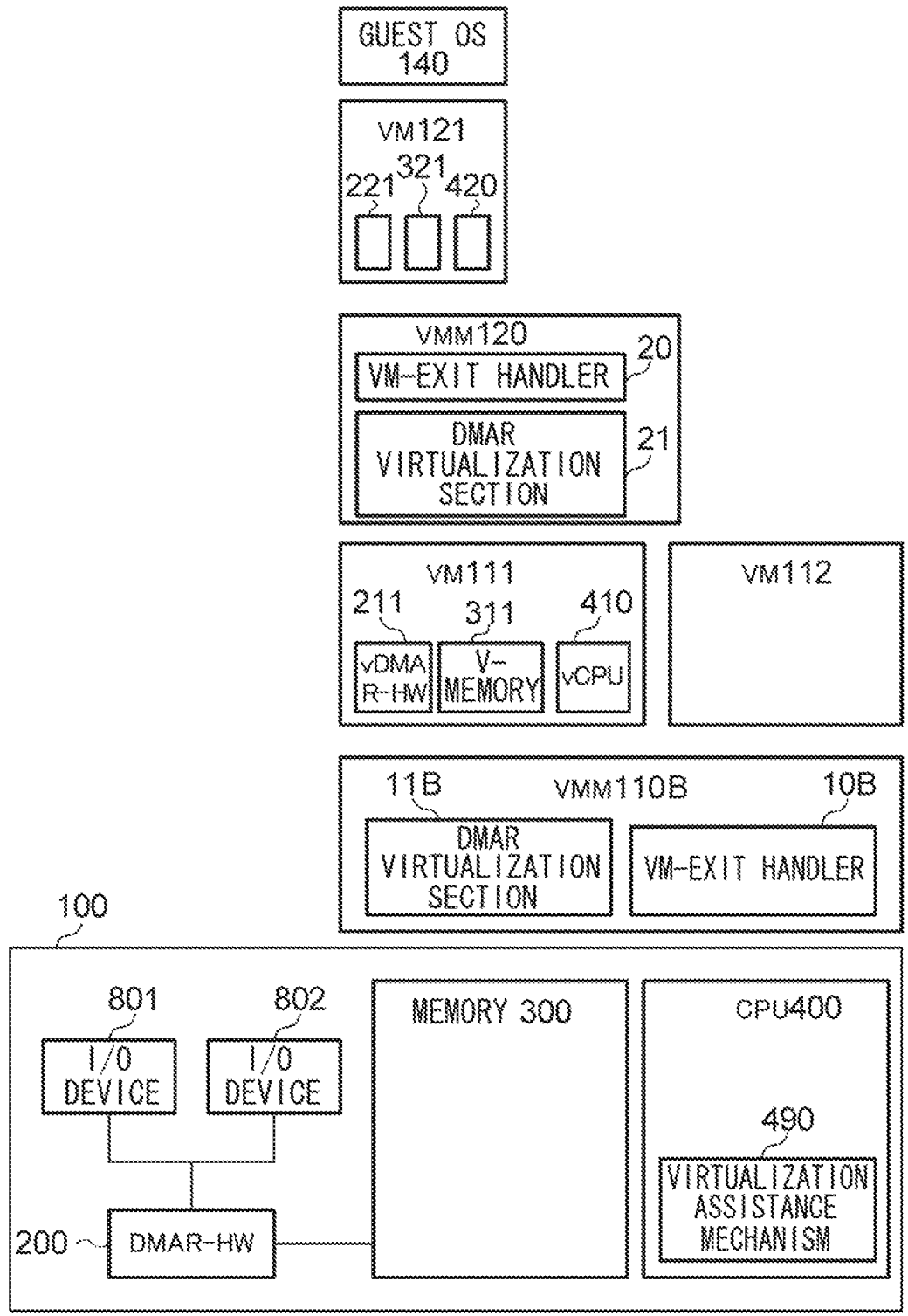
FIG. 16 is a schematic diagram illustrating a configuration of a first exemplary embodiment.

FIG. 16 illustrates an information processing device 100 according to the first exemplary embodiment. Explanation follows regarding points of difference from the comparative example illustrated in FIG. 7. In the first exemplary embodiment illustrated in FIG. 16, the first level VMM 110B1 that operates on the information processing device 100 includes a VM-Exit handler 10B and a DMAR virtualization section 11B.

The VM-Exit handler 10B catches VM-Exit from the guest OS 140 or the VMM 120, and identifies the VM-Exit cause. For VM-Exits from the guest OS 140, the VM-Exit handler 10B determines whether the VM-Exit cause is either of "application of settings to the vDMAR-HW 221" or "an update to the DMAR table 520 set as WP". When the VM-Exit cause is either of "application of settings to the vDMAR-HW 221" or "an update to the DMAR table 520 set as WP", processing is executed by the VMM 110B without delegating to the VMM 120.

As described above setting of the DMAR table in the DMAR-HW is performed by accessing the register of the DMAR-HW that is mapped to the memory. Access to the memory by the guest OS 140 generates an exception, and when VM-Exit has occurred, access to the vDMAR-HW 221 can be determined in cases in which the accessed address matches the address of the register of the vDMAR-HW 221 that is visible to the guest OS 140. Namely, it can be determined that VM-Exit occurred due setting the DMAR table 520 for the vDMAR-HW 221.

Thus when access to the address of the register is detected, the address of the register of the vDMAR-HW 221 that the second level VMM 120 makes visible to the guest OS 140 needs to be the same as the address mapped by the register of the DMAR-HW 200. Supposing the address of the register of the vDMAR-HW 221 that the second level VMM 120 makes visible to the guest OS 140 were to be freely modifiable, the first level VMM 110 would have no way of knowing the address, and access to the vDMAR-HW 221 would be undetectable.

However, the above restriction is not an issue since the VMM generally makes the address of the register of the physical DMAR-HW visible (virtualized), as it is, to upper level guests.

Moreover, when an exception is generated due to memory access, updating of the DMAR table 520 that is set as WP can be determined by whether or not the address matches the region in which the DMAR table 520 is stored.

Figure 17:
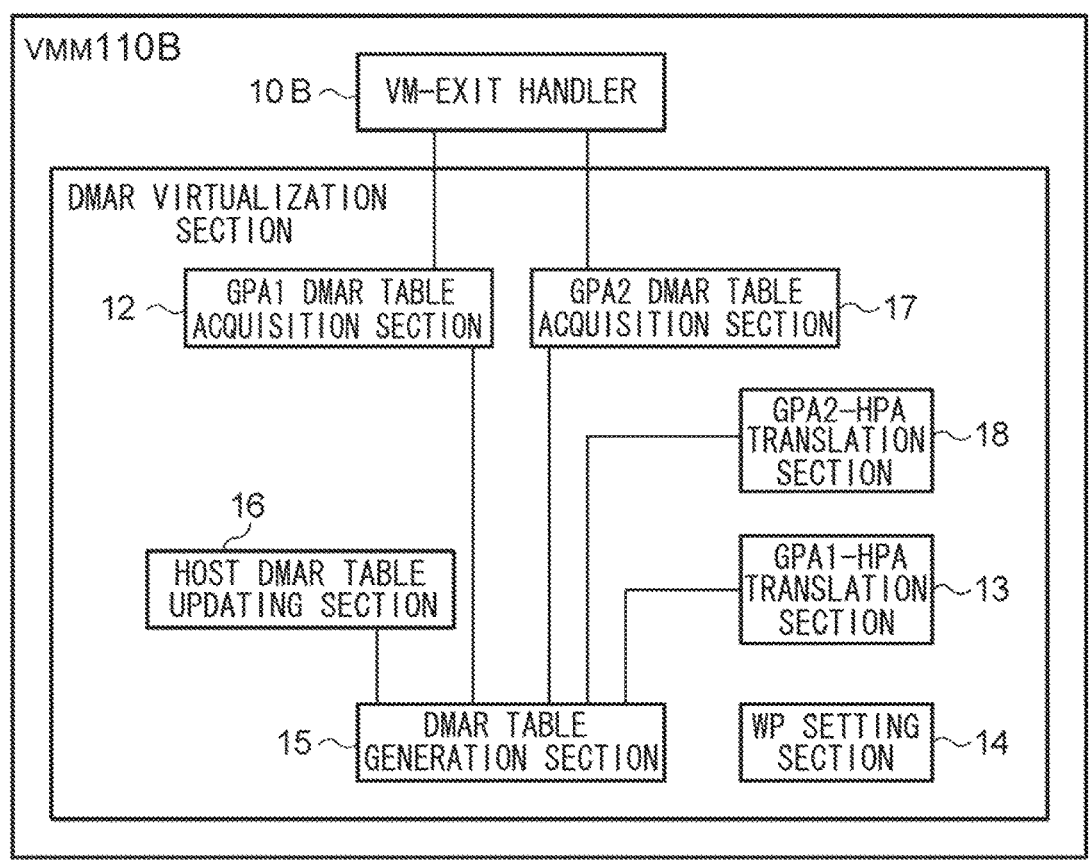
FIG. 17 is a functional block diagram of a VMM of the first exemplary embodiment.

As illustrated in FIG. 17, in addition to each of the functional sections of the DMAR virtualization section 11 of the comparative example illustrated in FIG. 9, the DMAR virtualization section 11B includes a GPA2 DMAR table acquisition section 17 and a GPA2-HPA translation section 18.

The GPA2 DMAR table acquisition section 17 acquires the DMAR table 520 generated by the guest OS 140 when the VM-Exit cause is application of settings to the vDMAR-HW 221 by the guest OS 140, or is an update to the DMAR table 520 by the guest OS 140.

The GPA2-HPA translation section 18 translates the GPA2 to the HPA. The GPA2-HPA translation section 18 is employed when the DMAR table generation section 15 generates the DMAR table 502 that is the DMAR table 520 generated by the guest OS 140 translated into a HPA based table. The GPA2-HPA translation section 18 employs the EPT 902 generated for the purpose of the virtualization assistance mechanism of the CPU in order to perform GPA2-HPA translation.

Figure 18:
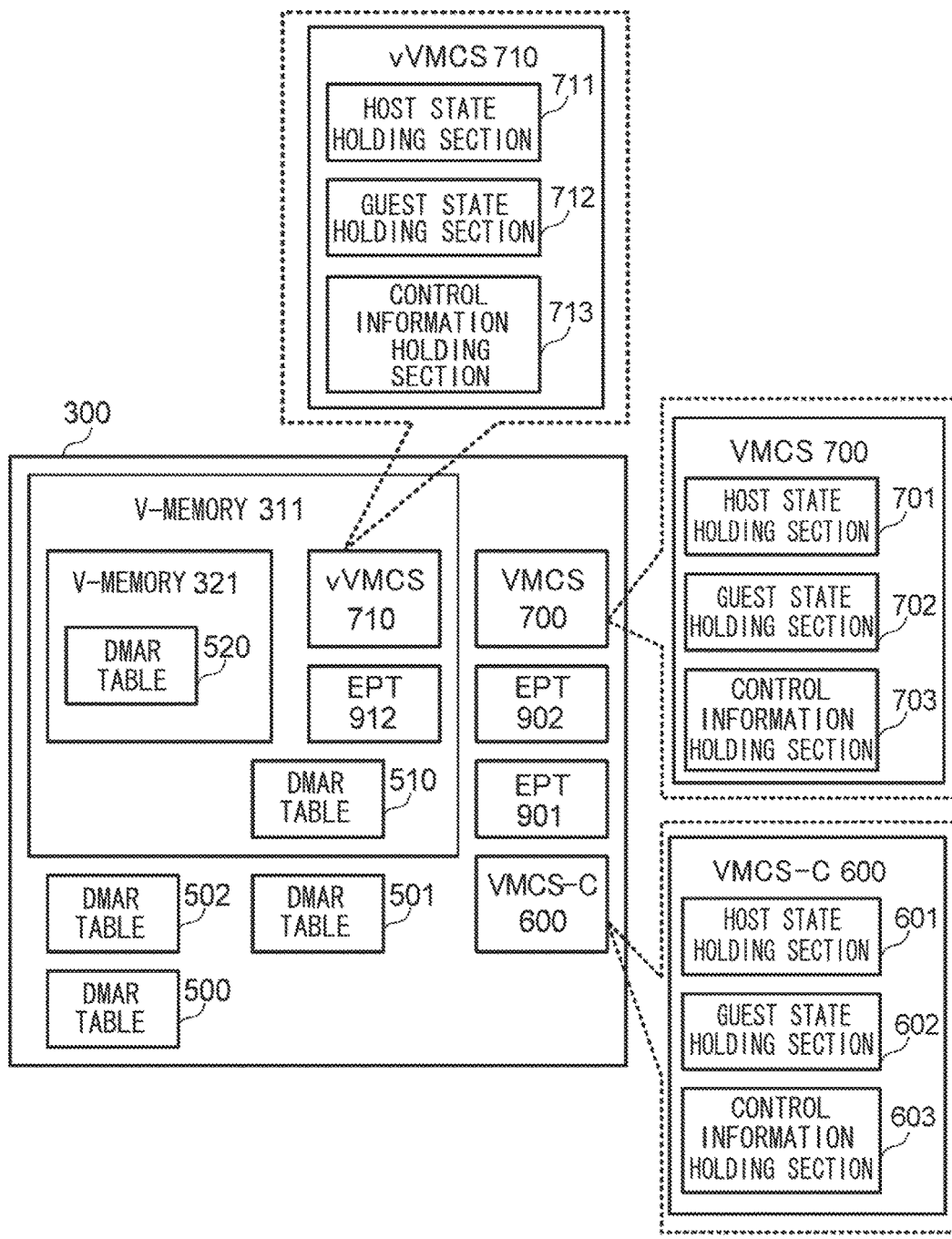
FIG. 18 is a schematic diagram illustrating a memory configuration the first exemplary embodiment.

Moreover, in the first exemplary embodiment, as illustrated in FIG. 18, the memory 300 has a different memory configuration from that in the comparative example of FIG. 8, and the region that stores the DMAR table 512 is not provided, since that DMAR table 512, which is the DMAR table 520 translated into a GPA1 based table, is not generated.

Figure 19:
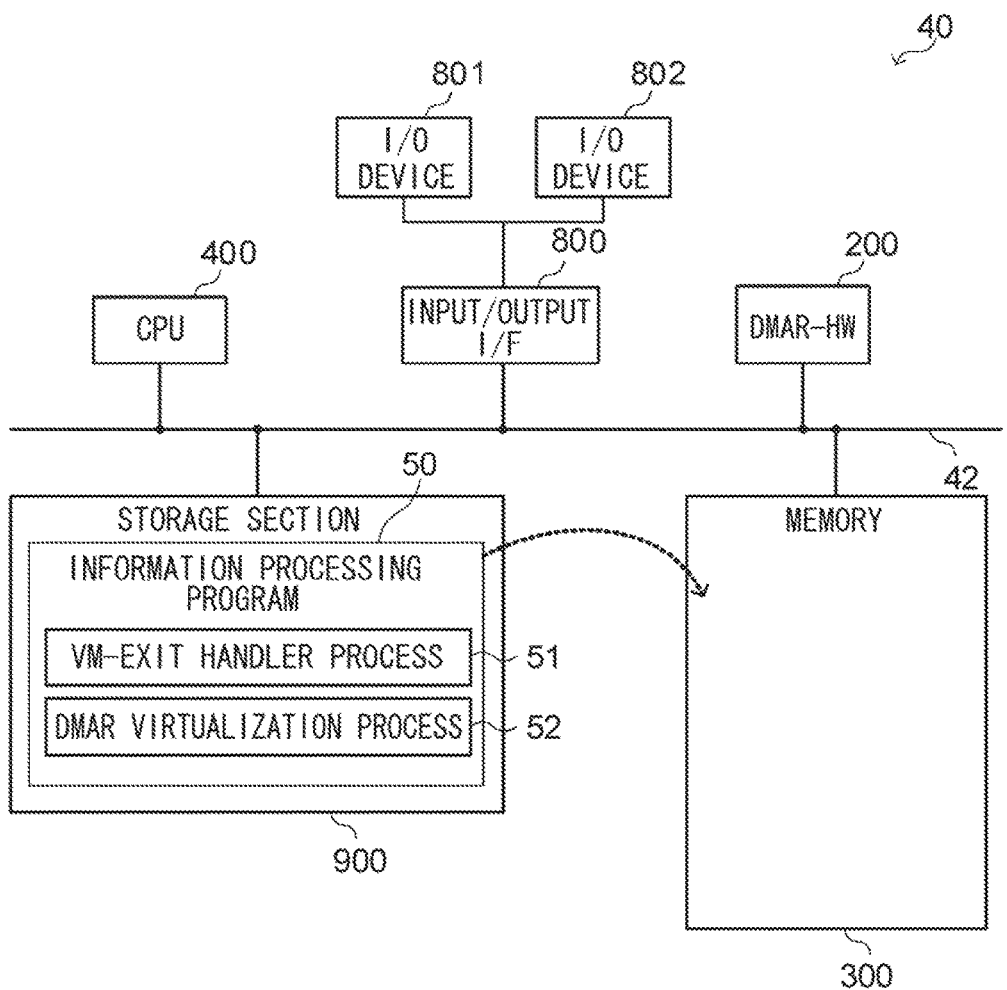
FIG. 19 is a schematic block diagram illustrating an example of a server that functions as an information processing device.

As illustrated in FIG. 19, the information processing device 100 may, for example, be implemented by a server 40 that, in addition to the CPU 400, the memory 300, and the DMAR-HW 200, also includes a non-volatile storage section 900 and an input/output interface (I/F) 800. The CPU 400, the memory 300, the DMAR-HW 200, the storage section 900, and the input/output I/F 800 are connected to one another through a bus 42. The I/O devices 801, 802 are connected to the server 40 through the input/output I/F 800.

The storage section 900 may be implemented by a HDD, flash memory, or the like. An information processing program 50 that causes the server 40 to function as the information processing device 100 is stored in the storage section 900 that serves as a recording medium. The CPU 400 reads the information processing program 50 from the storage section 900, expands the information processing program 50 into the memory 300, and sequentially executes the processes included in the information processing program 50.

The information processing program 50 includes a VM-Exit handler process 51, and a DMAR virtualization process 52. The CPU 400 operates as the VM-Exit handler 10B illustrated in FIG. 17 by executing the VM-Exit handler process 51. The CPU 400 operates as the DMAR virtualization section 11B illustrated in FIG. 17 by executing the DMAR virtualization process 52. The server 40 that executes the information processing program 50 thereby functions as the information processing device 100.

Note that each function implemented by the CPU 400 may be implemented by, for example, a semiconductor integrated circuit, and more specifically, by an application specific integrated circuit (ASIC) or the like.

Figure 20:
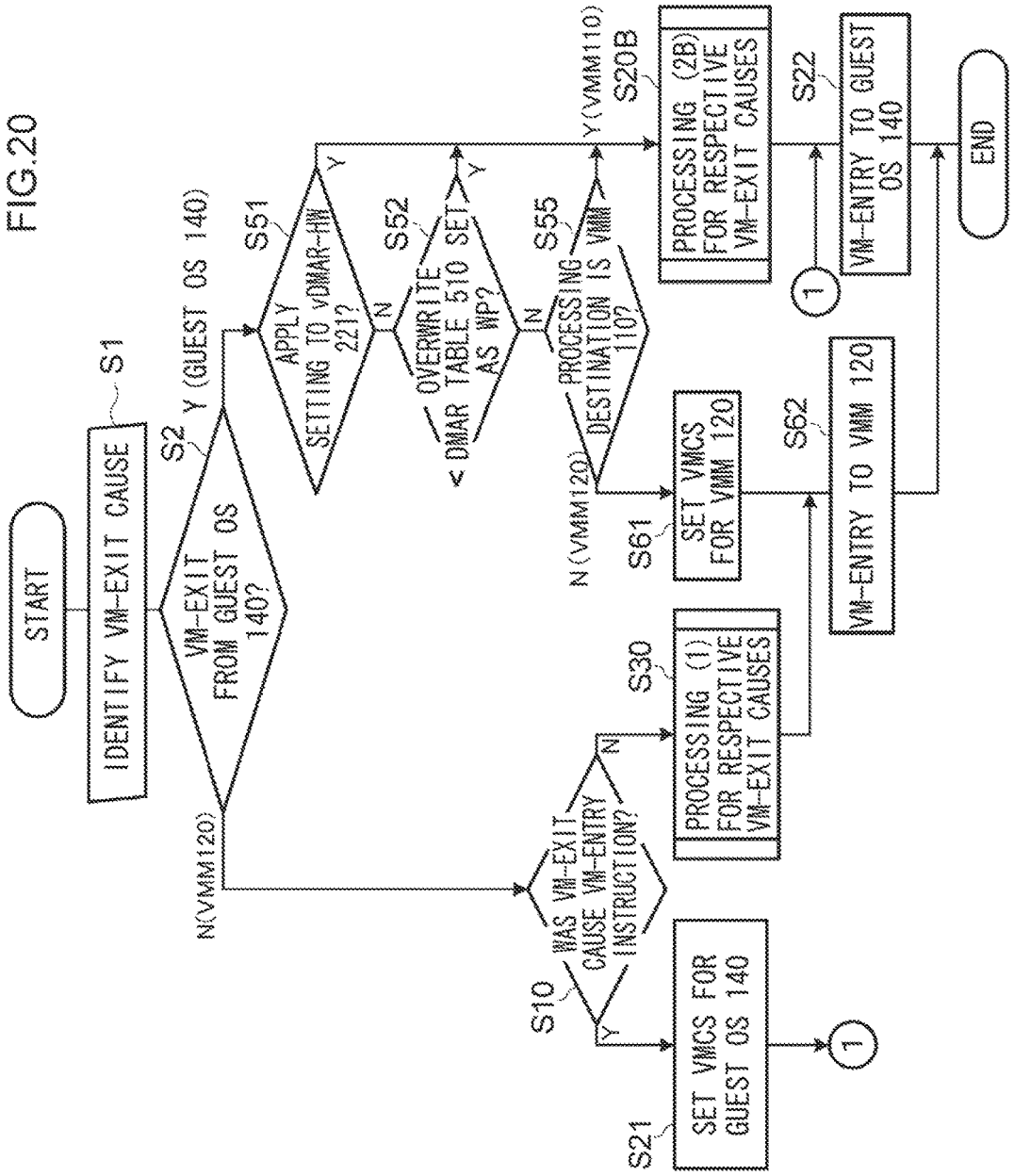
FIG. 20 is a flowchart illustrating processing of a VM-Exit handler of the first exemplary embodiment.
Figure 21:
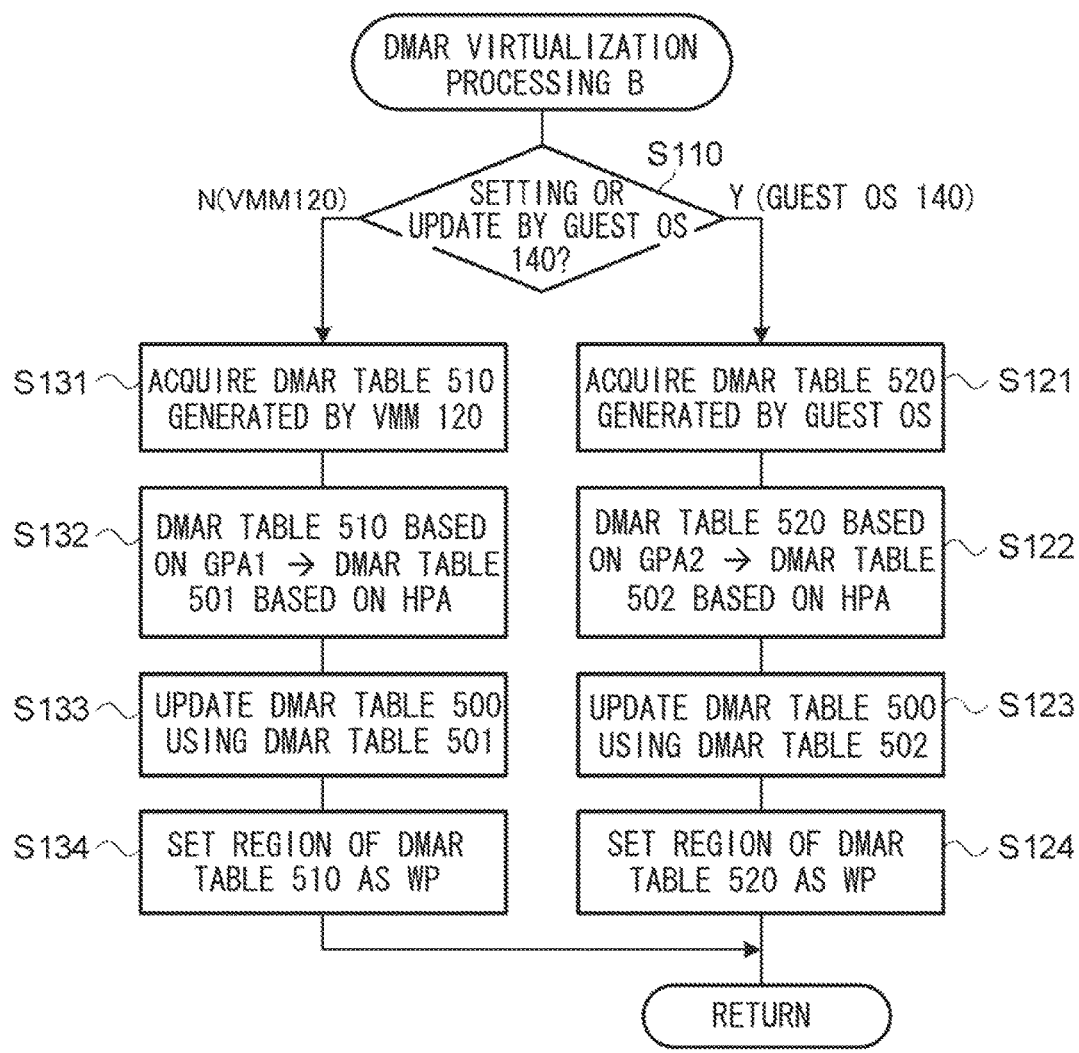
FIG. 21 is a flowchart illustrating DMAR virtualization processing of the first exemplary embodiment.

Next, explanation follows regarding nested virtualization processing for DMAR-HW as operation of the information processing device 100 according to the first exemplary embodiment, with reference to FIG. 20 and FIG. 21. FIG. 20 illustrates a flow of processing by the VM-Exit handler 10B. FIG. 21 illustrates a flow of DMAR virtualization processing B by the DMAR virtualization section 11B. Note that processing similar to that of the nested virtualization processing for DMAR-HW of the comparative example illustrated in FIG. 10 to FIG. 12 is allocated the same reference numerals, and detailed explanation thereof is omitted.

At step S1 of the flow of processing of the VM-Exit handler 10B illustrated in FIG. 20, the VM-Exit handler 10B catches the VM-Exit and identifies the VM-Exit cause.

Next, at step S2, the VM-Exit handler 10B determines whether the caught VM-Exit is VM-Exit from the guest OS 140, or VM-Exit from the VMM 120. The process transitions to step S51 in the case of VM-Exit from the guest OS 140, and the process transitions to step S10 in the case of VM-Exit from the VMM 120.

At step S51, the VM-Exit handler 10B determines whether or not the VM-Exit cause determined at step S1 above is application of settings to the vDMAR-HW 221 by the guest OS 140. The process transitions to step S20B in the case of application of settings to the vDMAR-HW 221 so that processing continues in the VMM 110, and the process transitions to step S52 in cases other than application of settings to the vDMAR-HW 221.

At step S52. VM-Exit handler 103B determines whether or not the VM-Exit cause determined at step S1 above was an update to the DMAR table 520 set as WP by the guest OS 140. In the case of an update to the DMAR table 520 that has been set as WP, the process transitions to step S20B so that processing continues in the VMM 110. The process transitions to step S55 in cases other than updates to the DMAR table 520 that has been set as WP.

At step S20B, the VM-Exit handler 10B executes processing (2B) for respective VM-Exit causes. The processing (28) for respective VM-Exit causes is similar to the processing (1) for VM-Exit causes illustrated in FIG. 11. However, "apply settings to vDMAR-HW 211?" of step S31 is replaced by "apply settings to vDMAR-HW 221?". "Update DMAR table 510 set as WP?" of step S32 is replaced by "Update DMAR table 520 set as WP?". "DMAR virtualization processing" of step S100 is replaced by "DMAR virtualization processing B". Moreover, "DMAR virtualization processing" of step 100 in the processing (1) for the respective VM-Exit causes illustrated in FIG. 11 executed at step S30 is also replaced by "DMAR virtualization processing B".

At step S110 of the DMAR virtualization processing B illustrated in FIG. 21, the VM-Exit handler 10B determines whether or not the VM-Exit cause is the guest OS 140 either applying settings to the vDMAR-HW 221, or updating the DMAR table 520 that has been set as WP. The process transitions to step S121 when affirmative determination is made. However, the process transitions to step S131 when the VM-Exit cause is application of settings to the vDMAR-HW 211 by the VMM 120, or an update to the DMAR table 510 that has been set as WP.

At step S121, based on the address accessed by the guest OS 140, the GPA2 DMAR table acquisition section 17 acquires the DMAR table 520 that was generated by the guest OS 140. The DMAR table 520 has been generated based on the GPA2. At the next step S122, the DMAR table generation section 15 uses the GPA2-HPA translation section 18 to generate the DMAR table 502 that is the DMAR table 520 based on the GPA2 translated into a table based on the HPA.

Next, at step S123, the host DMAR table updating section 16 updates settings in the I/O device 801 of the DMAR table 500 using the content of the DMAR table 502. Next, at step S124, to enable updates to the DMAR table 520 by the guest OS 140 to be detected, the WP setting section 14 reflects the WP setting of the memory region in which the DMAR table 520 is stored, in the EPT 902 that performs GPA2-HPA translation of the CPU 400.

When the process has transitioned to step S131, based on the address accessed by the VMM 120, the GPA1 DMAR table acquisition section 12 acquires the DMAR table 510 generated by the VMM 120. The DMAR table 510 has been generated based on the GPA1. At the next step S132, the DMAR table generation section 15 uses the GPA1-HPA translation section 13 to generate the DMAR table 501 that is the DMAR table 510 based on the GPA1 translated into a table based on the HPA.

Next, at step S133, the host DMAR table updating section 16 updates the settings for the I/O device 801 of the DMAR table 500 using the contents of the DMAR table 501. Next, at step S134, to enable updates to the DMAR table 510 by the VMM 120 to be detectable, the WP setting section 14 reflects the WP setting of the memory region, in which the DMAR table 510 is stored, in the EPT 901 that performs GPA1-HPA translation of the CPU 400. When setting has been completed, the process returns to the processing (2B) for respective VM-Exit causes illustrated in FIG. 11.

Figure 22:
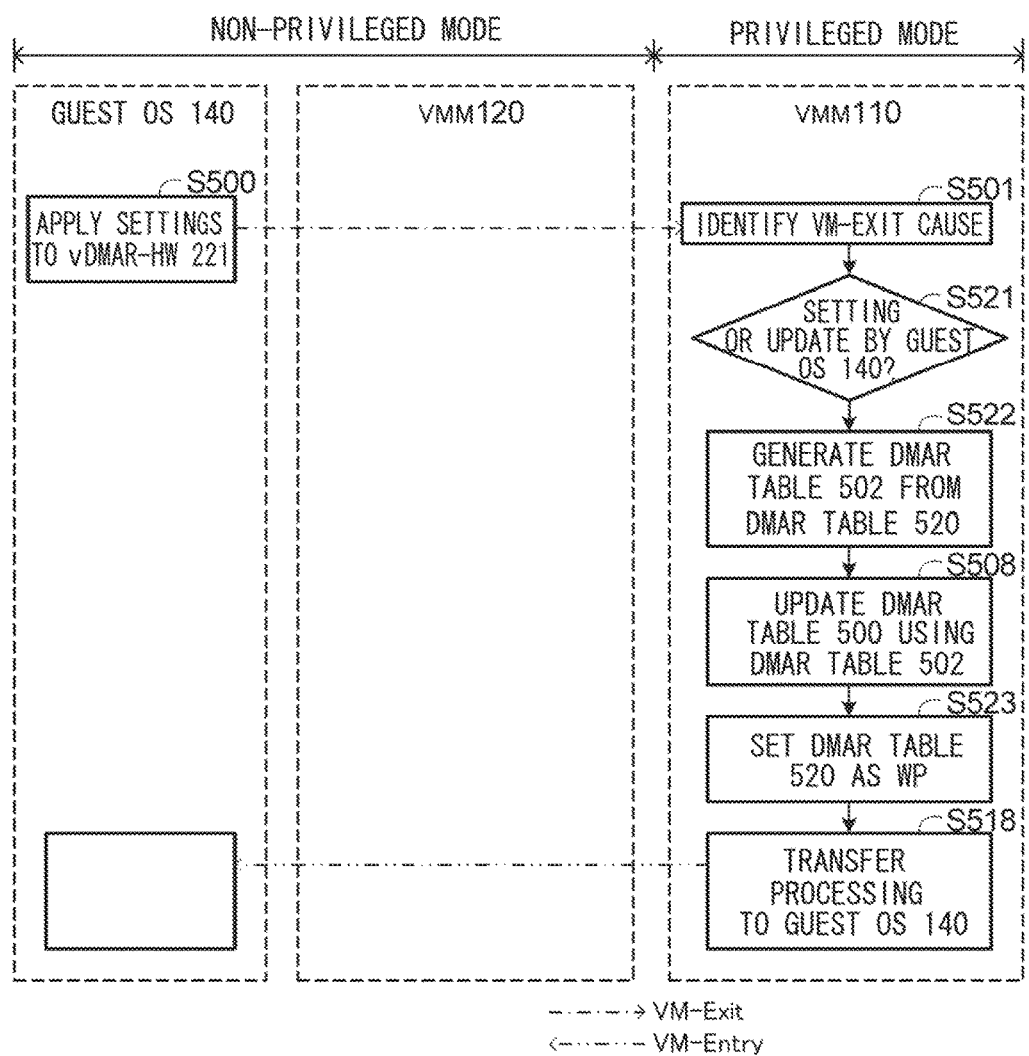
FIG. 22 is a diagram explaining shifts between non-privileged mode and privileged mode in the first exemplary embodiment.

FIG. 22 illustrates shifts between non-privileged mode and privileged mode, in nested virtualization processing for DMAR-HW of the first exemplary embodiment. Note that a case is illustrated here in which the I/O device 801 is assigned to the guest OS 140, and the guest OS 140 sets the DMAR table 520 for the vDMAR-HW 221, which is a setting made for the I/O device 801. Also note that the single-dot-dashed arrows indicate VM-Exit from non-privileged mode to privileged mode, and the double-dot-dashed arrows indicate VM-Entry from privileged mode to non-privileged mode. Portions similar to those in the shifts between non-privileged mode and privileged mode in the nest virtualization processing for DMAR-HW of the comparative example illustrated in FIG. 13 are allocated the same reference numerals and detailed explanation thereof is omitted.

At step S500 of FIG. 22, when access is made to the register of the vDMAR-HW 221, the guest OS 140 performs VM-Exit to the VMM 110 in order to set the DMAR table 520 for the vDMAR-HW 221. Next, at step S501, the VM-Exit handler 10B identifies the VM-Exit cause.

Next, at step S521, the VM-Exit handler 10B determines whether or not the VM-Exit cause was the guest OS 140 either performing setting to the vDMAR-HW 221, or updating the DMAR table 520 that was set as WP. When the VM-Exit cause is either of these, the process transitions to the next step S522 without transferring processing to the VMM 120.

At step S522, the GPA2 DMAR table acquisition section 17 acquires the DMAR table 520. The DMAR table generation section 15 then uses the GPA2-HPA translation section 18 to generate the DMAR table 502 that is the DMAR table 520 based on the GPA2 translated into a table based on the HPA.

Next, at step S508, the host DMAR table updating section 16 updates the DMAR table 500 using the contents of the DMAR table 502. Next, at step S523, the WP setting section 14 reflects the WP setting of the memory region, in which the DMAR table 520 is stored, in the EPT 902. Next, at step S518, processing transfers to the guest OS 140.

Steps S501→S521→S522→S508→S523→S518 corresponds to steps S1→S2→S51 (→S52)→S20B of FIG. 20→S31 (→S32)→S100 of FIG. 11→S121→S122→S123→S124 of FIG. 21→S22 of FIG. 20.

Figure 23:
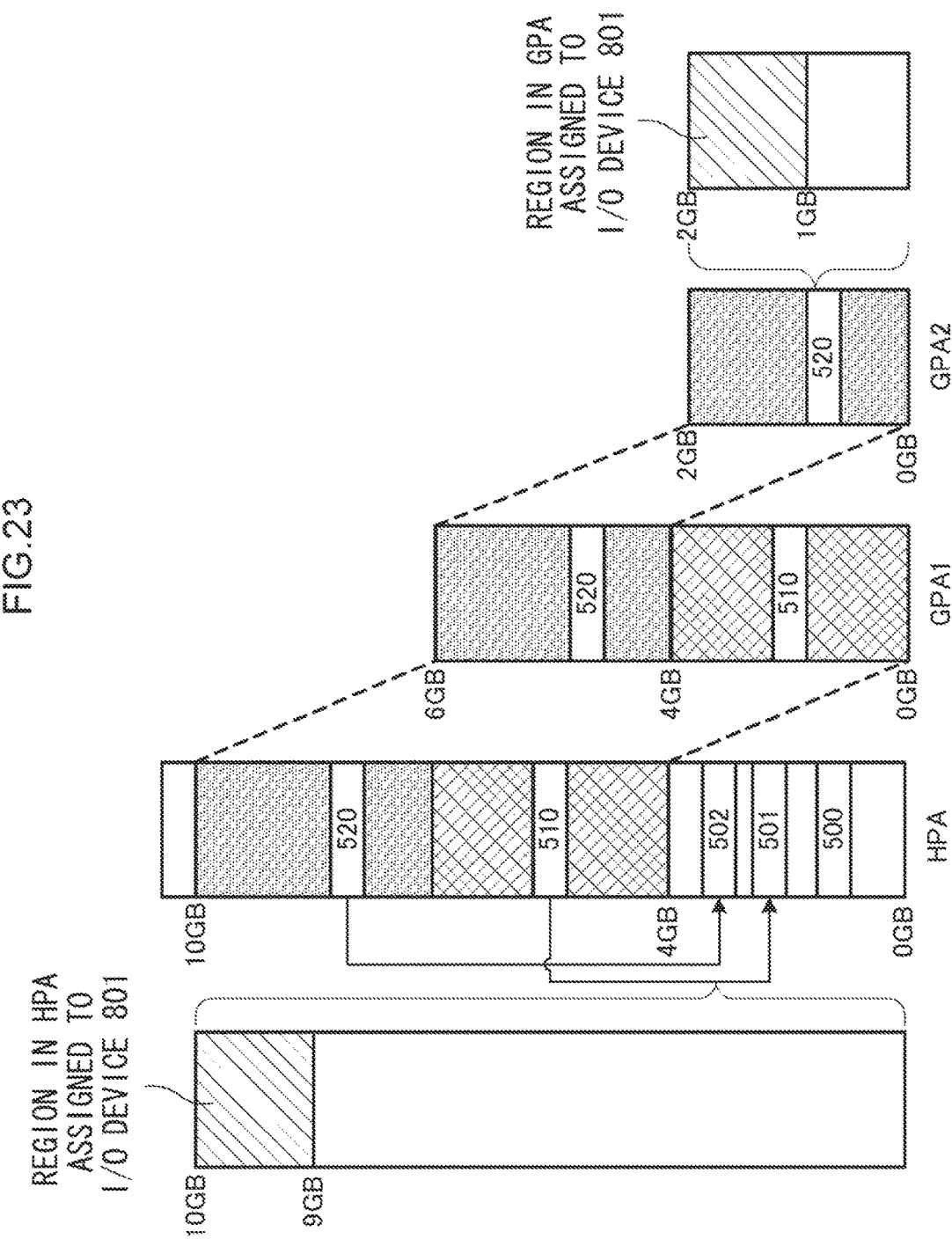
FIG. 23 is a diagram illustrating relationships in a DMAR table between HPA, GPA1, and GPA2 in the first exemplary embodiment.

FIG. 23 illustrates an example of a relationships in a DMAR table in nested virtualization of DMAR-HW in the first exemplary embodiment. Memory region allocation is similar to in the relationships in the DMAR table in nested virtualization of DMAR-HW in the comparative example illustrated in FIG. 14. However, the first exemplary embodiment is different in that the DMAR table 512 that is the DMAR table 520 translated into the GPA1 is not generated.

As explained above, according to the information processing device of the first exemplary embodiment, when VM-Exit from an upper level guest OS is caused by application of settings or an update to a DMAR table for DMAR-HW, processing is performed in the first level VMM without transferring processing to the second level VMM. As is apparent from FIG. 22, this enables the number of shifts between non-privileged mode and privileged mode to be reduced. This accordingly enables virtualization to be accelerated when DMAR-HW is provided to a guest OS in a nested virtualization environment.

Second Exemplary Embodiment

Explanation follows regarding an information processing device according to a second exemplary embodiment. Portions similar to those of the information processing device according to first exemplary embodiment are allocated the same reference numerals and detailed explanation thereof is omitted.

Figure 24:
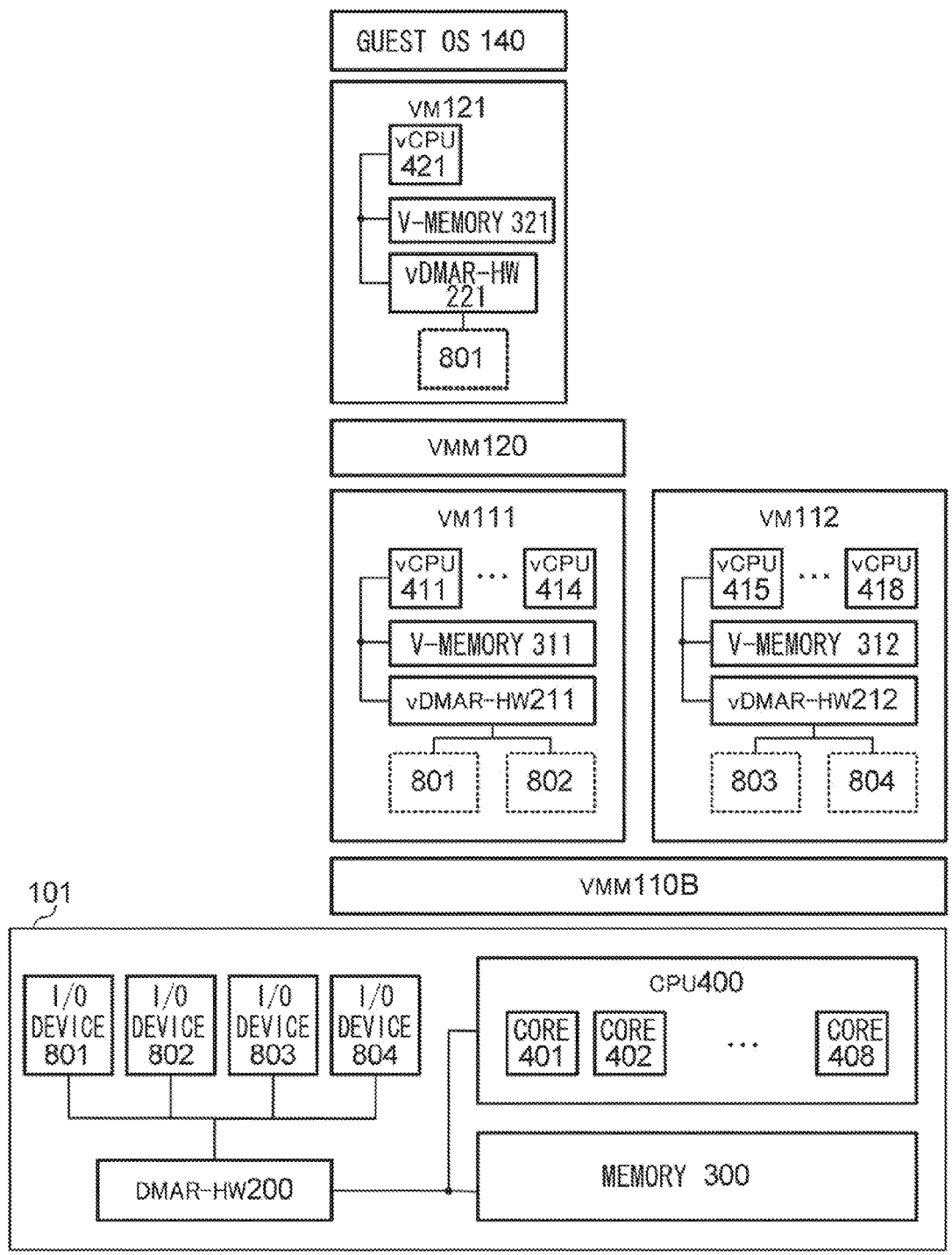
FIG. 24 is a schematic diagram illustrating a configuration of a second exemplary embodiment.

As illustrated in FIG. 24, an information processing device 101 according to the second exemplary embodiment includes a CPU 400, memory 300, DMAR-HW 200, and I/O devices 801, 802, 803, 804 that are hardware resources. The CPU 400 includes 8 cores (core 401, 402, . . . , 408). The DMAR-HW 200 controls DMA from the I/O devices 801, 802, 803, 804.

A VMM 110B constructs VMs 111, 112, assigns the hardware resources of the information processing device 101 to the VM 111 and the VM 112, and monitors and controls this state.

The cores 401, . . . , 404 are assigned to the VM 111, and operate as vCPUs 411, . . . , 414 of the VM 111. A portion of the memory 300 is assigned to the VM 111 as v-memory 311. The I/O devices 801, 802 are also directly assigned to the VM 111. Moreover, vDMAR-HW 211 is provided to the VM 111. The cores 405 . . . , 408 are assigned to the VM 112, and operate as vCPUs 415, . . . , 418 of the VM 112. A portion of the memory 300 is assigned to the VM 112 as v-memory 312. The I/O devices 803, 804 are also directly assigned to the VM 112. Moreover, vDMAR-HW 212 is provided to the VM 112. The vDMAR-HW 211, 212 are emulated by the VMM 110B, and DMAR table settings applied to the vDMAR-HW 211, 212 are reflected in the DMAR-HW 200.

A second level VMM 120 operates on the VM 111, and the VMM 120 monitors and controls the state of a VM 121 operating on the VM 111.

The vCPU 411 is assigned to the VM 121, and operates as a vCPU 421 of the VM 121. A portion of the v-memory 311 is assigned to the VM 121 as v-memory 321. The I/O device 801 is also directly assigned to the VM 121. The vDMAR-HW 221 is provided to the VM 121. Note that the vDMAR-HW 221 is emulated by the VMM 110B, and the DMAR table 520 set for the vDMAR-HW 221 is reflected in the DMAR-HW 200, as is described in detail below. Moreover, a guest OS 140 operates on the VM 121.

Figure 25:
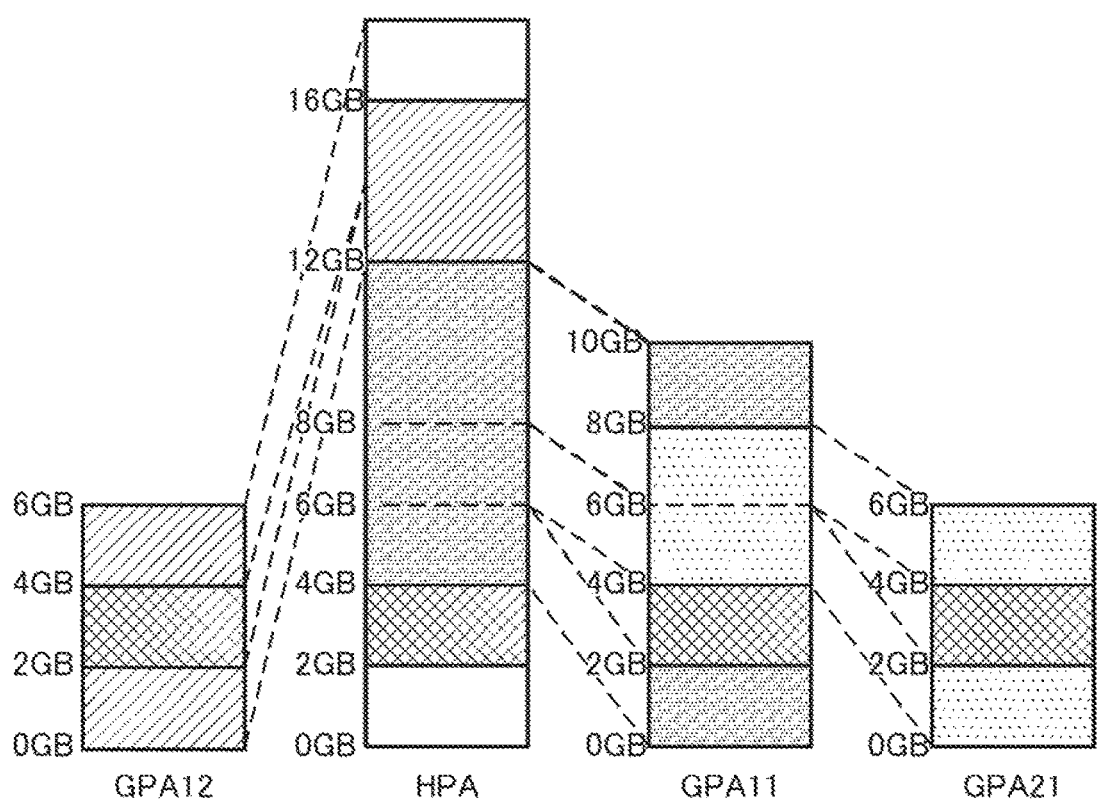
FIG. 25 is a diagram illustrating assignment of memory in the second exemplary embodiment.

FIG. 25 illustrates assignment of memory to the VMs 111, 112, 121. The range spanning from 4 GB to 12 GB in the memory space of the memory 300 (a HPA) is assigned to the VM 111, and the range spanning from 12 GB to 16 GB is assigned to the VM 112. The memory space assigned to the VM 111 is a GPA11, and the memory space assigned to the VM 112 is a GPA12. The range spanning from 0 GB to 2 GB of the HPA is employed by the VMM 110B, and the range spanning from 2 GB to 4 GB is a region mapped by registers of hardware and the like. The range spanning from 4 GB to 8 GB in the memory space of the VM 111 (the GPA11) is assigned to the VM 121. The memory space assigned to the VM 121 is a GPA21.

Explanation first follows regarding application of settings to the EPT and the DMAR table when the VMM 110B constructs the VMs 111, 112. The VMM 110B generates in memory an EPT needed when memory is accessed by a vCPU operating on a VM, and generates a DMAR table needed when memory is accessed by I/O devices assigned to a VM. The memory region that stores the EPT and the DMAR table is a range spanning from 0 GB to 2 GB, assigned for use by the VMM 110B.

Figure 26:
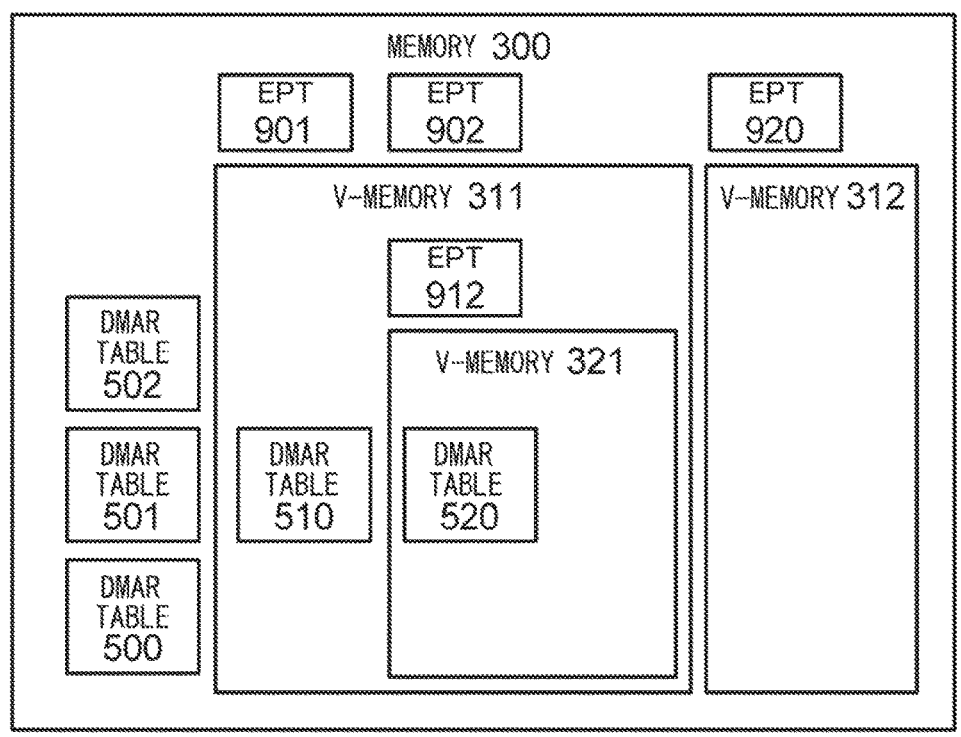
FIG. 26 is a schematic diagram illustrating a memory configuration of the second exemplary embodiment.

FIG. 26 illustrates EPTs and DMAR tables stored in the memory 300. Note that although the memory 300 also stores VMCS and the like as described above, these are omitted from the description. An EPT 901 is an EPT that translates from GPA1 into HPA, and is set for the VMCS for the cores 401, . . . , 404 operating on the VM 111. An EPT 920 is an EPT that performs translation from GPA12 into HPA, and applies settings to the VMCS for the cores 405, . . . , 408 operating on the VM 112.

Figure 27:
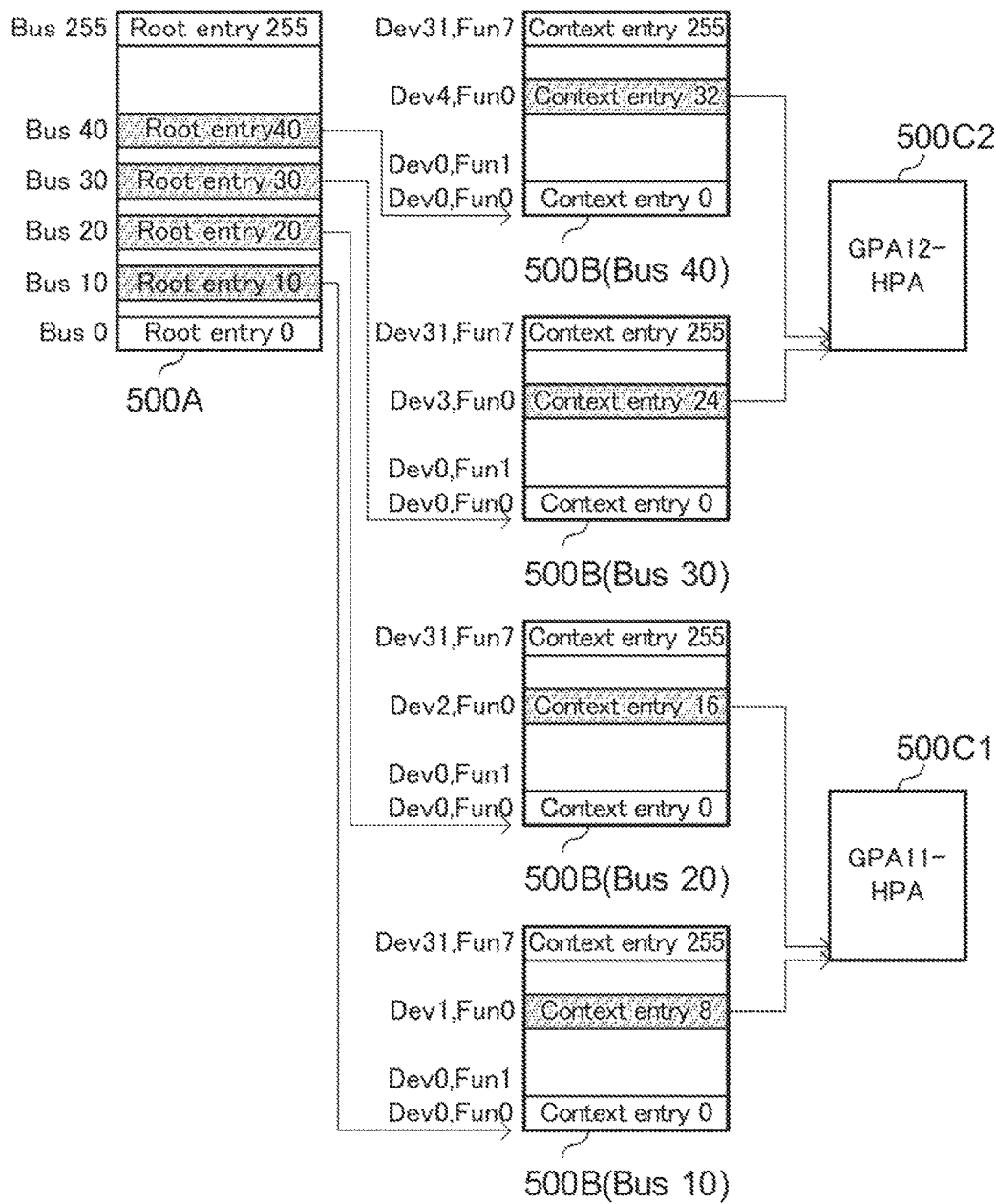
FIG. 27 is a diagram illustrating a DMAR table of the second exemplary embodiment.

FIG. 27 illustrates a DMAR table 500 set for the DMAR-HW 200. Here, the I/O device 801 has bus number 10, device number 1, and function number 0. In such cases, entries corresponding to the I/O device 801 reference a Root entry 10 at bus number 10 of a root entry table 500A. Next, a context entry table 500B (bus 10) is referenced from the Root entry 10. Device number 1 and function number 0 of the context entry table 500B (bus 10) correspond to context entry 8. Context entry 8 then references an address translation table 500C1. The address translation table 500C1 is a table that translates addresses from GPA11 into HPA.

Similarly, the I/O device 802 has bus number 20, device number 2, and function number 0. The I/O device 803 has bus number 30, device number 3, and function number 0. The I/O device 804 has bus number 40, device number 4, and function number 0. An address translation table 500C2 is a table that translates from GPA12 into HPA. In the example of FIG. 27, it is apparent that the I/O devices 801, 802 assigned to the VM ill reference the address translation table 500C1, and the I/O devices 803, 804 assigned to the VM 112 reference the address translation table 500C2.

Explanation next follows regarding application of settings to the EPTs and DMAR tables by the second level VMM 120 operating on the VM 111 when the VM 121 is constructed. Specifically, the VMM 120 generates an EPT 912 so that access to the v-memory 321 by the vCPU 421 operating on the VM 121 is translated into access to the v-memory 311. The EPT 912 is a table that translates from the GPA21 into the GPA11, and is generated in the v-memory 311. The EPT 912 is set for the vVMCS of the vCPU 411. In order to set the EPT 912 for the vVMCS, the VMM 120 calls a VMWRITE instruction, which is a privileged instruction. However, when the VMM 120 that operates in non-privileged mode calls the VMWRITE instruction, VM-Exit occurs and processing transfers to the VMM 110B.

The VMM 110B generates the EPT 902 when the VM-Exit cause is identified as being application of settings of the EPT 912 to the vVMCS. The EPT 902 is a table that translates from the GPA21 into the HPA. The EPT 902 is generated using the EPT 912 that translates from the GPA21 into the GPA11, and the EPT 901 that translates from the GPA11 into the HPA.

The VMM 120 sets the DMAR table 510 for the vDMAR-HW 211. The DMAR table 510 is a table for translating DMA by the I/O device 801 that is assigned to the VM 121 from the GPA21 into the GPA11. When the VMM 120 accesses the register of the vDMAR-HW 211 in order to set the DMAR table 510. VM-Exit occurs and processing transfers to the VMM 110B.

Figure 28:
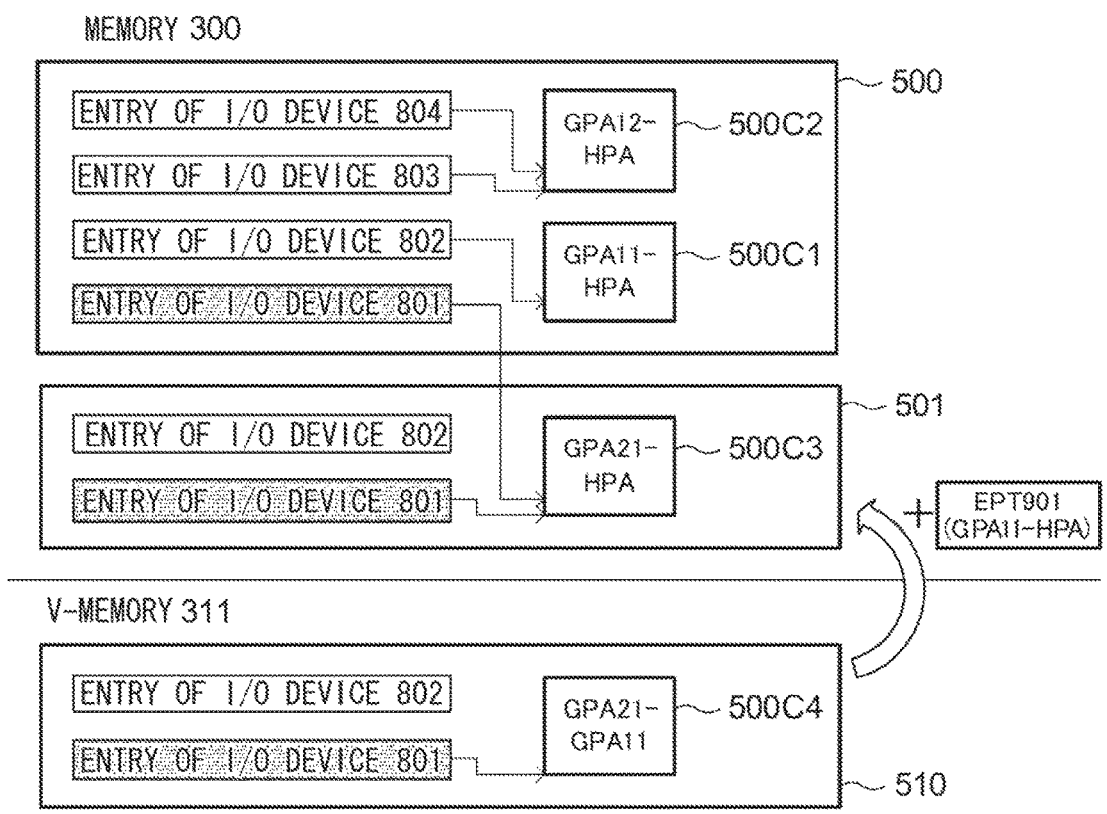
FIG. 28 is a diagram illustrating setting of a DMAR table of the second exemplary embodiment.

The VMM 110B generates the DMAR table 501 when the VM-Exit cause is identified as setting the DMAR table 510 for the vDMAR-HW 211. FIG. 28 illustrates the DMAR table 500 that is updated using the DMAR table 501. DMA by the I/O device 801 assigned to the VM 121 is translated from GPA21 into GPA11 in the DMAR table 510 generated by the VMM 120. Entries in the DMAR table 510 corresponding to the I/O device 802 are pass-through settings (toward the memory space of the VM 111) since the I/O device 802 has not been assigned from the VM 111 to another VM. DMA by the I/O device 801 is translated from the GPA21 into the HPA in the DMAR table 501. The DMAR table 501 is generated using an address translation table 500C4 in the DMAR table 510 that translates from the GPA21 into the GPA11, and the EPT 901 that translates from the GPA11 to the HPA. The settings out of those in the DMAR table 500 that are for the I/O devices 801, 802 assigned to the VM 111 are updated with the contents of the DMAR table 501. The entries in the DMAR table 500 corresponding to the I/O device 801 are updated so as to reference an address translation table 500C3. The entries in the DMAR table 500 corresponding to the I/O device 802 are left referencing the address translation table 500C1 without modification, so that the entries in the DMAR table 501 corresponding to the I/O device 802 are set as pass-through.

When updates to the DMAR table 500 are complete, to enable the fact that the DMAR table 510 has been updated by the VMM 120 to be detectable, the VMM 110B reflects the WP setting of the memory region in which the DMAR table 510 is generated in the EPT 901. When these settings are completed, VM-Entry to the VMM 120 is performed so that processing returns.

In the VMM 120, settings for running the vCPU 421 are applied to the vVMCS of the vCPU 411. As described above, VM-Exit is performed and processing is performed by the VMM 110B since applying settings to the vVMCS is accompanied by execution of VMREAD/VMWRITE, which are privileged instructions. When application of these settings is complete, a VM-Entry instruction is executed to transfer processing to the guest OS 140.

When the VMM 120 which is operating in non-privileged mode calls VM-Entry which is a privileged instruction. VM-Exit is performed and processing transfers to the VMM 110B. When the VM-Exit cause is identified as a call to a VM-Entry instruction, the VMM 110B applies settings to the VMCS of the core 401 to cause the VM 121 to operate, and performs VM-Entry to the guest OS 140.

Figure 29:
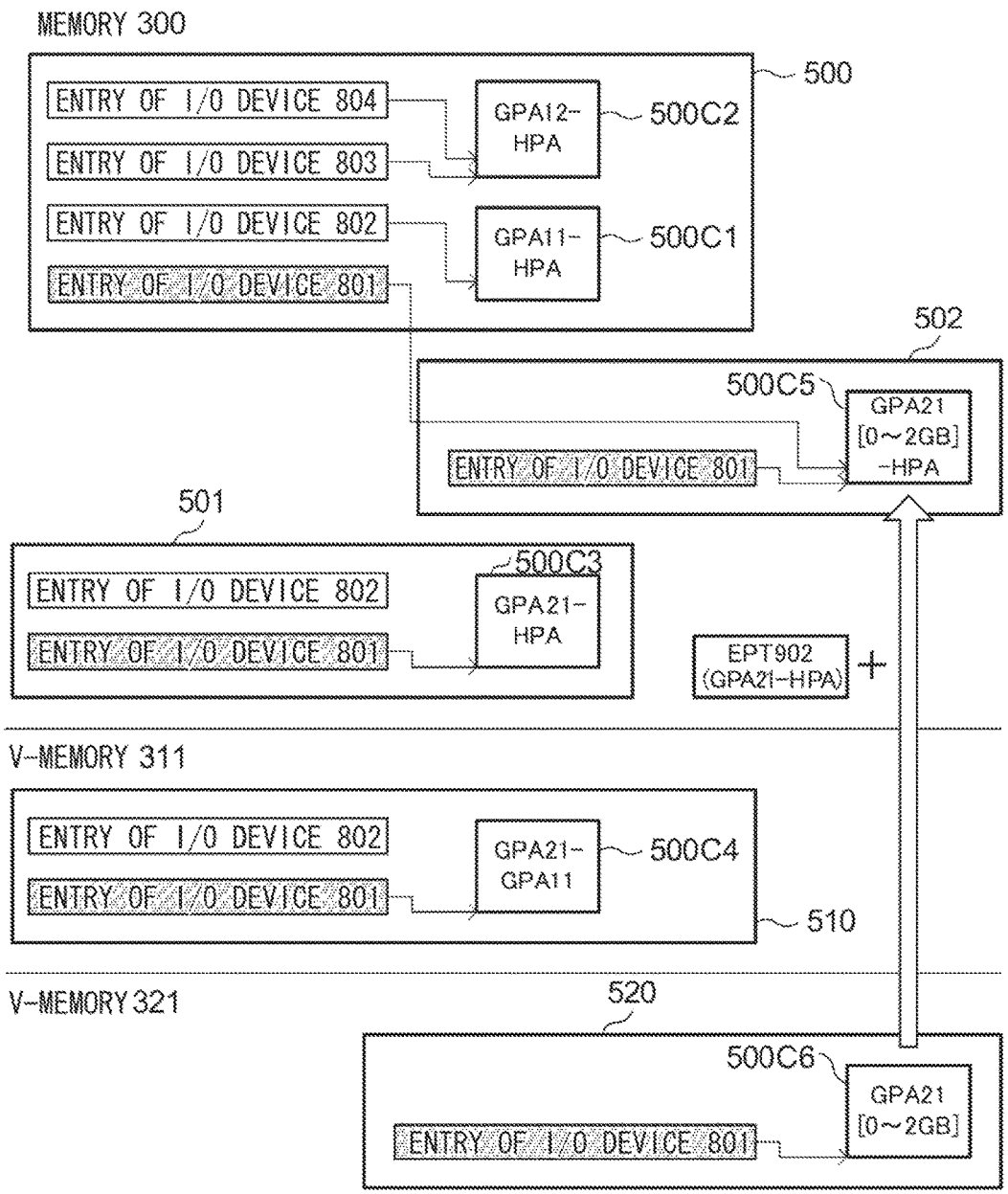
FIG. 29 is a diagram illustrating setting of a DMAR table of the second exemplary embodiment.

The guest OS 140 operating on the VM 121 sets the DMAR table 520 for the vDMAR-HW 221 to restrict DMA by the I/O device 801. For example, explanation follows regarding a case in which a restriction is set that permits the I/O device 801 to access only the region of the GPA21 spanning from 0 GB to 2 GB, with reference to FIG. 29. An address translation table 500C6 of the DMAR table 520 is set such that access to ranges of the GPA21 other than from 0 GB to 2 GB is forbidden.

The guest OS 140 accesses the register of the vDMAR-HW 221 in order to set the DMAR table 520 for the vDMAR-HW 221. This access causes a VM-Exit. The VMM 110B advances processing as it is, without transferring processing to the VMM 120 when the VM-Exit cause is identified as setting the DMAR table 520 for the vDMAR-HW 221. The VMM 110B generates the DMAR table 502 that is the DMAR table 520 of GPA21 space translated into a table of HPA space. The address translation table 500C6 of the DMAR table 520 uses the EPT 902, which translates from the GPA21 into the HPA, to translate into an address translation table 500C5. As illustrated in FIG. 25, the region of the GPA21 spanning from 0 GB to 2 GB is translated into the region of the HPA spanning from 6 GB to 8 GB. Accordingly, the address translation table 500C5 is translated to the region of the HPA spanning from 6 GB to 8 GB when the region of the GPA21 spanning from 0 GB to 2 GB is accessed, and access to other ranges is set as forbidden. The VMM 110B modifies entries corresponding to the I/O device 801 in the DMAR table 500 such that they reference the address translation table 500C5 of the DMAR table 502.

When application of the update to the DMAR table 500 has completed, the WP setting of the memory region in which the DMAR table 520 was generated is reflected in the EPT 902 by the VMM 110B so that updates to the DMAR table 520 by the guest OS 140 can be detected.

The VMM 110B executes a VM-Entry instruction to return processing to the guest OS 140.

As described above, initial settings for the DMAR-HW 200 are made by the guest OS 140 on the VM 121.

Explanation next follows regarding updates to the DMAR table that is set for the DMAR-HW 200 by the guest OS 140. As illustrated in FIG. 30, explanation is given here of an example of a case in which the guest OS 140 modifies the address range accessible to the I/O device 801 from the range of the GPA21 spanning from 0 GB to 2 GB to the range spanning from 4 GB to 6 GB. An address translation table 500C8 in the DMAR table 520 is set to indicate that only the address range of the GPA21 spanning from 4 GB to 6 GB is accessible. The guest OS 140 generates the address translation table 500C8, and updates the address translation table 500C8 so as to reference entries in the DMAR table 520 corresponding to the I/O device 801. The update performed at this time generates a VM-Exit since the region of the DMAR table 520 prior to the update is set as WP.

When an update to entries corresponding to the I/O device 801 in the DMAR table 520 is identified as the VM-Exit cause, processing advances as is in the VMM 110B, to which processing has transferred, without transferring processing to the VMM 120. The VMM 110B identifies that entries in the DMAR table 520 corresponding to the I/O device 801 are referencing the new address translation table 500C8. An address translation table 500C7 that is the address translation table 500C8 of the GPA21 space translated into a table of the HPA space is then generated, and made to reference entries corresponding to the I/O device 801 in the DMAR table 502. Moreover, entries in the DMAR table 500 corresponding to the I/O device 801 are also made to be referenced by the address translation table 500C7. The address translation table 500C5 may be erased in cases in which there are no longer any entries referencing the address translation table 500C5. The WP setting of the memory region that was used by the address translation table 500C6 is then erased, and the WP setting of the region of the new address translation table 500C8 is reflected in the EPT 902.

As described above, the DMAR table 500 set in the DMAR-HW 200 is updated by the guest OS 140 in the VM 121.

Figure 31:
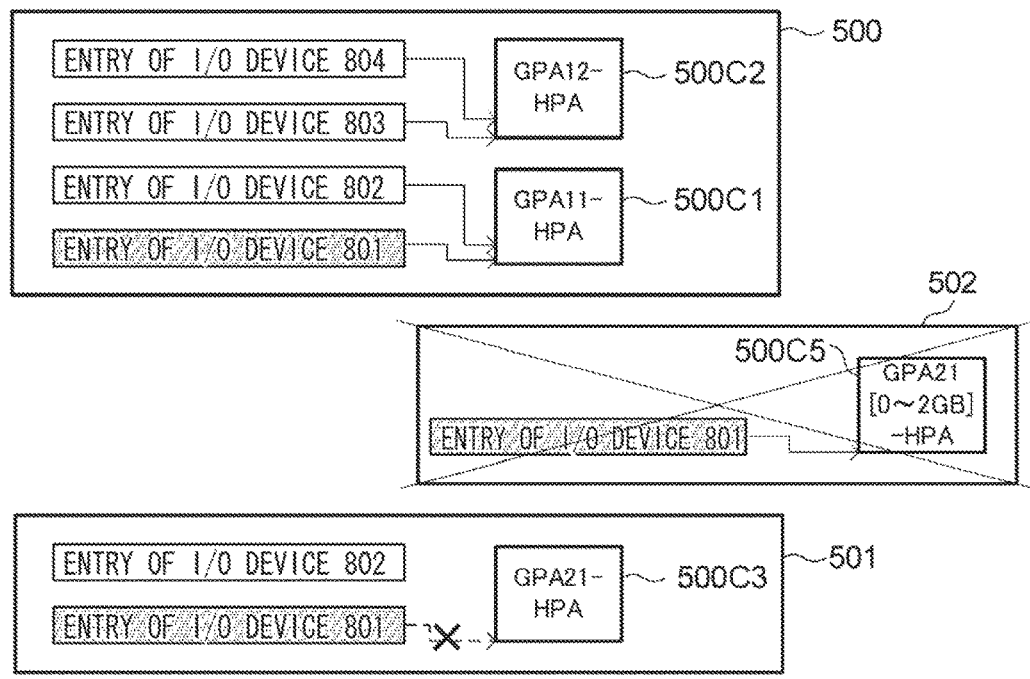
FIG. 31 is a diagram illustrating erasure of settings of a DMAR table of the second exemplary embodiment.

Finally, explanation follows regarding setting the DMAR table 500 for the DMAR-HW 200 when the VMM 120 erases the VM 121. When the VM 121 is erased, the resources that were assigned to the VM 121 are released. The I/O device 801 that was assigned to the VM 121 is also released, and management of the I/O device 801 is left to the VMM 120. As illustrated in FIG. 31, entries in the DMAR table 510 corresponding to the I/O device 801 managed by the VMM 120 reference the address translation table 500C4. The entries in the DMAR table 510 corresponding to the I/O device 801 are updated so as to return these references to pass-through settings. VM-Exit occurs due to this update since the region of the DMAR table 510 is set as WP.

In the VMM 110B, to which processing has transferred, the VM-Exit cause is identified as an update to entries in the DMAR table 510 corresponding to the I/O device 801, and it is detected that these entries are pass-through settings. The VMM 110B therefore once again makes the entries in the DMAR table 500 corresponding to the I/O device 801 reference the address translation table 500C1 that performs GPA11-HPA translation. If the address translation table 500C3 is no longer referenced by any entries, the address translation table 500C3 may be erased. This is then reflected in the EPT 901 such that the WP setting of the memory region that was employed by the address translation table 500C4 is then erased. The DMAR table 502 may also be erased since the DMAR table 502 is no longer referenced by the DMAR table 500. Moreover, this is reflected in the EPT 902 such that the WP setting of the memory region that was employed by the DMAR table 520 is erased.

As described above, the update is applied to the DMAR table 500 accompanying erasure of the VM 121.

Third Exemplary Embodiment

Explanation next follows regarding an information processing device according to a third exemplary embodiment. Note that portions similar to those of the information processing devices according to the first exemplary embodiment and the second exemplary embodiment are allocated the same reference numerals, and detailed explanation thereof is omitted.

Figure 32:
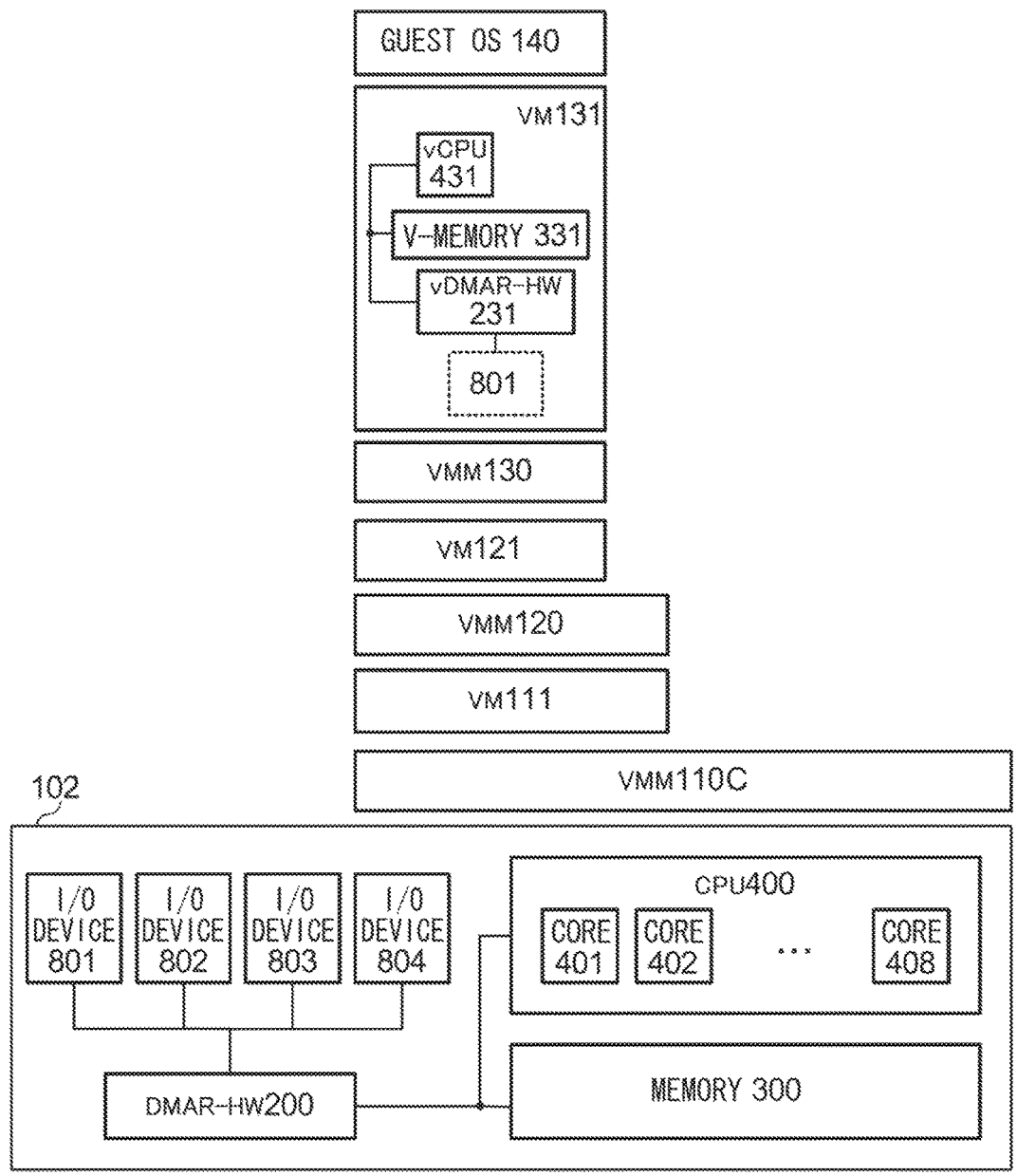
FIG. 32 is a schematic diagram illustrating a configuration of a third exemplary embodiment.

As illustrated in FIG. 32, hardware resources of an information processing device 102 according to the third exemplary embodiment are similar to those of the information processing device 101 according to the second exemplary embodiment. Three levels of virtualization are configured in the third exemplary embodiment. In contrast to the configuration of the second exemplary embodiment illustrated in FIG. 24, a VMM 130 is present in the VM 121, a VM 131 is constructed in the VMM 130, and a guest OS 140 operates on the VM 131. A vCPU 431 and v-memory 331 are assigned to the VM 131, and an I/O device 801 is also directly assigned to the VM 131. Moreover, vDMAR-HW 231 is also provided to the VM 131. The memory space in which the guest OS 140 operates is GPA3.

Figure 33:
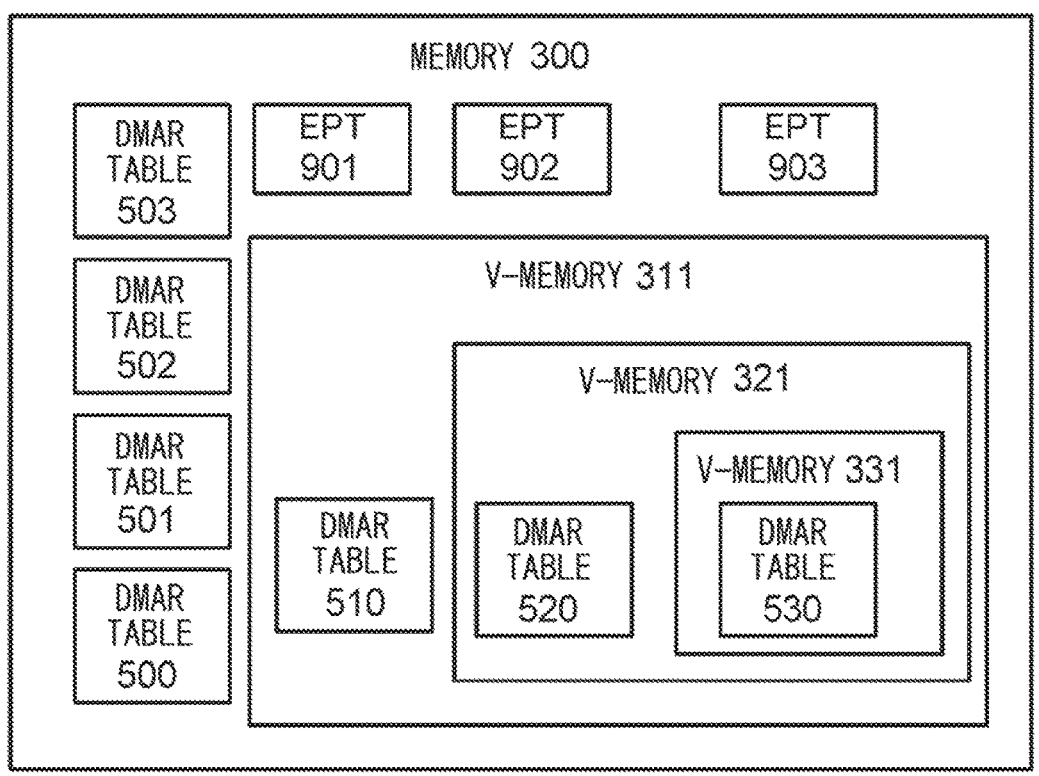
FIG. 33 is a schematic diagram illustrating a memory configuration of the third exemplary embodiment.

FIG. 33 illustrates DMAR tables and EPTs stored in memory 300 configured as illustrated in FIG. 32. Although the VMCS described above are also stored in the memory 300, these are omitted from the description. The memory 300 differs from the configuration of the memory 300 of the first exemplary embodiment illustrated in FIG. 17 in that a portion of the region assigned to the v-memory 321 is assigned to the v-memory 331. The region assigned to the v-memory 331 stores a DMAR table 530 based on a GPA3 generated by the guest OS 140. A DMAR table 503 that is the DMAR table 530 translated into a HPA based table is also stored in the memory 300. An EPT 903 that is a GPA3-HPA translation table is also stored in the memory 300.

Figure 34:
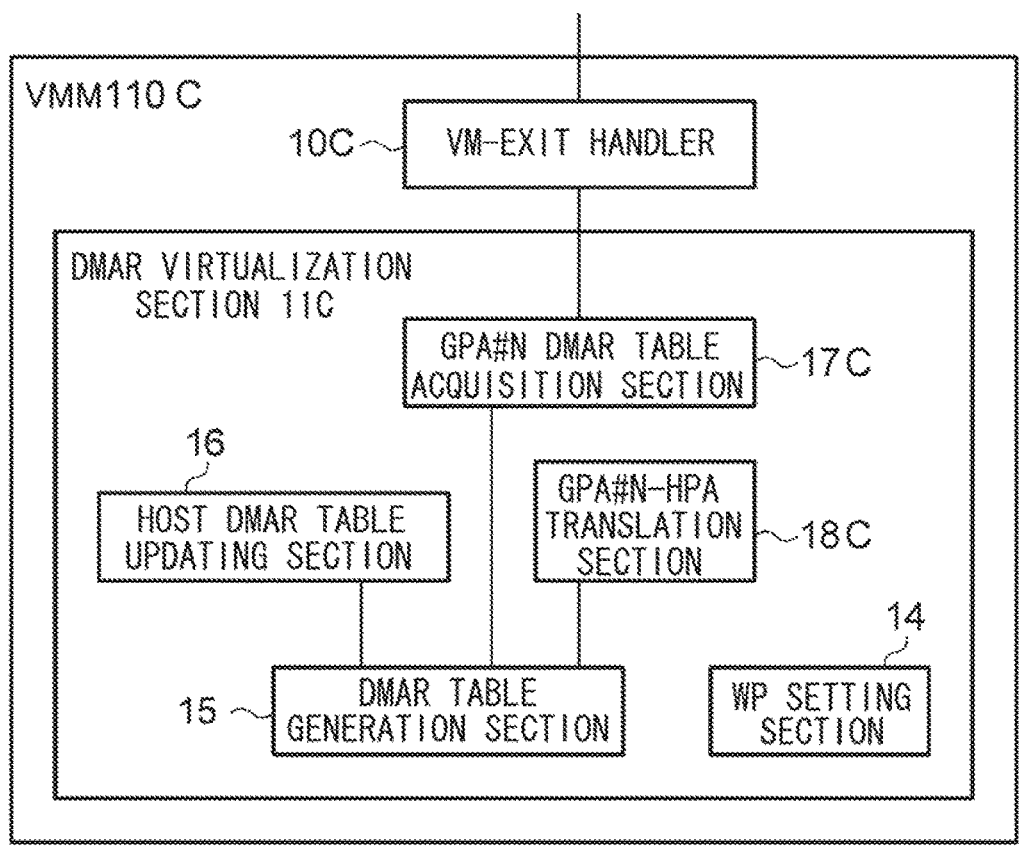
FIG. 34 is a functional block diagram of a VMM of the third exemplary embodiment.

As illustrated in FIG. 34, a VMM 110C is provided with a VM-Exit handler 10C and a DMAR virtualization section 11C. The DMAR virtualization section 11C is provided with a GPA#n DMAR table acquisition section 17C, a GPA#n-HPA translation section 18C, a WP setting section 14, a DMAR table generation section 15, and a host DMAR table updating section 16.

The GPA#n DMAR table acquisition section 17C acquires a DMAR table (DMAR tables 510, 520, 530) generated based on a stipulated GPA#n (n=1, 2, 3). The GPA#n-HPA translation section 18C uses the EPT 901, 902, or 903 corresponding to the GPA#n to translate the stipulated GPA#n (n=1, 2, 3) to addresses based on the HPA.

Figure 35:
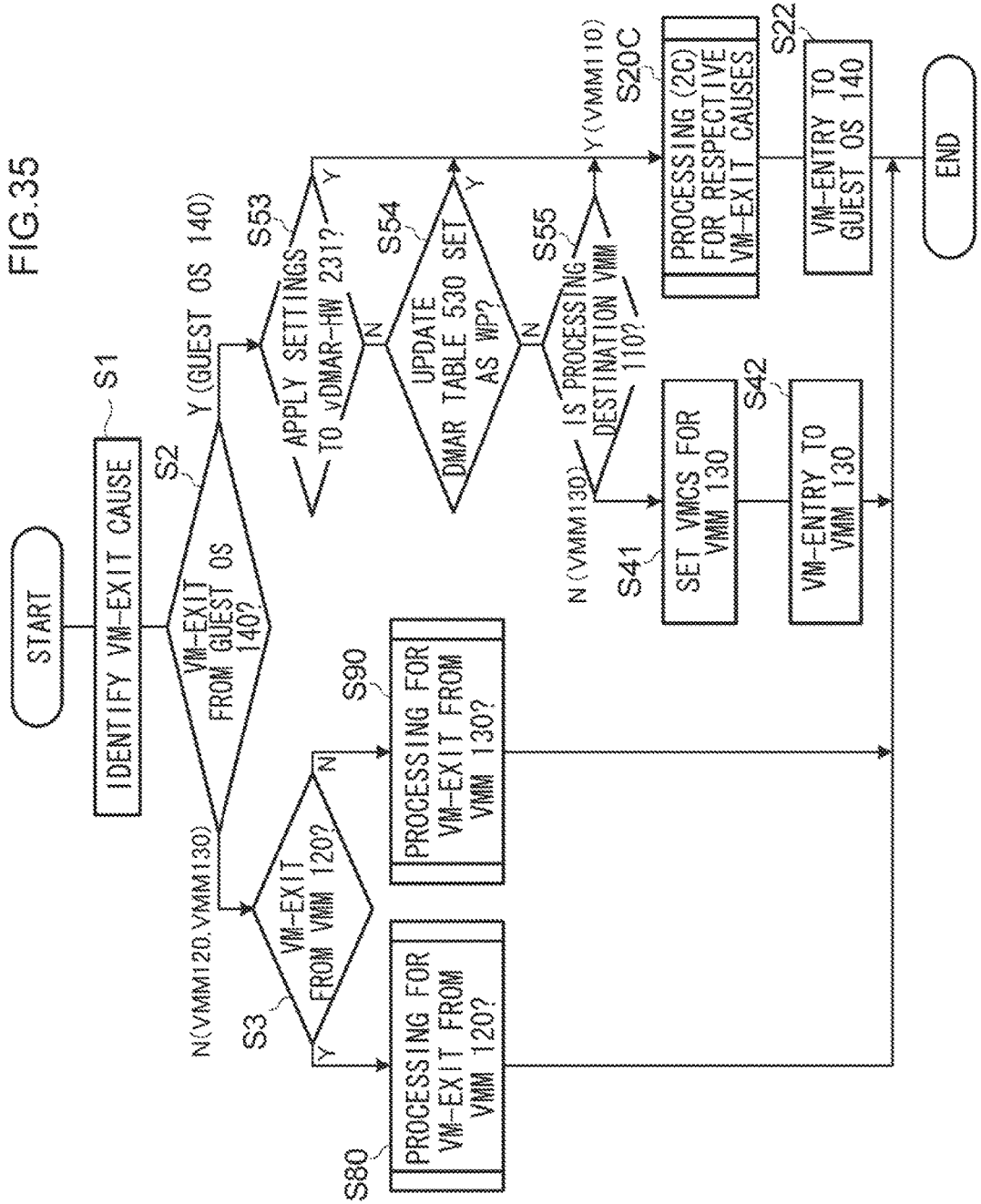
FIG. 35 is a flowchart illustrating processing of a VM-Exit handler of the third exemplary embodiment.
Figure 36:
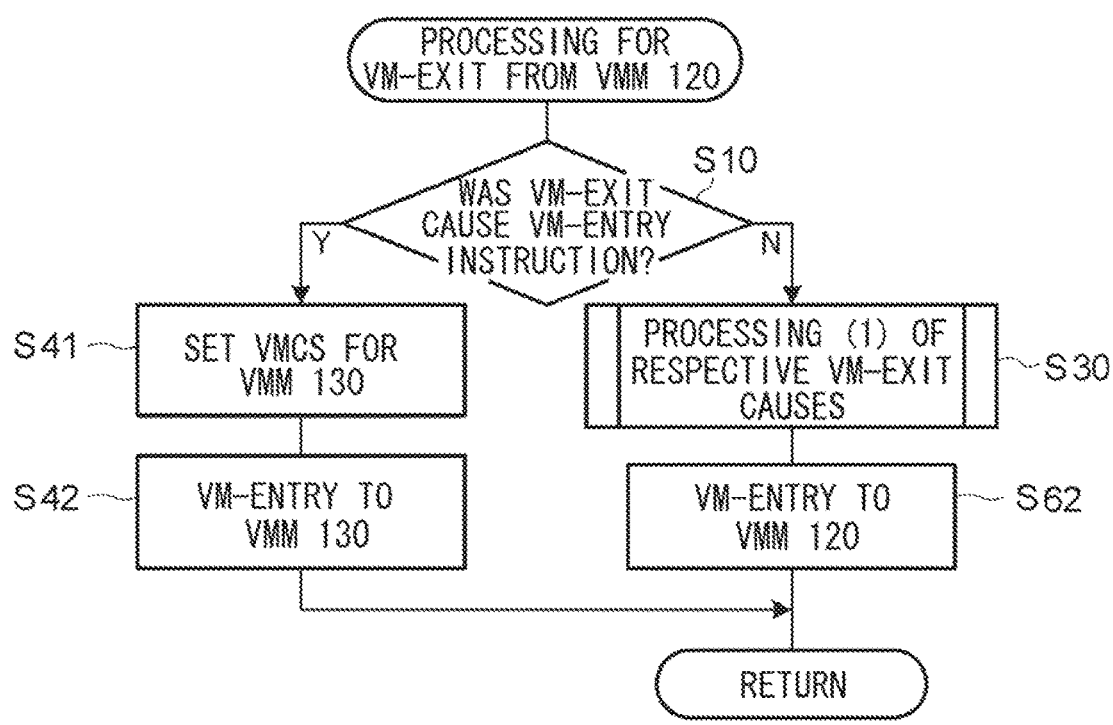
FIG. 36 is a flowchart illustrating processing of a VM-Exit from a VMM 120 of the third exemplary embodiment.
Figure 37:
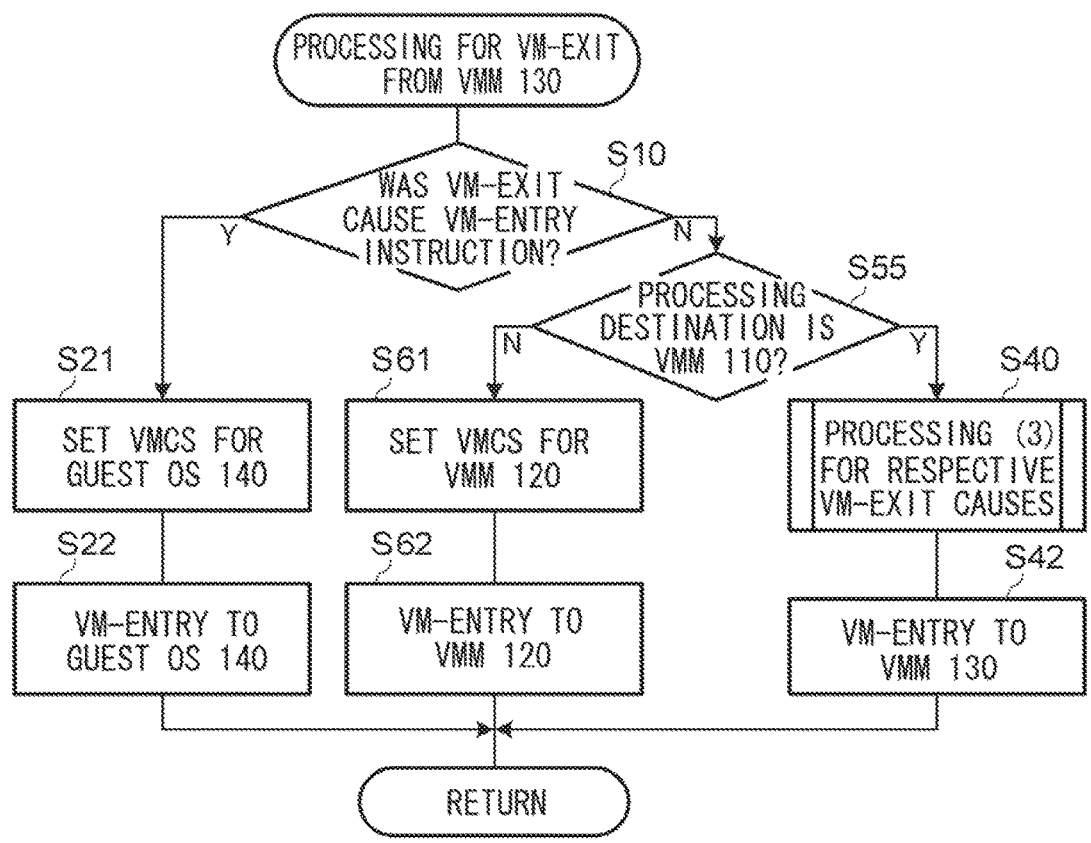
FIG. 37 is a flowchart illustrating processing of a VM-Exit from a VMM 130 of the third exemplary embodiment.
Figure 38:
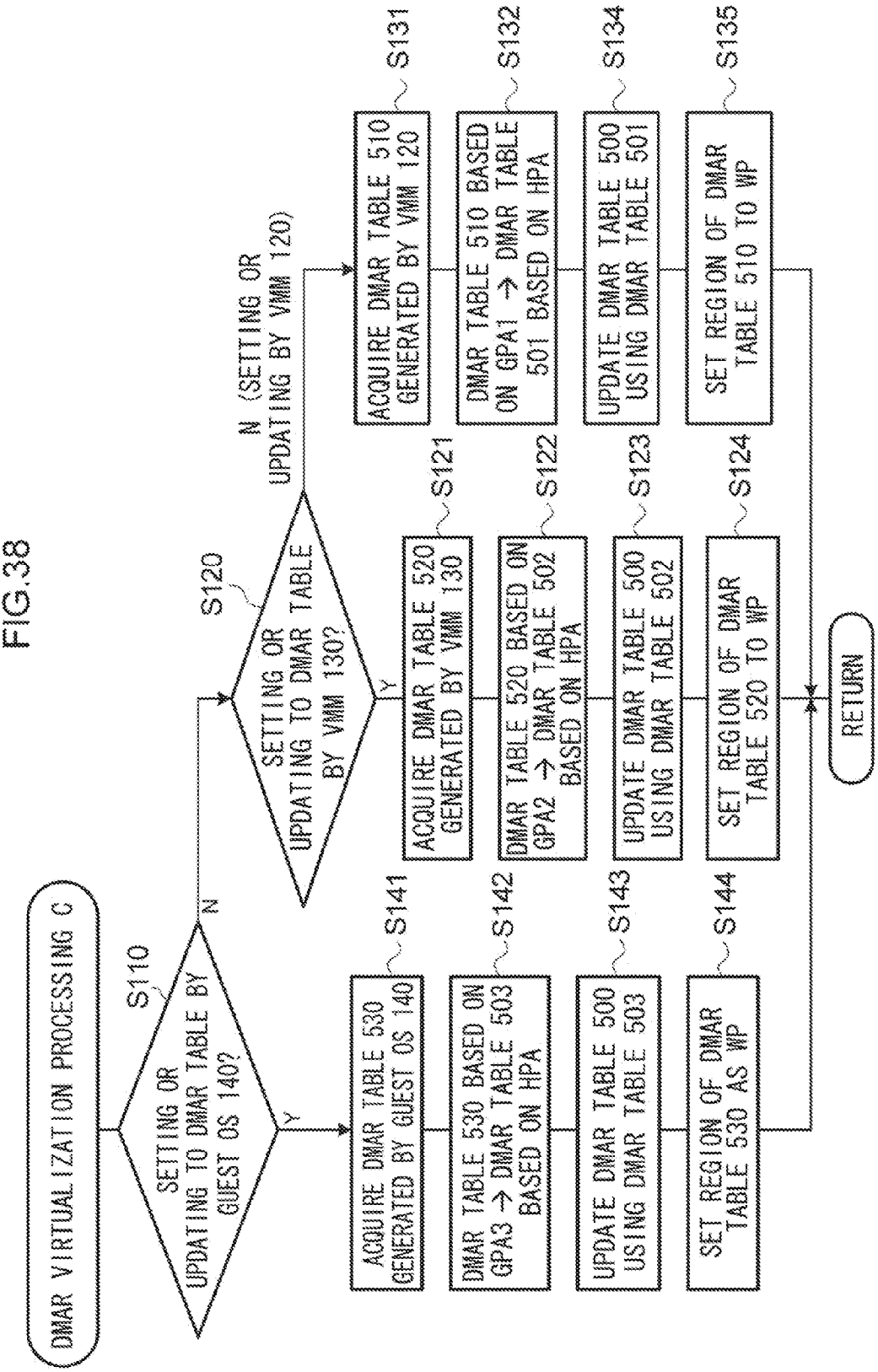
FIG. 38 is a flowchart illustrating DMAR virtualization processing of the third exemplary embodiment.

Explanation next follows regarding nested virtualization processing of DMAR-HW in the third exemplary embodiment, with reference to FIG. 35 to FIG. 38. FIG. 35 illustrates a flow of processing by the VM-Exit handler 10C. FIG. 36 illustrates a flow of processing of VM-Exit from the VMM 120 in the flow of processing by the VM-Exit handler 10C. FIG. 37 illustrates a flow of processing of VM-Exit from the VMM 130 in the flow of processing by the VM-Exit handler 10C. FIG. 38 illustrates a flow of DMAR virtualization processing C by the DMAR virtualization section 11C. Note that processing similar to the nested virtualization processing for DMAR-HW of first exemplary embodiment illustrated in FIG. 20 and FIG. 21 is allocated the same reference numerals and detailed explanation thereof is omitted.

At step S1 of the flow of processing of the VM-Exit handler 10C illustrated in FIG. 35, the VM-Exit handler 10C catches a VM-Exit from the guest OS 140, the VMM 120, or the VMM 130. The VM-Exit handler 10C then identifies the VM-Exit cause of the caught VM-Exit.

Next, at step S2, the VM-Exit handler 10C determines whether or not the caught VM-Exit is VM-Exit from the guest OS 140. The process transitions to step S53 in the case of VM-Exit from the guest OS 140, and the process transitions to step S3 in the case of VM-Exit from the VMM 120 or the VMM 130.

At step S53, the VM-Exit handler 10C determines whether or not the VM-Exit cause identified at step S1 above was application of settings to the vDMAR-HW 231 by the guest OS 140. The process transitions to step S20C in the case of application of settings to the vDMAR-HW 231 so that processing by the VMM 110C continues, and the process transitions to step S54 in cases other than application of settings to the vDMAR-HW 231.

At step S54, the VM-Exit handler 10C determines whether or not the VM-Exit cause identified at step S1 above is an update to the DMAR table 530 that has been set as WP by the guest OS 140. The process transitions to step S20C in the case of an update to the DMAR table 530 so that processing by the VMM 110C continues, and the process transitions to step S55 in cases other than an update to the DMAR table 530.

At step S20C, the VM-Exit handler 10C executes processing (2C) for respective VM-Exit causes. The processing (2C) for respective VM-Exit causes is similar to the processing (1) for respective VM-Exit causes illustrated in FIG. 11. However, "apply settings to vDMAR-HW 211?" of step S31 is replaced by "apply settings to vDMAR-HW 231?". "Update DMAR table 510 set as WP?" of step S32 is replaced by "update DMAR table 530 set as WP?". "DMAR virtualization processing" of step S100 is replaced by "DMAR virtualization processing C".

At step S3, the VM-Exit handler 10C determines whether or not the trapped VM-Exit is VM-Exit from the VMM 120. In the case of VM-Exit from the VMM 120, the process transitions to step S80, and processing for VM-Exit from the VMM 120 illustrated in FIG. 36 is executed. The process transitions to step S90 in the case of VM-Exit from the VMM 130, and processing for VM-Exit from the VMM 130 illustrated in FIG. 37 is executed.

At step S10 of the processing for VM-Exit from the VMM 120 illustrated in FIG. 36, the VM-Exit handler 10C determines whether or not the VM-Exit cause identified at step S1 is a VM-Entry instruction. When the VM-Exit cause is VM-Entry instruction, at step S41, the VM-Exit handler 10 applies various settings to the VMCS to transfer processing to the VMM 130. Next, at step S42, the VM-Exit handler 10C performs VM-Entry to the VMM 130 to transfer processing to the VMM 130, and the process returns to processing by the VM-Exit handler 10C illustrated in FIG. 35.

In cases in which the VM-Exit handler 10C determined at step S10 that the VM-Exit cause was not a VM-Entry instruction, the process transitions to step S30 and processing (1) for respective VM-Exit causes illustrated in FIG. 11 is executed. Note that "DMAR virtualization processing" of step S100 is replaced by "DMAR virtualization processing C".

Next, at step S62, the VM-Exit handler 10C performs VM-Entry to the VMM 120 to transfer processing to the VMM 120, and the process returns to processing by the VM-Exit handler 10C illustrated in FIG. 35.

At step S10 of the processing for VM-Exit from the VMM 130 illustrated in FIG. 37, the VM-Exit handler 10C determines whether or not the VM-Exit cause identified at step S1 was a VM-Entry instruction. When the VM-Exit cause is a VM-Entry instruction, at step S21, the VM-Exit handler 10C applies various settings to the VMCS to transfer processing to the guest OS 140. Next, at step S22, the VM-Exit handler 10C performs VM-Entry to the guest OS 140 to transfer processing to the guest OS 140, and the process returns to processing by the VM-Exit handler 10C illustrated in FIG. 35.

When the VM-Exit handler 10C has determined at step S10 that the VM-Exit cause was not a VM-Entry instruction, the process transitions to step S55. At step S55, the VM-Exit handler 10C determines whether processing according to the VM-Exit cause is to be performed as is by the VMM 110C, or is to be delegated to the VMM 120. The process transitions to step S40 in the case of processing by the VMM 110C, and the process transitions to step S61 in the case of processing by the VMM 120.

At step S61, the VM-Exit handler 10C applies various settings to the VMCS to transfer processing to the VMM 120. Next, at step S62, the VM-Exit handler 10C performs VM-Entry to the VMM 120 to transfer processing to the VMM 120, and the process returns to the processing by the VM-Exit handler 10C illustrated in FIG. 35.

At step S40, the VM-Exit handler 10C executes processing (3) for respective VM-Exit causes. The processing (3) for respective VM-Exit causes is similar to the processing (1) for respective VM-Exit causes illustrated in FIG. 1. However, "apply settings to DMAR-HW 211?" of step S31 is replaced by "apply settings to DMAR-HW 221?". "Update DMAR table 510 set as WP?" of step S32 is replaced by "update DMAR table 520 set as WP?". "DMAR virtualization processing" of step S100 is replaced by "DMAR virtualization processing C".

Next, at step S42, the VM-Exit handler 10C performs VM-Entry to the VMM 130 to transfer processing to the VMM 130, and the process returns to processing by the VM-Exit handler 10C illustrated in FIG. 35.

Next, at step S110 of the DMAR virtualization processing C illustrated in FIG. 38, the VM-Exit handler 10C determines whether or not the VM-Exit cause is either of application of settings to the vDMAR-HW 231, or an update to the DMAR table 530 that has been set as WP, by the guest OS 140. The process transitions to step S141 in the case of affirmative determination, and the process transitions to step S120 in the case of negative determination.

At step S141, the GPA#n DMAR table acquisition section 17C acquires the DMAR table 530 generated by the guest OS 140. The DMAR table 530 has been generated based on the GPA3. At the next step S142, the DMAR table generation section 15 uses the GPA#n-HPA translation section 18C to generate the DMAR table 503 that is the DMAR table 530 based on the GPA3 translated into a table based on the HPA.

Next, at step S143, the host DMAR table updating section 16 updates settings of the DMAR table 500 for the I/O device 801 using the contents of the DMAR table 503. Next, at step S144, the WP setting section 14 reflects the WP setting of the memory region in which the DMAR table 530 is stored in the EPT 903, which performs GPA3-HPA translation for the CPU 400, to enable updates to the DMAR table 530 by the guest OS 140 to be detected.

When the process transitions to step S120, the VM-Exit handler 10C determines whether or not the VM-Exit cause was either of application of settings to the vDMAR-HW 221, or an update to the DMAR table 520, which was set as WP, by the VMM 130. The process transitions to step S121 in the case of affirmative determination. In cases in which the VM-Exit cause is either of application of settings to the vDMAR-HW 211, or an update to the DMAR table 510, which was set as WP, by the VMM 120, negative determination is made an the process transitions to step S131.

Similarly to the DMAR virtualization processing B of the first exemplary embodiment illustrated in FIG. 21, steps S121 to S124 or steps S131 to S134 are then executed, and the process returns to processing by the VM-Exit handler 10C illustrated in FIG. 35.

FIG. 39 illustrates shifts between non-privileged mode and privileged mode in nested virtualization processing for DMAR-HW of the third exemplary embodiment. Note that a case is illustrated here in which the I/O device 801 is assigned to the guest OS 140, and the guest OS 140 applies settings to the vDMAR-HW 231 for the I/O device 801. Also note that single-dot-dashed arrows indicate VM-Exit from non-privileged mode to privileged mode, and double-dot-dashed arrows indicate VM-Entry from privileged mode to non-privileged mode. Portions similar to shifts between non-privileged mode and privileged mode in the nested virtualization processing for DMAR-HW of the first exemplary embodiment illustrated in FIG. 22 are allocated the same reference numerals and detailed explanation thereof is omitted.

As illustrated in FIG. 39, shifts between non-privileged mode and privileged mode in the third exemplary embodiment are similar to shifts between non-privileged mode and privileged mode in the first exemplary embodiment illustrated in FIG. 22. Technology disclosed herein can be applied similarly applied even when there are four or more levels of virtualization. Application of settings or updates to DMAR tables based on a GPA#n by an upper level guest OS are detected even when there are four or more levels of virtualization. When these are detected, the DMAR table generated based on the GPA#n may be translated in the first level VMM into a DMAR table based on the HPA, without transferring processing to an upper level VMM.

Note that although explanation was been given regarding an example in which Intel (registered trade mark) VT-x and VT-d serve as examples of a virtualization assistance mechanism of a CPU and a virtualization assistance mechanism for DMAR-HW, there is no limitation thereto. It is sufficient for the virtualization assistance mechanism of the CPU to operate when the CPU shifts between privileged mode and non-privileged mode. Moreover, it is sufficient for the virtualization assistance mechanism for DMAR-HW to be a mechanism that performs DMA using a translation table.

Explanation has been given of a mode in which the information processing program 50, which is an example of an information processing program of technology disclosed herein, is pre-stored (pre-installed) on the storage section 900. However, the information processing program of technology disclosed herein may be provided in a mode recorded to a recording medium such as a CD-ROM or a DVD-ROM.

A translation mechanism using hardware that performs translation of addresses for DMA of an input/output device such as DMAR-HW of related technology handles only one level of virtualization. This therefore results in the problem that virtual machine monitors and guest programs on an upper level than a second level are not employable in such nested virtualization technology.

The related technology that provides a virtualization assistance mechanism in a second level of virtualization in the nested virtualization described above could also conceivably be applied to DMAR-HW. However, this would lead to the problem of a large overhead due to complex processing, and time would be needed for virtualization of DMAR-HW for presentation to guest programs.

An aspect of technology disclosed herein enables virtualization to be accelerated when providing, to a guest program in a nested virtualization environment, a translation mechanism using hardware that performs translation of addresses for DMA by an input/output device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device, comprising:
a memory configured to store a translation table employed by an address translation mechanism;
a processor coupled to the memory, the processor configured to execute a first level virtual machine monitor running on system hardware and supporting a virtual machine, an upper level virtual machine monitor running on the upper level virtual machine having a Quest program running therein, and construct a nested virtualization environment in which the first level virtual machine monitor operates in privileged mode, and the upper level virtual machine monitor and the guest program in the upper level virtual machine operate in non-privileged mode;
a virtualization assistance mechanism that identifies a cause of a shift from non-privileged mode to privileged mode that has occurred in processing by the guest program in the upper level virtual machine;
the first level virtual machine monitor acquires a table generated by the guest program, and generates, without interposing the upper level virtual machine monitor, the translation table for host memory space in which the first level virtual machine monitor operates from the table for guest memory space in which the upper level virtual machine monitor operates, based on a correspondence relationship between the guest memory space, and the host memory space, when the identified cause of the shift from non-privileged mode to privileged mode is a setting or an updating of the virtual translation table employed in a virtual translation mechanism provided to the guest program by virtualizing the address translation mechanism for hardware that uses the set translation table to translate addresses of direct memory access (DMA) by an input/output device assigned to the upper level virtual machine, the translation table is generated in the memory, and the first address thereof is set in a register of the address translation mechanism for hardware, the translation table is generated in the memory, and the first address thereof is set in a register of the address translation mechanism for hardware.

2. The information processing device of claim 1, wherein, in the process, processing with respect to the virtual translation mechanism and the virtual translation table is set as exception handling so that a shift from non-privileged mode to privileged mode occurs when processing of the guest program sets or updates the virtual translation table, when setting the translation table.

3. The information processing device of claim 1, wherein, in the process, when setting the translation table, the virtual translation table based on addresses of the guest memory space is acquired, and, based on the correspondence relationship, the acquired virtual translation table is translated into a translation table that is based on addresses of the host memory space and set as the translation table used by the address translation mechanism.

4. An information processing method, comprising:
executing a first level virtual machine monitor running on system hardware and supporting a virtual machine, an upper level virtual machine monitor running on the upper level virtual machine having a guest program running therein, and construct a nested virtualization environment in which the first level virtual machine monitor operates in privileged mode, and the upper level virtual machine monitor and the Quest program in the upper level virtual machine operate in non-privileged mode;

a virtualization assistance mechanism that identifies a cause of a shift from non-privileged mode to privileged mode that has occurred in processing by the guest program in the upper level virtual machine;

acquiring, by the first level virtual machine monitor, a table generated by the guest program, and generates, without interposing the upper level virtual machine monitor, a translation table for host memory space in which the first level virtual machine monitor operates from the table for guest memory space in which the upper level virtual machine monitor operates and employed by an address translation mechanism and stored in a memory, based on a correspondence relationship between the guest memory space and the host memory space, when the identified cause of the shift from non-privileged mode to privileged mode is a setting or an updating of the virtual translation table employed in a virtual translation mechanism provided to the guest program by virtualizing the address translation mechanism for hardware that uses the set translation table to translate addresses of direct memory access (DMA) by an input/output device assigned to the upper level virtual machine, the translation table is generated in the memory, and the first address thereof is set in a register of the address translation mechanism for hardware.

5. The information processing method of claim 4, wherein processing with respect to the virtual translation mechanism and the virtual translation table is set as exception handling so that a shift from non-privileged mode to privileged mode occurs when processing of the guest program sets or updates the virtual translation table, when setting the translation table.

6. The information processing method of claim 4, wherein, when setting the translation table, the virtual translation table based on addresses of the guest memory space is acquired, and, based on the correspondence relationship, the acquired virtual translation table is translated to the translation table that is based on addresses of the host memory space and set as the translation table used by the address translation mechanism.

7. A non-transitory recording medium storing an information processing program that causes a computer to execute a process, the process comprising:

executing a first level virtual machine monitor running on system hardware and supporting a virtual machine, an upper level virtual machine monitor running on the upper level virtual machine having a Quest program running therein, and construct a nested virtualization environment in which the first level virtual machine monitor operates in privileged mode, and the upper level virtual machine monitor and the guest program in the upper level virtual machine operate in non-privileged mode;

a virtualization assistance mechanism that identifies a cause of a shift from non-privileged mode to privileged mode that has occurred in processing by the guest program in the upper level virtual machine;

acquiring, by the first level virtual machine monitor, a table generated by the guest program, and generates, without interposing the upper level virtual machine monitor, a translation table for host memory space in which the first level virtual machine monitor operates from the table for guest memory space in which the upper level virtual machine monitor operates and employed by an address translation mechanism and stored in a memory, based on a correspondence relationship between the guest memory space and the host memory space, when the identified cause of the shift from non-privileged mode to privileged mode is a setting or an updating of the virtual translation table employed in a virtual translation mechanism provided to the guest program by virtualizing the address translation mechanism for hardware that uses the set translation table to translate addresses of direct memory access (DMA) by an input/output device assigned to the upper level virtual machine, the translation table is generated in the memory, and the first address thereof is set in a register of the address translation mechanism for hardware.

8. The non-transitory recording medium of claim 7, wherein, in the process, processing with respect to the virtual translation mechanism and the virtual translation table is set as exception handling so that a shift from non-privileged mode to privileged mode occurs when processing of the guest program sets or updates the virtual translation table, when setting the translation table.

9. The non-transitory recording medium of claim 7, wherein, in the process, when setting the translation table, the virtual translation table based on addresses of the guest memory space is acquired, and, based on the correspondence relationship, the acquired virtual translation table is translated into a translation table based on addresses of the host memory space and set as the translation table used by the address translation mechanism.

* * * * *